(12) United States Patent
Kimura et al.

(10) Patent No.: US 7,860,592 B2
(45) Date of Patent: Dec. 28, 2010

(54) DESIGN METHOD FOR INDUSTRIAL PRODUCT USING CLOTHOID CURVE, INDUSTRIAL PRODUCTS DESIGNED BY THE DESIGN METHOD, AND METHOD AND DEVICE FOR NUMERICAL CONTROL USING THE CLOTHOID CURVE

(75) Inventors: Fumihiko Kimura, Tokyo (JP); Hiroshi Makino, Yamanashi (JP); Yoshikazu Matsuo, Tokyo (JP)

(73) Assignee: THK Co., Ltd., Tokyo (JP)

( * ) Notice: Subject to any disclaimer, the term of this patent is extended or adjusted under 35 U.S.C. 154(b) by 0 days.

(21) Appl. No.: 10/590,704

(22) PCT Filed: Feb. 14, 2005

(86) PCT No.: PCT/JP2005/002132

§ 371 (c)(1),
(2), (4) Date: May 10, 2007

(87) PCT Pub. No.: WO2005/083537

PCT Pub. Date: Sep. 9, 2005

(65) Prior Publication Data

US 2007/0293962 A1    Dec. 20, 2007

(30) Foreign Application Priority Data

| Feb. 27, 2004 | (JP) | ............................. 2004-055554 |
| Feb. 27, 2004 | (JP) | ............................. 2004-055555 |
| Feb. 27, 2004 | (JP) | ............................. 2004-055556 |
| Aug. 30, 2004 | (JP) | ............................. 2004-250372 |
| Aug. 30, 2004 | (JP) | ............................. 2004-250373 |
| Aug. 30, 2004 | (JP) | ............................. 2004-250374 |
| Aug. 30, 2004 | (JP) | ............................. 2004-250375 |

(51) Int. Cl.
*G06F 19/00*    (2006.01)

(52) U.S. Cl. ............................. 700/97; 700/117; 703/1; 703/2; 703/7

(58) Field of Classification Search .................. 700/97, 700/98, 117, 118, 119, 159, 160; 703/1, 703/2, 6, 7
See application file for complete search history.

(56) References Cited

U.S. PATENT DOCUMENTS 2,473,234 A * 6/1949 Whitfield .................. 418/201.3

(Continued)

OTHER PUBLICATIONS

Kenjiro Miura—Transactions of Information Processing Society of Japan, vol. 38, No. 11, pp. 2227 to 2236, 1997. Cited in the international search report.

(Continued)

*Primary Examiner*—Paul L Rodriguez
*Assistant Examiner*—Carlos Ortiz Rodriguez
(74) *Attorney, Agent, or Firm*—Westerman, Hattori, Daniels & Adrian, LLP

(57) ABSTRACT

A trajectory of motion of the mechanical element is designed by using a three-dimensional curve, referred to as a three-dimensional clothoid curve, in which each of a pitch angle and a yaw angle in a tangential direction is given by a quadratic expression of a curve length or a curve length variable. A trajectory of a machine tool or a contour shape of a workpiece is expressed by using a three-dimensional curve, referred to as a three-dimensional clothoid curve, in which each of a pitch angle and a yaw angle in a tangential direction is given by a quadratic expression of a curve length or a curve length variable to control motion of the machine tool based on the three-dimensional curve.

8 Claims, 31 Drawing Sheets

U.S. PATENT DOCUMENTS

| | | | | |
|---|---|---|---|---|
| 3,245,612 | A * | 4/1966 | Nilsson et al. | 418/201.3 |
| 3,814,557 | A * | 6/1974 | Volz | 418/197 |
| 5,800,151 | A * | 9/1998 | Kawamura et al. | 418/201.3 |
| 5,909,965 | A * | 6/1999 | Szu et al. | 384/43 |
| 6,244,844 | B1 * | 6/2001 | Diaz | 418/201.3 |
| 6,587,747 | B2 * | 7/2003 | Hirai et al. | 700/189 |
| 6,832,128 | B2 * | 12/2004 | Haupt | 700/184 |
| 2002/0028122 | A1 * | 3/2002 | Kuo et al. | 411/429 |
| 2002/0189385 | A1 * | 12/2002 | Drennen et al. | 74/424.74 |

OTHER PUBLICATIONS

Shigure GU—Journal of the Robotics Society of Japan, vol. 8, No. 6, pp. 40 to 47, 1990. Cited in the international search report.

International Search Report of PCT/JP2005/002132, date of mailing May 31, 2005.

Kenjiro T. Miura, "Unit Quatemion Integral Curve" Department of Mechanical Engineering, Shizuoka University, Nov. 1997, vol. 38 No. 11, pp. 2227-2236, Cited in ISR.

Shi-yu Qiu, et al., "Free Curve Interpolation Using Clothoidal Curve", JRSJ vol. 8 No. 6, Dec. 1990, pp. 40-47, Cited in spec. & ISR.

Guiqing Li, et al., "3D Discrete Clothoid Splines", CGI 2001 (IEEE 2001), pp. 321-324, Cited in spec.

Form PCT/IPEA/409 issued in International Application No. PCT/JP2005/002132.

Miura, Kenjiro, "Interpolation of 3D Points by Unit Quaternion Integral Curves", Transactions of Information Processing Society of Japan, Jul. 15, 1998, pp. 2159-2167, vol. 39 No.7, Information Processing Society of Japan (English Abstract).

Sakiyama, Naoki et al., "Reconstruction of QI Curves with Optimization Techniques", IPSJ Journal, May 15, 2001, pp. 1093-1102, vol. 42, No. 5, Information Processing Society of Japan (English Abstract).

Sakiyama, Naoki et al., "Reconstruction of Free-form Curves by QI curves with Optimization Techniques", Visual Computing CAD, Jun. 28, 2000, pp. 83-88 (English Abstract).

* cited by examiner $$0 \leq S = \frac{s}{h} \leq 1$$

$$P(S) = P_0 + h\int_0^S (\cos\phi + j\sin\phi)dS$$

$$\phi(S) = \phi_0 + \phi vS + \phi uS^2$$

P0 : COORDINATE OF STARTING POINT
φ : ANGLE MADE BETWEEN TANGENTIAL DIRECTION AND x-AXIS
h : CURVE LENGTH
s : DISTANCE MOVED FROM STARTING POINT
S : CURVE LENGTH VARIABLE $\phi_0, \phi v, \phi u$ : $(const)$ ⊘ POINTS BEING INTERPOLATED
• Polygon Q

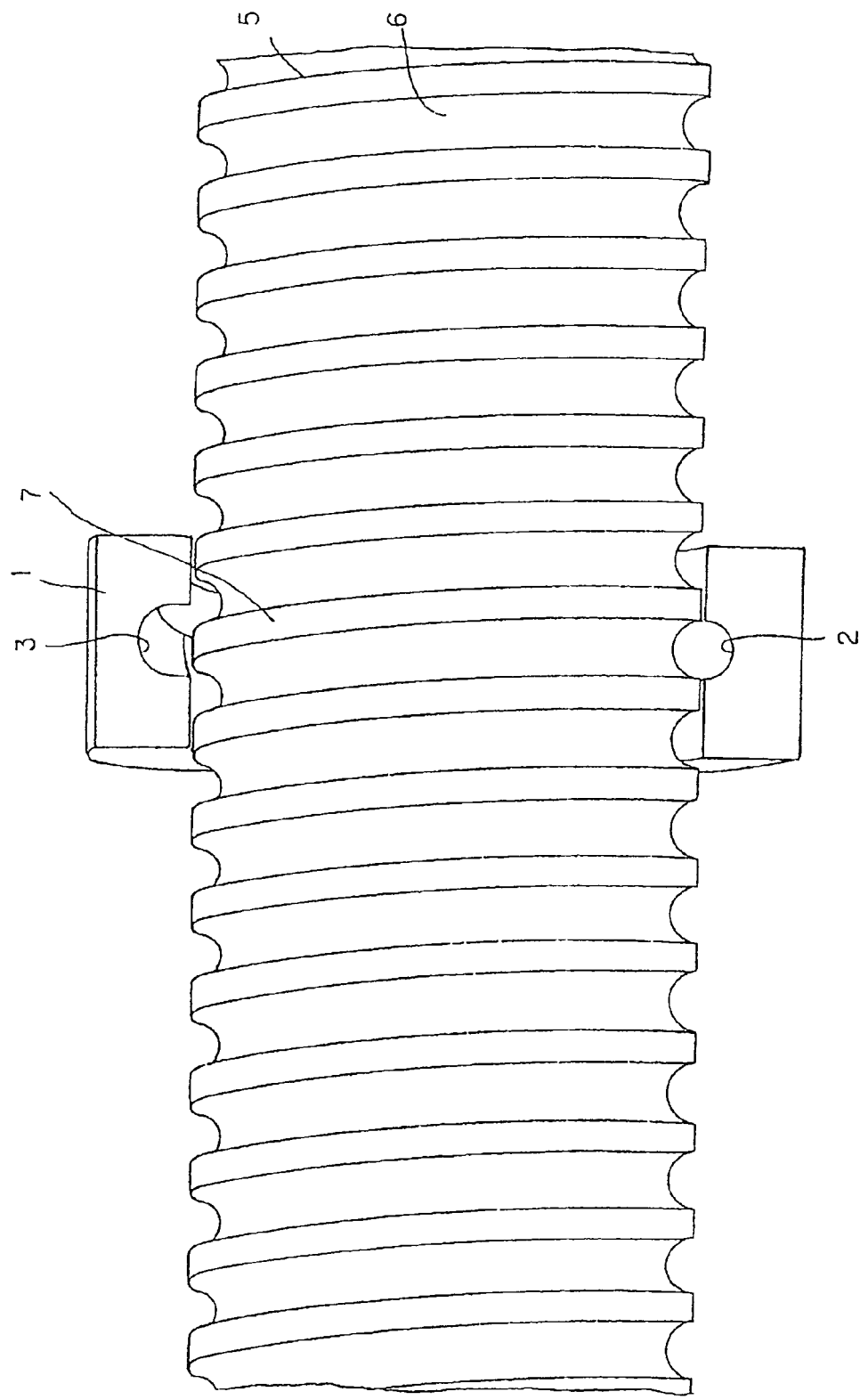

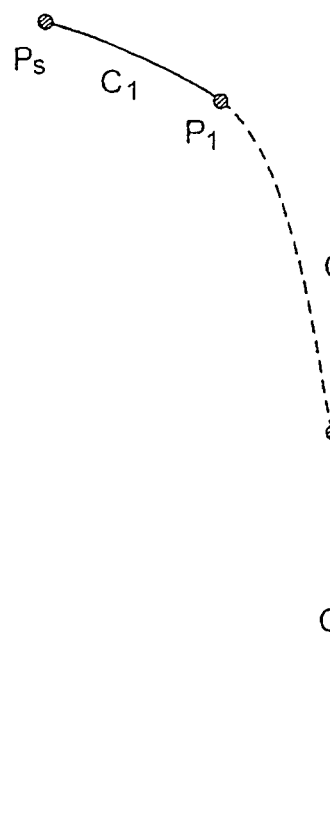
FIG.43
FIG.44
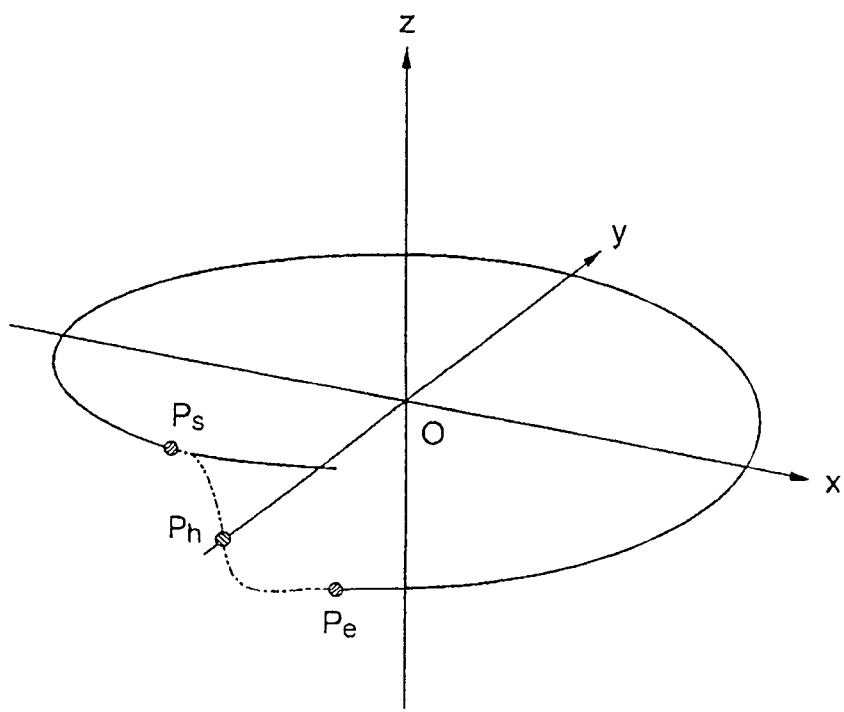

DESIGN METHOD FOR INDUSTRIAL PRODUCT USING CLOTHOID CURVE, INDUSTRIAL PRODUCTS DESIGNED BY THE DESIGN METHOD, AND METHOD AND DEVICE FOR NUMERICAL CONTROL USING THE CLOTHOID CURVE

TECHNICAL FIELD

In the following specification, a reference "A" is attached to the description concerning "Design method for industrial product using clothoid curve and industrial product designed by the design method" (hereinafter simply referred to as a design method for industrial product using a clothoid curve) and a reference "B" is attached to the description concerning "method and device for numerical control using the clothoid curve" (hereinafter simply referred to as a numerical control method using the clothoid curve).

A. Design Method for Industrial Products Using a Clothoid Curve:

The present invention relates to a method for designing the shape of an industrial product using a clothoid curve, and in particular, to a method for designing, in a machine including a mechanism in which a mechanical element having mass moves, smoothing the motion of the mechanical element.

BACKGROUND ART

A. Design Method for Industrial Products Using a Clothoid Curve

In response to making machines into a compact form and at high precision, it has become significant to have a mechanism in which a mechanical element which has able to move at high speed. The demand for realizing fast and high-precision motion, with less vibration and error in motion and with aging and damage suppressed, through a design for smooth motion trajectories with no dynamically unreasonable force, has been required strongly.

As to methods for designing free motion trajectories, a technique to connect analytic curves, such as straight lines and circular arcs, and a spline curve interpolation (i.e., a technique to interpolate a row of points to be given with spline curves) have conventionally been used (refer to a non-patent reference 1).

Non patent reference 1: Mamoru HOSAKA, Toshio SADA, "Integrate-type CAD/CAM system", Ohmsya, 1999;

Non patent reference 2: Shi-yu QIU, Hiroshi MAKINO, Hiroharu SUDA, Yasuo YOKOYAMA "Free Curve Interpolation Using Clothoidal Curve" (The Robotics Society Of Japan, vol 8, No. 6, pp 40-47); and Non patent reference 3 by Li Guiquing, Li Xianmin, and Li Hua, "3D Discrete Clothoid Splines," (CGI' 01, pp 321-324)

DISCLOSURE OF THE INVENTION

A. Design Method for Industrial Products Using a Clothoid Curve

In techniques to connect analytic curves, such as straight lines and circular arcs, it is difficult to continuously connect curvatures at points connecting a straight line and a circular arc. When a technique to perform the interpolation with spline curves is adopted, the curvatures can be connected continuously, but it is difficult to design a distribution of covertures with no dynamically unreasonable force along a trajectory, because of the complicated relationship between distances moved from a starting point and curvatures. Thus favorable motion trajectories cannot be obtained.

Accordingly, the present invention has an object to provide a technique for designing, in a machine incorporating a mechanism in which a mechanical element having a mass moves, a motion trajectory allowing the mechanical element to move smoothly. The present technique is novel and innovative and has been created by the present inventors.

Herein, the "smooth" is that changes of tangent lines, a osculating plane (a normal line), curvatures and other factors on a trajectory are continuous along the trajectory, and means that a force exerted on a mechanical element moving along a trajectory changes continuously.

By the way, ball screws frequently used in robots, machine tools, assembly machines, inspection machines and others have a regression path of which mode is composed of connections of straight lines and circular arcs. Thus tangent lines and curvatures of a curve are not continuous and trajectory design is short of flexibility as well.

Another object of the present invention is to establish, in designing a circulation path of a ball of a ball screw, a circulation path which lessens loss of motion energy of the ball circulating along the path and which provides not only continuous tangent lines and curvatures on the circulation path but alto moderate changes in the curvatures in order that parts providing the circulation path are avoided from being damaged. A design method for the circulation path of the ball screw is an application of the above method for designing a motion trajectory that allows a mechanical element to move smoothly.

A. Design method for industrial products using a clothoid curve:

Hereinafter, the invention according to a method for designing industrial products using the clothoid curve will now be described.

The invention solves the foregoing problems by employing the method for designing industrial products, wherein the design method is characterized in that the shape of an industrial product is designed by using a three-dimensional curve (referred to as a three-dimensional clothoid curve) in which each of a pitch angle and a yaw angle in a tangential direction is given by a quadratic expression of a curve length or a curve length variable.

The invention is characterized in that, in the design method for industrial products, the industrial product is a machine including a mechanism in which a mechanical element having a mass moves and a trajectory of motion of the mechanical element is designed by using the three-dimensional curve (referred to as the three-dimensional clothoid curve).

The invention is characterized in that, in the design method for industrial products, the machine is a screw device including a mechanism in which a ball as the mechanical element moves, the screw device comprises a screw shaft having an outer surface on which a spiral rolling element rolling groove is formed, a nut having an inner surface on which a load rolling element rolling groove is formed so as to be opposed to the rolling element rolling groove and a regression path is formed to connect a one end and the other end of the load rolling element rolling groove, and a plurality of rolling elements disposed between the rolling element rolling groove of the screw shaft and the load rolling element rolling groove of the nut and disposed in the regression path, and the regression path of the screw device is designed by using the three-dimensional curve (reefed to as the three-dimensional clothoid curve).

The invention is characterized in that, in the design method for industrial products, the three-dimensional clothoid curve is defined by the following expressions.

[Numeral 1]

$$P = P_0 + \int_0^s u\,ds = P_0 + h\int_0^S u\,dS, \quad 0 \le s \le h, \quad 0 \le S = \frac{s}{h} \le 1 \quad (1)$$

$$u = E^{k\beta}E^{j\alpha}(i) \quad (2)$$

$$= \begin{bmatrix} \cos\beta & \sin\beta & 0 \\ \sin\beta & \cos\beta & 0 \\ 0 & 0 & 1 \end{bmatrix} \begin{bmatrix} \cos\alpha & 0 & \sin\alpha \\ 0 & 1 & 0 \\ -\sin\alpha & 0 & \cos\alpha \end{bmatrix} \begin{Bmatrix} 1 \\ 0 \\ 0 \end{Bmatrix}$$

$$= \begin{Bmatrix} \cos\beta\cos\alpha \\ \sin\beta\cos\alpha \\ -\sin\alpha \end{Bmatrix}$$

$$\alpha = a_0 + a_1 S + a_2 S^2 \quad (3)$$

$$\beta = b_0 + b_1 S + b_2 S^2, \quad (4)$$

wherein,

[Numeral 2]

$$P = \begin{Bmatrix} x \\ y \\ z \end{Bmatrix}, \quad P_0 = \begin{Bmatrix} x_0 \\ y_0 \\ z_0 \end{Bmatrix} \quad (5)$$

shows a positional vector at each point on the three-dimensional clothoid curve and its initial value, respectively.

Assume that the length of a curve from a starting point is s and its whole length (a length from the starting point to an end point) is h. A value produced by dividing s by h is expressed as S. S is a dimensionless value, which is called a curve length variable.

i, j and k are unit vectors in the x-axis, y-axis and z-axis directions, respectively.

u is a unit vector showing a tangential direction of a curve at a point P, which is given by Expression (2). $E^{k\beta}$ and $E^{j\alpha}$ are rotation matrices and represent an angular rotation of angle $\beta$ about the k-axis and an angular rotation of angle $\alpha$ about the j-axis, respectively. The former is referred to as a yaw rotation, while the latter is referred to as a pitch rotation. Expression (2) means that the unit vector in the i-axis direction is rotated by an angle $\alpha$ about the j-axis, before being rotated by an angle $\beta$ about the k-axis, thus producing a tangent vector u. $a_0, a_1, a_2, b_0, b_1$ and $b_2$ are constants.

The invention is characterized in that, in the design method for industrial products, a plurality of spatial points are specified in a three-dimensional coordinate and these spatial points are interpolated by using the three-dimensional clothoid curve, whereby the shape of the industrial product is designed.

The invention is characterized in that, in the design method for industrial products, seven parameters $a_0, a_1, a_2, b_0, b_1, b_2$ and h of the three-dimensional clothoid segments are calculated so that, between a one three-dimensional clothoid segment (a unit curve consisting of a group of curves produced on the interpolation) and the next three-dimensional clothoid segment (a unit curve consisting of a group of curves produced on the interpolation), positions, tangential directions, normal directions, and curvatures of both the one and next three-dimensional clothoid segments are made continuous to each other, respectively, at the plurality of spatial points.

The invention is characterized in that, in the design method for industrial products, the seven parameters $a_0, a_1, a_2, b_0, b_1$, $b_2$ and h of the three-dimensional clothoid segments are calculated by making the number of conditional expressions produced by mutual addition to be made between conditional expressions concerning the tangential directions, the normal directions and the curvatures at both the starting point and the end point and further conditional expressions allowing the positions, the tangential directions, the normal directions, and the curvatures of both the one and next three-dimensional clothoid segments to be made continuous to each other, respectively, at the plurality of spatial points agree with the unknowns of the seven parameters $a_0, a_1, a_2, b_0, b_1, b_2$ and h of the three-dimensional clothoid segments, whereby the conditional expressions is made agree with the unknowns in terms of number thereof, by specifying the tangential directions, the normal directions and the curvatures at the stating point and the and point among the plurality of spatial points and additionally inserting objective points being interpolated between the spatial points which have been specified in advance.

The invention is an industrial product designed by using the design method for industrial products.

The invention, which is for designing the shape of an industrial product, is a program enabling a computer to operate as means to design the shape of the industrial product by using a three-dimensional curve (referred to as a three-dimensional clothoid curve) in which each of a pitch angle and a yaw angle in a tangential direction is given by a quadratic expression of a curve length or a curve length variable.

The invention, which is for designing the shape of an industrial product, is a computer-readable recording medium recording thereon a program enabling a computer to operate as means to design the shape of the industrial product by using a three-dimensional curve (referred to as a three-dimensional clothoid curve) in which each of a pitch angle and a yaw angle in a tangential direction is given by a quadratic expression of a curve length or a curve length variable.

A. Design method for industrial products by using the clothoid curve:

In the claimed invention, by using the three-dimensional clothoid curve, the motion of a mechanical element can be designed so that a trajectory of the motion becomes smooth. Designing the trajectory in this way makes it possible that machines move in a dynamically unforced condition, cause no deterioration in their functions due to motion errors, and have less damage in their trajectories.

In particular, as to a screw device, it is possible to provide a general method of producing a spatial curve which is necessary for designing circulating paths of the rolling elements in the screw device. It is possible to design the circulating paths so that changes in a restraining force exerted on a rolling element are smooth when the rolling element moves with acceleration and deceleration along a spatial curve on a circulating path. This feature allows the rolling element to move in a soft and smooth manner, thereby the efficiency of power transmission in the screw device is improved and friction force and inertia force are avoided from being generated excessively. Accordingly, with parts avoided from being damaged, screw devices with high reliability can be provided.

In addition, by utilizing the feature that a pattern of changes in curvature can be controlled, a large number of applications in various industrial fields can be provided. For example, in designing the shapes of objects to be designed in an aesthetic fashion, this versatile curve design method can be applied effectively to the design.

BRIEF DESCRIPTION OF THE DRAWINGS

FIG. 34 is a side view showing a state where the nut is combined with a screw shaft;

FIG. 43 is a view showing a curve into which a point P2 is inserted;

FIG. 44 is a view showing the curve C0 and a produced regression path; and

BEST MODE FOR CARRYING OUT THE INVENTION

A. Design Method for Industrial Products Using a Clothoid Curve

Hereinafter, an embodiment of a method for designing industrial products using a clothoid curve, which is according to the present invention, will now be described in turn based on listed items which are 1: definition and features of a three-dimensional clothoid curve, 2: an interpolation method using the three-dimensional clothoid curve, 3: a method for designing, with the use of a three-dimensional clothoid interpolation, the regression path of a ball screw serving as a screw device, and 4: a numerical control method using the three-dimensional clothoid interpolation.

1. Definition and Characteristics of a Three-Dimensional Clothoid Curve:

(1-1) Basic Expression of the Three-Dimensional Clothoid:

A clothoid curve (Clothoid curve), which is also called Cornu's spiral, is a curve whose curvature changes in proportion to the length of the curve.

Figure 1:
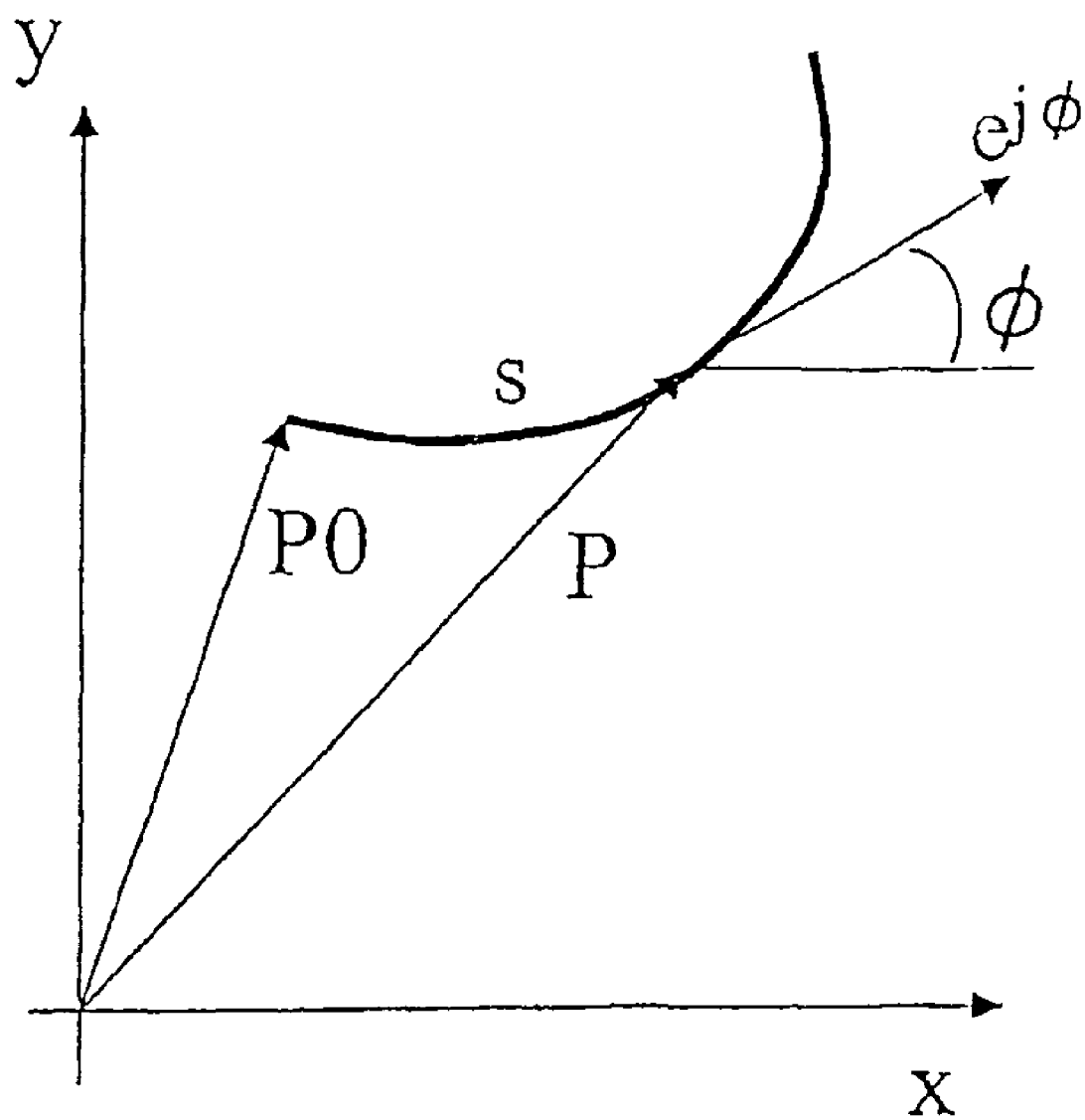
FIG. 1 is a graph showing a two-dimensional clothoid curve in an xy coordinate system.

A two-dimensional clothoid curve already proposed by the inventors is one kind of planer curves (two-dimensional curve) and is expressed by the following expressions defined in the xy coordinate shown in FIG. 1.

[Numeral 9]

$$P = P_0 + \int_0^s e^{j\phi} ds = P_0 + h \int_0^S e^{j\phi} dS, \ 0 \le s \le h, \ 0 \le S = \frac{s}{h} \le 1 \quad (1\text{-}1)$$

$$\phi = c_0 + c_1 s + c_2 s^2 = \phi_0 + \phi_v S + \phi_u S^2 \quad (1\text{-}2)$$
wherein

[Numeral 10]

$$P = x + jy, \ j = \sqrt{-1} \quad (1\text{-}3)$$

is a positional vector representing a point on the curve and

[Numeral 11]

$$P_0 = x_0 + jy_0 \quad (1\text{-}4)$$

is an initial value (a positional vector at a starting point) of the positional vector.

[Numeral 12]

$$e^{j\phi} = \cos\phi + j\sin\phi \quad (1\text{-}5)$$

is a unit vector (a vector of which length is 1) representing a tangential direction on the curve and the direction $\phi$ is measured in the counterclockwise direction from an original line (x-axis direction). Multiplying this unit vector by an infinitesimal length ds and integrating the multiplied results leads to acquisition of a point P on the curve.

Let us assume that a length on the curve, which is measured along the curve from a starting point thereof, is s and a whole length (a length from the starting point to an end point of the curve) is h. A value obtained by dividing s by h is expressed as S. S is a dimensionless value, which is referred to as a curve length variable.

Figure 2:
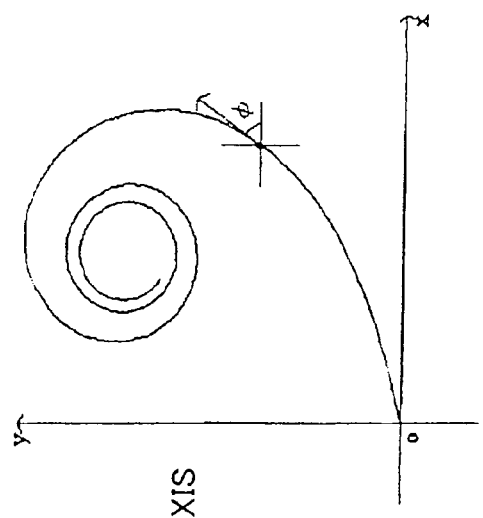
FIG. 2 is a view showing the shape of a typical two-dimensional clothoid curve.

As shown in Expression (1-2), the clothoid curve has a feature that the tangential direction angle $\phi$ is expressed as a quadratic expression of the curve length s or the curve length variable S. $c_0$, $c_1$, and $c_2$ or $\phi_o$, $\phi_u$ and $\phi_v$ are coefficients of the quadratic expression, and these coefficients and the whole length h of the curve are called clothoid parameters. FIG. 2 shows the shape of a general clothoid curve.

The above relationships are expanded to the three-dimensional one to produce expressions presenting a three-dimensional clothoid curve. Conventionally, expressions which provide the three-dimensional clothoid curve have not been known. This time, however, the present inventors have completed this expansion for the first time in this field.

The three-dimensional clothoid curve is defined by the following expressions.

[Numeral 13]

$$P = P_0 + \int_0^s u \, ds = P_0 + h \int_0^S u \, dS, \quad (1\text{-}6)$$

$$0 \le s \le h, \ 0 \le S = \frac{s}{h} \le 1$$

-continued $$u = E^{k\beta} E^{j\alpha}(i) \quad (1\text{-}7)$$

$$= \begin{bmatrix} \cos\beta & -\sin\beta & 0 \\ \sin\beta & \cos\beta & 0 \\ 0 & 0 & 1 \end{bmatrix} \begin{bmatrix} \cos\alpha & 0 & \sin\alpha \\ 0 & 1 & 0 \\ -\sin\alpha & 0 & \cos\alpha \end{bmatrix} \begin{Bmatrix} 1 \\ 0 \\ 0 \end{Bmatrix}$$

$$= \begin{Bmatrix} \cos\beta\cos\alpha \\ \sin\beta\cos\alpha \\ -\sin\alpha \end{Bmatrix}$$

$$\alpha = a_0 + a_1 S + a_2 S^2 \quad (1\text{-}8)$$

$$\beta = b_0 + b_1 S + b_2 S^2, \quad (1\text{-}9)$$
wherein

Figure 3:
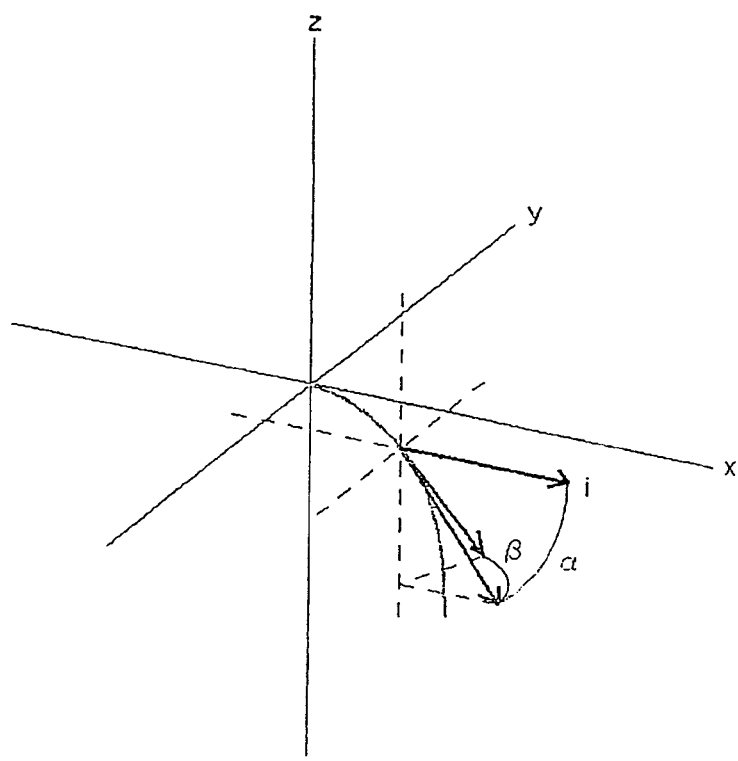
FIG. 3 is a view explaining the definition of a pitch angle α and a yaw angle β of a three-dimensional clothoid curve.

[Numeral 14]

$$P = \begin{Bmatrix} x \\ y \\ z \end{Bmatrix}, \ P_0 = \begin{Bmatrix} x_0 \\ y_0 \\ z_0 \end{Bmatrix} \quad (1\text{-}10)$$

denotes a positional vector at each point on the three-dimensional clothoid and an initial value of the positional vector, respectively. i, j and k are unit vectors in the x-axis, y-axis and z-axis directions, respectively.

u is a unit vector representing the tangential direction at the point P on the curve, which is given by Expression (1-7). In Expression (1-7), $E^{k\beta}$ and $E^{j\alpha}$ show rotation matrices and, as shown in FIG. 3, mean a rotation of angle $\beta$ about the k-axis (z-axis) and a rotation of angle $\alpha$ about the j-axis (y-axis), respectively. The former is called a yaw rotation, while the latter is called a pitch rotation. Expression (1-7) thus means that rotating the unit vector in the i-axis (x-axis) direction by an angle $\alpha$ about the j-axis (y-axis) and then rotating the resultant unit vector by an angle $\beta$ about the k-axis (z-axis) produces the tangential vector u.

In other words, in the case of the two-dimension, a unit vector $e^{j\phi}$ representing a tangential direction on a curve is obtained on a tilt angle $\phi$ made from the x-axis. In the case of the three-dimension, the tangential vector u on a curve can be obtained on the pitch angle $\alpha$ and the yaw angle $\beta$. A pitch angle of 0 provides a two-dimensional clothoid curve wound in the xy plane, while a yaw angle of 0 provides a two-dimensional clothoid curve wound in the xz plane. Multiplying the tangential vector u by an infinitesimal length ds and integrating the multiplied results provides a three-dimensional clothoid curve.

For the three-dimensional clothoid curve, the tangential vector has a pitch angle $\alpha$ and a yaw angle $\beta$ which are given by a quadratic expression of the curve length variable S, as shown by Expressions (1-8) and (1-9), respectively. This enables free selection of changes of the tangential direction, while still giving continuousness to the changes.

As represented by the above expressions, the three-dimensional clothoid curve is defined as "a curve in which the pitch angle and the yaw angle of a tangential direction are expressed by a quadratic expression of a curve length variable, respectively."

A single three-dimensional clothoid curve starting from $P_0$ is decided with seven parameters composed of

[Numeral 15]

$$a_0, a_1, a_2, b_0, b_1, b_2, h \qquad (1\text{-}11)$$

Figure 4:
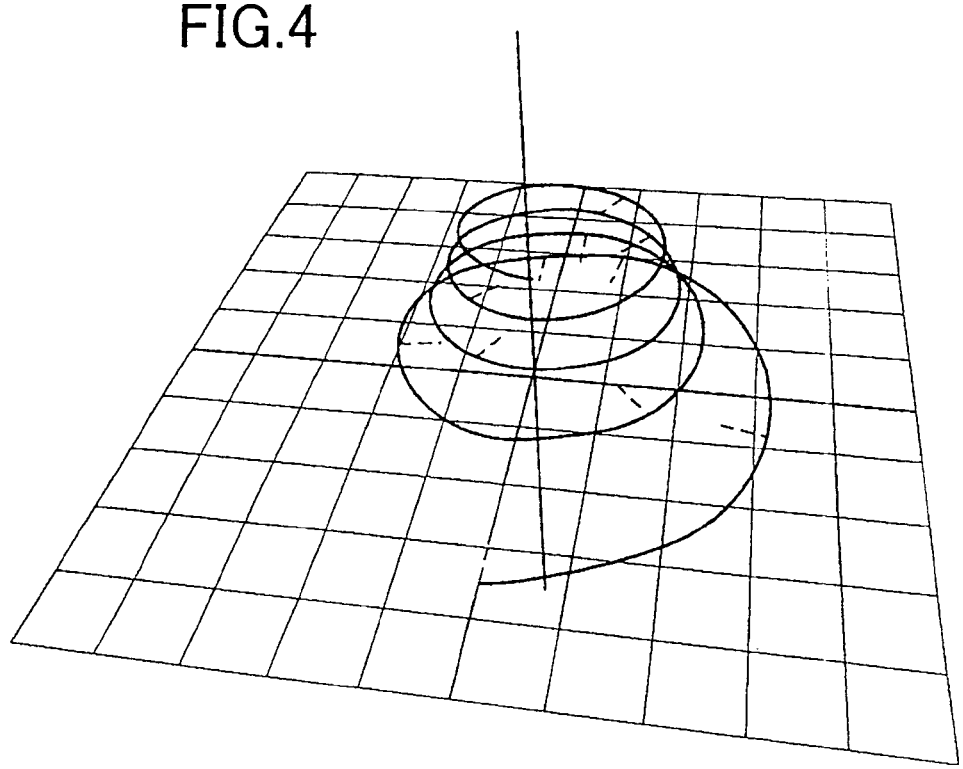
FIG. 4 is a view showing the shape of a typical three-dimensional clothoid curve.

The six variables of $a_0$ to $b_2$ have the unit of angle and represent the shape of a clothoid curve. In contrast, h has the unit of length, which represents the amplitude of a clothoid curve. A typical example of the three-dimensional clothoid curve is a spiral curve, as shown in FIG. 4.

(1-2) Frenet Frame and Curvature on the Three-Dimensional Clothoid Curve:

Let us assume that an arbitrary three-dimensional curve is expressed by R(t) which uses t as a parameter. In particular, assume that this expression is denoted by R(s) which uses s as a parameter expressing a distance moving from a starting point of the curve.

When the absolute values of relative positional vectors dR(s) at two points on a curve, which provide a difference of ds, is regarded as a line element ds, there is a relationship between ds and dt, which is expressed by the following Expression (2-1). For the sake of a simplified explanation, differentiating R with regard to a parameter t is denoted by a character with a dot atop thereof.

[Numeral 16]

$$ds = |dR(t)| = \left|\frac{dR(t)}{dt}\right| dt = |\dot{R}| = \sqrt{\dot{R} \cdot \dot{R}}\, dt \qquad (2\text{-}1)$$

Since a unit tangential vector u(t) is created by normalizing a line element vector dR(t) of a curve, the unit tangential vector can be expressed by Expression (2-2) with reference to Expression (2-1).

[Numeral 17]

$$u(t) = \frac{dR(t)}{|dR(t)|} = \frac{dR(t)}{ds} = \frac{\dot{R}}{|\dot{R}(t)|} \qquad (2\text{-}2)$$

Figure 5:
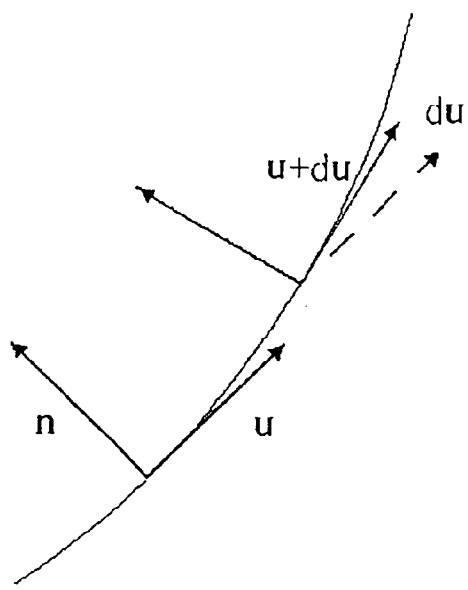
FIG. 5 is a view showing an amount of changes in a unit normal vector.

A change amount du of the unit tangential vector will then be considered. FIG. 5 shows a change amount of a unit normal vector. For a linear line, the tangential direction is constant, resulting in du(t)={0, 0, 0}. This is not true of curves, however. The change amount du of a unit tangential vector at a position distant from by a distance ds is perpendicular to a normal vector u. This also clearly understood from the fact that differentiating a relationship of u·u=1 provides an orthogonal relationship of u·du=0. The normalization of the change amount du of this unit tangential vector creates a unit principal normal vector n(t). That is, the unit principal normal vector n(t) is expressed by Expression (2-3).

[Numeral 18]

$$n(t) = \frac{\dot{u}(t)}{|\dot{u}(t)|} \qquad (2\text{-}3)$$

The normal direction is treated such that a leftward direction to be obtained when a person turns to a tangential direction is regarded as being a positive normal direction. To be more accurate, in a plane formed by both the vector du and the unit tangential vector u(t), a direction created by a counter-clockwise rotation of 90 degrees from the unit tangential vector u(t) is defined as a positive direction to the unit principal normal vector n(t).

In addition, a binormal vector b(t) is a vector perpendicular to both the unit tangential vector u(t) and the unit principal normal vector n(t) and is defined by Expression (2-4).

[Numeral 19]

$$b(t) = u(t) \times n(t) \qquad (2\text{-}4)$$

A set of three vectors [u(t), n(t), b(t)], which is a combination of the unit tangential vector u(t), unit principal normal vector n(t), binormal vector b(t) which are defined above, is referred to as frenet frame at a position R(t) on a curve.

A curvature k will now be described, which is a ratio at which the unit tangential vectors are turned along the linear elements of a curve. A three-dimensional curvature is defined by Expression (2-5).

[Numeral 20]

$$\kappa(t) = \frac{\|\dot{R}(t) \times \ddot{R}(t)\|}{\|\dot{R}(t)\|^3} \qquad (2\text{-}5)$$

As defined above, the fundamental amounts concerning the three-dimensional curve are denoted with the expressions that use the curve length variable S as a parameter in the three-dimensional clothoid curve.

When any three-dimensional clothoid curve P(S) is considered, the unit tangential vector u(S) can be expressed by Expression (2-6) with the help of Expression (2-2).

[Numeral 21]

$$u(S) = \frac{P'(S)}{|P'(S)|} \qquad (2\text{-}6)$$

In addition, when taking the definition Expressions (1-7), (1-8) and (1-9) of the three-dimensional clothoid curve into account, the unit tangential vector u(S) can be expressed in the form of Expression (2-7) as well. In the present specification, this expression is used as a main expressing way.

[Numeral 22]

$$u(S) = \begin{Bmatrix} \cos\beta(S)\cos\alpha(S) \\ \sin\beta(S)\cos\alpha(S) \\ -\sin\alpha(S) \end{Bmatrix} \qquad (2\text{-}7)$$

The differential coefficient of first order of the tangential vector u(S) of a three-dimensional clothoid curve with respect to the curve length variable S creates Expression (2-8) and its amplitude is expressed by Expression (2-9).

[Numeral 23]

$$u'(S) = \begin{Bmatrix} -\alpha'(S)\cos\beta(S)\sin\alpha(S) - \beta'(S)\sin\beta(S)\cos\alpha(S) \\ -\alpha'(S)\sin\beta(S)\sin\alpha(S) - \beta'(S)\cos\beta(S)\cos\alpha(S) \\ -\alpha'(S)\cos\alpha(S) \end{Bmatrix} \quad (2\text{-}8)$$

$$\|u'(S)\| = \sqrt{\alpha'(S)^2 + \beta'(S)^2\cos^2\alpha(S)} \quad (2\text{-}9)$$

The unit principal normal vector n(S) will now be considered. The normal vector to a three-dimensional curve is expressed by Expression (2-3), so that the normal vector to a three-dimensional clothoid curve is to be expressed by Expression (2-10).

[Numeral 24]

$$n(S) = \frac{u'(S)}{\|u'(S)\|} = \frac{1}{\sqrt{\alpha'(S)^2 + \beta'(S)^2\cos^2\alpha(S)}} \begin{Bmatrix} -\alpha'(S)\cos\beta(S)\sin\alpha(S) - \beta'(S)\sin\beta(S)\cos\alpha(S) \\ -\alpha'(S)\sin\beta(S)\sin\alpha(S) + \beta'(S)\cos\beta(S)\cos\alpha(S) \\ -\alpha'(S)\cos\alpha(S) \end{Bmatrix} \quad (2\text{-}10)$$

As to the binormal vector b(t), Expression (2-4) is used to obtain the binormal vector using both the unit tangential vector u(S) on Expression (2-7) and the unit principal normal vector n(S) on Expression (2-10).

[Numeral 25]

$$b(S) = u(S) \times n(S) \quad (2\text{-}11)$$

Finally, as to the curvature, Expression (2-5) is deformed to express the curvature as shown in Expression (2-12).

[Numeral 26]

$$\kappa(S) = \frac{\|P'(S) \times P''(S)\|}{\|P'(S)\|^3} \quad (2\text{-}12)$$

$$= \frac{\|u'(S)\|}{h}$$

$$= \frac{\sqrt{\alpha'(S)^2 + \beta'(S)^2\cos^2\alpha(S)}}{h}$$

As described above, the frenet frame and the curvature k at each point on a three-dimensional clothoid curve can be obtained by the curvature length variable S.

Figure 6:
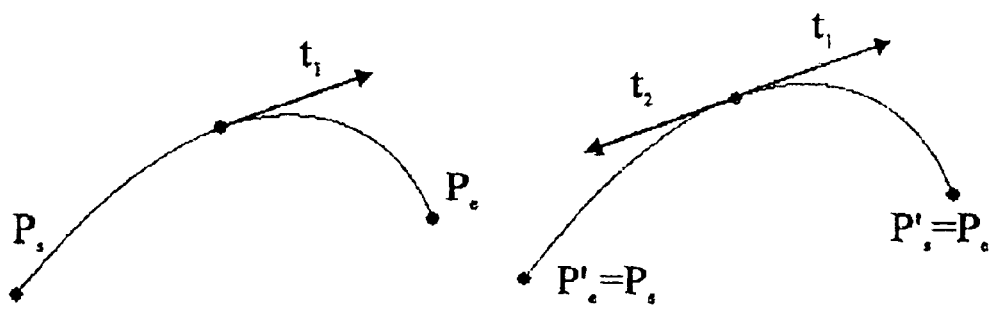
FIG. 6 is a view showing two three-dimensional clothoid curves which are identical in their sizes and shapes to each other but are opposite in their directions to each other.

(1-3) Production of Three-Dimensional Clothoid Curve Having Opposite Direction:

As shown in FIG. 6, the production of the three-dimensional clothoid curve whose amplitude and shape are the same and direction is opposite as and to those of a selected three-dimensional clothoid curve will now be explained.

Assume that there is a three-dimensional clothoid curve $C_1$ which has a starting point $P_s$ and an end point $P_e$ and has clothoid parameters for a three-dimensional clothoid curve which are decided by seven values made up of h, $a_0$, $a_1$, $a_2$, $b_0$, $b_1$ and $b_2$. In such a case, tangential rotation angles $\alpha_1$ and $\beta_1$ are expressed by the following Expressions (2-13) and (2-14).

[Numeral 27]

$$\alpha_1 = a_0 + a_1 S + a_2 S^2 \quad (2\text{-}13)$$

$$\beta_1 = b_0 + b_1 S + b_2 S^2 \quad (2\text{-}14)$$

In the three-dimensional clothoid curve $C_2$ having the same size and shape and the opposite direction as and to those of this three-dimensional clothoid curve, $P'_s = P_e$ and $P'_e = P_s$ are accomplished, wherein the curve $C_2$ has a starting point $P'_s$ and an end point $P'_e$. When a curve length h is first considered, the curve lengths of the curves $C_1$ and $C_2$ are mutually equal, because the sizes are equal to each other. When the fact that a tangential line t to the three-dimensional clothoid curve $C_2$ is oppositely directed to a tangential line t to the three-dimensional clothoid curve $C_1$ whose coordinates are always the same is considered, it is understood that the following relationships exist between the tangential rotation angles $\alpha_1$ and $\beta_1$ of the curve $C_1$ and the tangential rotation angles $\alpha_2$ and $\beta_2$ of the curve $C_2$.

[Numeral 28]

$$\alpha_2(S) = \alpha_1(1-S) + \pi \quad (2\text{-}15)$$

$$\beta_2(S) = \beta_1(1-S) \quad (2\text{-}16)$$

The above-described expressions can be summarized into an equation on the following Expressions (2-17) and (2-18).

[Numeral 29]

$$\alpha_2(S) = (a_0 + a_1 + a_2 + \pi) - (a_1 + 2a_2)S + a_2 S^2 \quad (2\text{-}17)$$

$$\beta_2(S) = (b_0 + b_1 + b_2) - (b_1 + 2b_2)S + b_2 S^2 \quad (2\text{-}18)$$

These expressions allow the remaining parameters to be decided, so that the clothoid parameters of the curve $C_2$, which are h', $a'_0$, $a'_1$, $a'_2$, $b'_0$, $b'_1$, and $b'_2$, can be expressed using the parameters of the curve $C_1$.

[Numeral 30]

$$\begin{cases} P'_s = P_e \\ a'_0 = a_0 + a_1 + a_2 + \pi \\ a'_1 = -(a_1 + 2a_2) \\ a'_2 = a_2 \\ b'_0 = b_0 + b_1 + b_2 \\ b'_1 = -(b_1 + 2b_2) \\ b'_2 = b_2 \\ h' = h \end{cases} \quad (2\text{-}19)$$

The use of this relationship produces a three-dimensional clothoid curve of which size and shape are the same and direction is opposite.

(1-4) Division of Three-Dimensional Clothoid Curve

Figure 7:
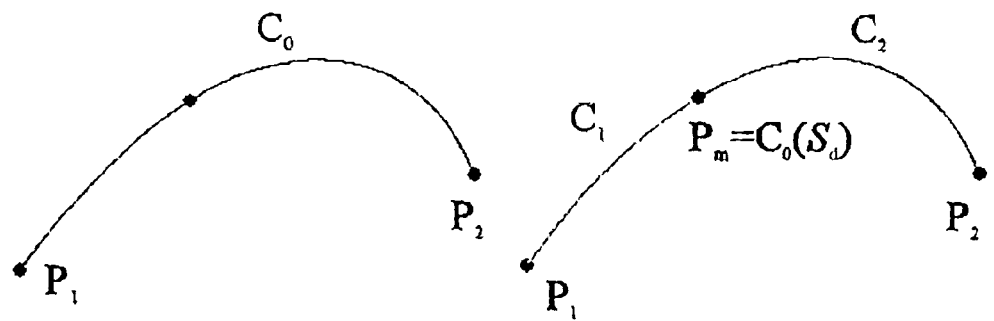
FIG. 7 is an illustration explaining dividing a three-dimensional clothoid curve.

Let us assume that there is a three-dimensional clothoid curve $C_0$ which have not only a starting point $P_1$ and an end point $P_2$ but also clothoid parameters decided by seven quantities h, $a_0$, $a_1$, $a_2$, $b_0$, $b_1$ and $b_2$. In this case, how to divide the three-dimensional clothoid curve $C_0$ connecting both of the points $P_1$ and $P_2$ into curves $C_1$ and $C_2$ divided at a point $P_m$ providing a curve length parameter $S=S_d$, as shown in FIG. 7, will now be described.

Of the divided curves, the curve C1 having the starting point P1 will first be described. With respect to its curve length h, the definition of a three-dimensional clothoid curve gives the fact that the curve $C_1$ has a curve length $h_1$ equal to $S_d$ times larger than a curve length $h_0$ of the curve $C_0$. Further, when it is assumed that a curve length variable of the curve $C_0$ is denoted by $S_0$ and a curve length variable of the curve $C_1$ is denoted by $S_1$ and those variables mean points on the same curve $C_1$, the following relationship is accomplished among these quantities.

[Numeral 31]

$$S_1 = S_d S_0 \quad (2\text{-}20)$$

Namely, between tangential rotation angles $\alpha_0$ and $\beta_0$ and tangential rotation angles $\alpha_1$ and $\beta_1$, it is understood that the following relationships exist.

[Numeral 32]

$$\alpha_1(S_1) = \alpha_0(S_d S_0)$$

$$\beta_1(S_1) = \beta_0(S_d S_0) \quad (2\text{-}21)$$

Arrangement of these expressions leads to the equations in the following Expressions (2-22).

[Numeral 33]

$$\alpha_1(S) = a_0 + a_1 S_d S + a_2 S_d^2 S^2$$

$$\beta_1(S) = b_0 + b_1 S_d S + b_2 S_d^2 S^2 \quad (2\text{-}22)$$

These expressions define tangential directions, so that the clothoid parameters h', $a'_0$, $a'_1$, $a'_2$, $b'_0$, $b'_1$, and $b'_2$ of the curve $C_1$ can be expressed by the following Expression (2-23) that uses the parameters of the curve $C^0$.

[Numeral 34]

$$\begin{cases} a'_0 = a_0 \\ a'_1 = a_1 S_d \\ a'_2 = a_2 S_d^2 \\ b'_0 = b_0 \\ b'_1 = b_1 S_d \\ b'_2 = b_2 S_d^2 \\ h' = h S_d \end{cases} \quad (2\text{-}23)$$

The curve $C_2$ of which starting point is served by the dividing point $P_m$ will then be described. As to this curve $C_2$, the production can be achieved by combining the technique for producing a curve having the same size and shape but the opposite direction, described in the foregoing section 1-3, with the technique for producing the curve $C_1$.

First of all, let us assume that a curve of which size and shape are the same as those of the curve $C_0$ but of which direction is opposite to that of curve $C_0$ is given by a curve $C'_0$. On this curve, a dividing point $P_m$ is expressed by $P_m = C'_0 (1-S_d)$. Let us assume again that the curve $C'_0$ is divided at the point $P_m$. In that case, of the divided curves, a curve $C'_2$ starting at a point $P_2$ has the same size and shape as those of the curve $C_2$ but has the opposite direction to that of the curve $C_2$. Because both techniques described in the forgoing section 1-3 and used in the production of the curve $C_1$ allow the curve $C'_2$ to be produced, applying the technique described in the section 1-3 to the curve $C'_2$ makes it possible to produce the curve $C_2$.

Thus this curve $C_2$ has clothoid parameters h'', $a''_0$, $a''_1$, $a''_2$, $b''_0$, $b''_1$, and $b''_2$ which can be expressed by using the parameters of the curve $C_0$, as shown in the following Expression (2-24).

[Numeral 35]

$$\begin{cases} a''_0 = a_0 + a_1 S_d + a_2 S_d^2 \\ a''_1 = (1 - S_d)\{a_1 + 2a_2 S_d\} \\ a''_2 = a_2 (1 - S_d)^2 \\ b''_0 = b_0 + b_1 S_d + b_2 S_d^2 \\ b''_1 = (1 - S_d)\{b_1 + 2b_2 S_d\} \\ b''_2 = b_2 (1 - S_d)^2 \\ h'' = h(1 - S_d) \end{cases} \quad (2\text{-}24)$$

As stated above, a curve can be divided into a curve $C_1$ and a curve $C_2$ at a dividing point $P_m$ providing the curve length variable $S=S_d$ on a three-dimensional clothoid curve $C_0$.

(1-5) Characteristics of the Three-Dimensional Clothoid Curve:

(a) Continuity of the Curve:

In the case of a single clothoid curve (i.e., a clothoid curve represented by the same parameters), pitch angles and yaw angles made by its tangential directions are given by quadratic expressions with a curve length variable S, respectively. Thus it is guaranteed that normal directions obtained by applying differential coefficient of first order to the quadratic expressions and curvatures to be obtained by two-time differential to that are continuous with the respect to the curve length variable S. In other words, each one clothoid curve has normal lines and curvatures, which change continuously along the one clothoid curve. Accordingly a smooth and good quality curve can be obtained. In the case that two clothoid curves are mutually connected, it is sufficient to select parameters to permit tangential lines, normal lines, and curvatures to be continuous at their connecting point. This selection manner will produce a one smoothly connected line, called a clothoid curve group.

(b) Applicability:

Because the tangential directions of curves can be swung with changing two angles (pitch angle and yaw angle), an arbitrary three-dimensional curve can be produced in conformity with various conditions for various applications. Thus it is possible to provide a wide use spatial curves necessary for designing industrial products. In cases where an object moves at accelerated and decelerated speeds along a spatial curve, it is possible to work out a design such that changes in a binding force are smooth. In addition, changes in the curvature to the curve length can be designed properly, effective applicability can be achieved in various industrial fields, such as production of aesthetic design curves.

(c) Consistency with Geometric Curves:

Geometric curves, such as liner segments, circular arches, and screw curves, can be produced by giving zero to some of the clothoid parameters or giving particular functional relationships to some of the parameters. The curves to be produced in those ways are a kind of clothoid curves, so that they can be expressed in the format of clothoids.

Furthermore, by replacing either α or β at any time, a two-dimensional clothoid can be made. Thus, resources which have already been acquired concerning the two-dimensional clothoid can be utilized well.

That is, proper setting of α or β makes it possible to express individual curves, such as circular arches and liner segments, including the already known two-dimensional clothoid. Such respective curves can be expressed by using the expressions having the same format as that for expressing the three-dimensional clothoid curve, thereby simplifying the computation procedures.

(d) Good Perspective:

In mathematizing free curves using the conventional interpolation techniques including the spline interpolation, it is frequent that the whole shape or a local shape is difficult to understand. In contrast, for using the three-dimensional clothoid, it is possible to imagine each of a pitch angle and a yaw angle, with the result that the whole shape can be grasped in a relatively easier manner.

In addition, on completion of expressing a curve as a clothoid curve, the line lengths, tangential directions, curvatures thereof have been known. Thus, unlike the conventional interpolation techniques, there is no need for new computation. Namely, correspondingly to the parameters S for a curve, the tangential lines, normal lines, and the curvature of the curve can be obtained in a direct manner, as shown in Expressions in (1-7), (2-10) and (2-12).

(e) Easiness of Motion Control:

The main variable of a curve is the length s or the normalized length S, and the equation of this curve is given by a natural equation with regard to the length. Hence, by defining the length s as a function of the time t, an arbitrary characteristic of motion, which is for example an accelerated and decelerated motion, can be given. By employing motion curves having good characteristics, which have conventionally been used for cams, processing operations can be made faster. The length s is given as a value in the existing Cartesian space and velocity and acceleration are calculated in tangential directions, resulting in that it is not necessary to synthesize values given every axis, unlike the conventional interpolation method. Additionally, the curvature can be calculated with easiness, whereby a centrifugal acceleration of an object in motion can be obtained with easiness. Thus control can be conducted depending on motion trajectories.

2. Interpolation Method Using a Three-Dimensional Clothoid Curve:

(2-1) Mathematical Conditions with Smooth Connection:

A single three-dimensional clothoid curve has a limitation on expressing the shapes of curves. In this section, with employing the numerical control of motion of a machine tool as a main purpose, a plurality of three-dimensional clothoid curves (three-dimensional clothoid segments) are mutually connected for designing industrial products. Hereinafter, the interpolation that uses a three-dimensional curve is referred to as a three-dimensional clothoid interpolation and a group of curves to be produced by the interpolation is referred, as a whole, to as a three-dimensional clothoid curve, which is composed by a plurality of unit curves each referred to as a three-dimensional clothoid segment.

When two three-dimensional clothoid segments are smoothly connected at their end points, this results in a definition that their end positions, tangential lines and curvatures are continuously connected, respectively. Using the foregoing definition expressions, conditions for those connections can be described as below, in which the first three expressions show the continuity of positions, the next two expressions show the continuity of tangential lines, the next one expression shows the agreement of normal lines, and the last expression shows the continuity of curvatures.

[Numeral 36]

$$Px_i(1)=Px_{i+1}(0)$$
$$Py_i(1)=Py_{i+1}(0)$$
$$Pz_i(1)=Pz_{i+1}(0)$$
$$\alpha_i(1)=\alpha_{i+1}(0)$$
$$\beta_i(1)=\beta_{i+1}(0)$$
$$\tan\gamma_i(1)=\tan\gamma_{i+1}(0)$$
$$\kappa_i(1)=\kappa_{i+1}(0) \quad (3\text{-}1)$$

These expressions provide sufficient conditions for achieving the continuity of tangential lines, normal lines, curvatures, and α and β at connecting points, and in some cases, these conditions are too strict to be applied. By taking such conditions into consideration, those conditions can be changed so as to meet the conditions in an original viewpoint, and the changed expressions are as follows.

[Numeral 37]

$$Px_i(1)=Px_{i+1}(0)$$
$$Py_i(1)=Py_{i+1}(0)$$
$$Pz_i(1)=Pz_{i+1}(0)$$
$$\cos[\alpha_i(1)-\alpha_{i+1}(0)]=1$$
$$\cos[\beta_i(1)-\beta_{i+1}(0)]=1$$
$$\tan\gamma_i(1)=\tan\gamma_{i+1}(0)$$
$$\kappa_i(1)=\kappa_{i+1}(0) \quad (3\text{-}2)$$

Further, when a relationship of

[Numeral 38]

$$\cos[\alpha_i(1)-\alpha_{i+1}(0)]=1$$

is taken into account,

[Numeral 39]

$$\tan\gamma_i(1)=\tan\gamma_{i+1}(0)$$

is replaced by the following conditions.

[Numeral 40]

$$\tan\gamma_i(1) = \tan\gamma_{i+1}(0)$$
$$\frac{\alpha'_i(1)}{\beta'_i(1)\cos\alpha_i(1)} = \frac{\alpha'_{i+1}(0)}{\beta'_{i+1}(0)\cos\alpha_{i+1}(0)}$$
$$\therefore \alpha'_i(1)\beta'_{i+1}(0) = \alpha'_{i+1}(0)\beta'_i(1)$$

As a result, it is understood that satisfying the following conditions leads to achievement of the object.

[Numeral 41]

$$Px_i(1)=Px_{i+1}(0)$$
$$Py_i(1)=Py_{i+1}(0)$$

$$Pz_i(1)=Pz_{i+1}(0)$$

$$\cos[\alpha_i(1)-\alpha_{i+1}(0)]=1$$

$$\cos[\beta_i(1)-\alpha_{i+1}(0)]=1$$

$$\alpha'_i(1)\beta'_{i+1}(0)=\alpha'_{i+1}(0)\beta'_i(1)$$

$$\kappa_i(1)=\kappa_{i+1}(0) \qquad (3\text{-}3)$$

In Expression (3-3), the first three expressions show the continuity of positions, the next two expressions show the continuity of tangential directions, the next one expression shows the agreement of normal lines, and the last expression show the continuity of curvatures, respectively. To perform a $G^2$-continuous interpolation, it is required that two three-dimensional clothoid curves should meet the seven conditional expressions in Expression (3-3) at their end points.

Figure 8:
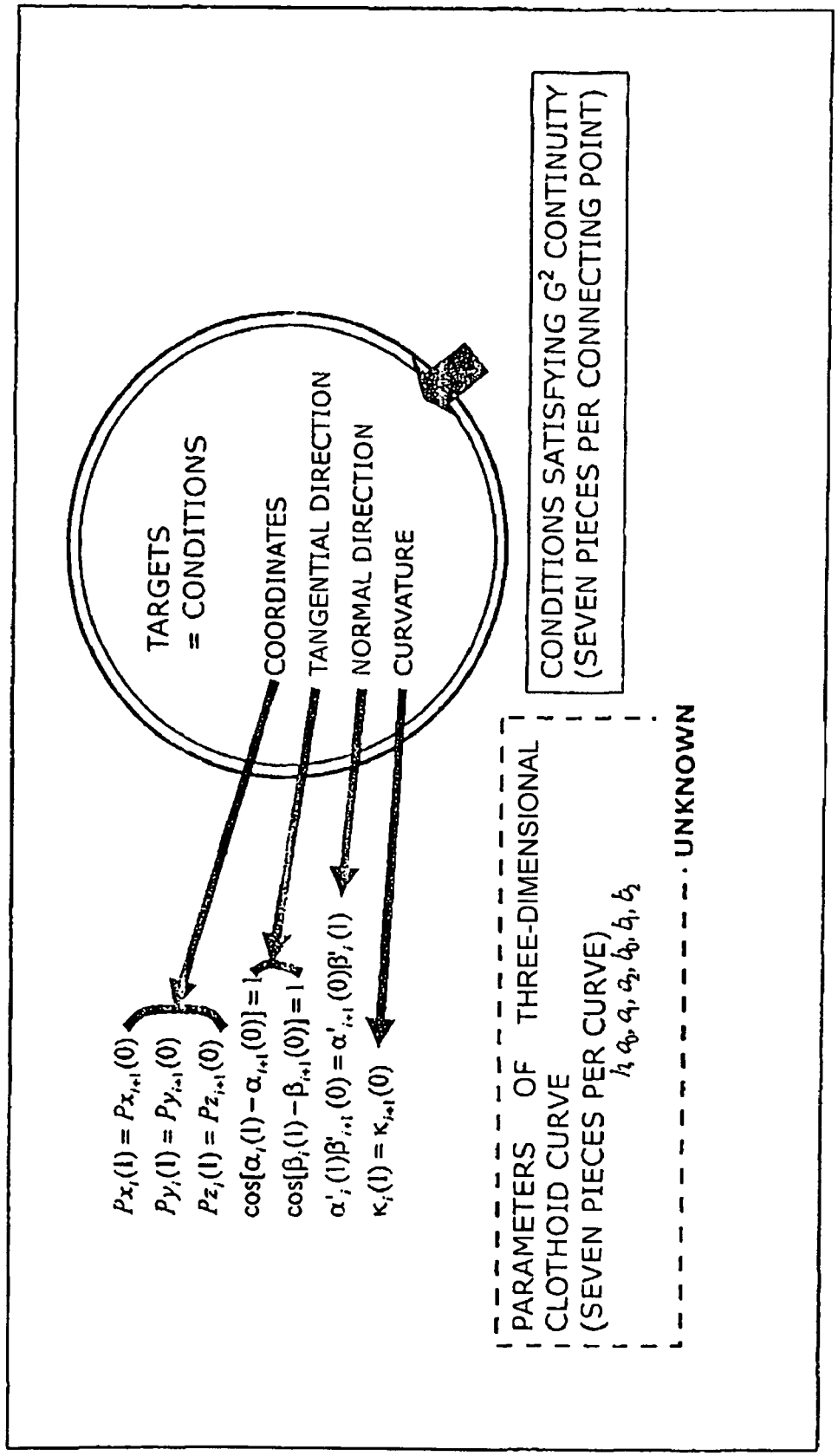
FIG. 8 is an illustration explaining conditions for G2-continuous interpolation.

The $G^2$ continuity (G stands for the acronym of Geometry) will now be complemented. FIG. 8 illustrates conditions required for the $G^2$-continuous interpolation.

$G^0$ continuity is that two three-dimensional clothoid curves positionally agree with each other at their end points, $G^1$ continuity is that tangential directions of those agree with each other, and $G^2$ continuity is that osculating planes (normal lines) and curvatures respectively agree with each other. In Table 1 shown below, comparison will now be made between $C^0$-$C^2$ continuity used by spline curves and $G^0$-$G^2$ continuity used in clothoid curves according to the present invention.

TABLE 1

| | |
|---|---|
| $C^0$: positions | $G^0$: positions |
| $C^1$: the primary differential coefficients | $G^1$: tangential directions |
| $C^2$: the secondary differential coefficients | $G^2$: osculating planes (normal lines) and curvatures |

In terms of consideration of the continuity of two three-dimensional clothoid curves, the interpolation conditions are made more stricter as the continuity degrees advance from $C^0$ to $C^1$, and to $C^2$ and from $G^0$ to $G^1$, and to $G^2$. Though the $C^1$ continuity requires that the size and direction of the tangential lines agree with each other, it is sufficient that the $G^1$ continuity requires the agreement of only the tangential directions. For smoothly connecting the tangential lines between two three-dimensional clothoid curves, it is preferable to create the conditional expressions on the $G^1$ continuity. Creating conditional expressions based on the $C^1$ continuity, like the spline curves, results in too strict conditions, because the creation inevitably involves with a condition that the sizes of tangential lines should be made agree with each other, even though such a condition has no geometrical relationship. Creating the conditional expressions on the $G^1$ continuity is advantageous in that the amplitudes of primary differential coefficients are set to any values freely.

Figure 9:
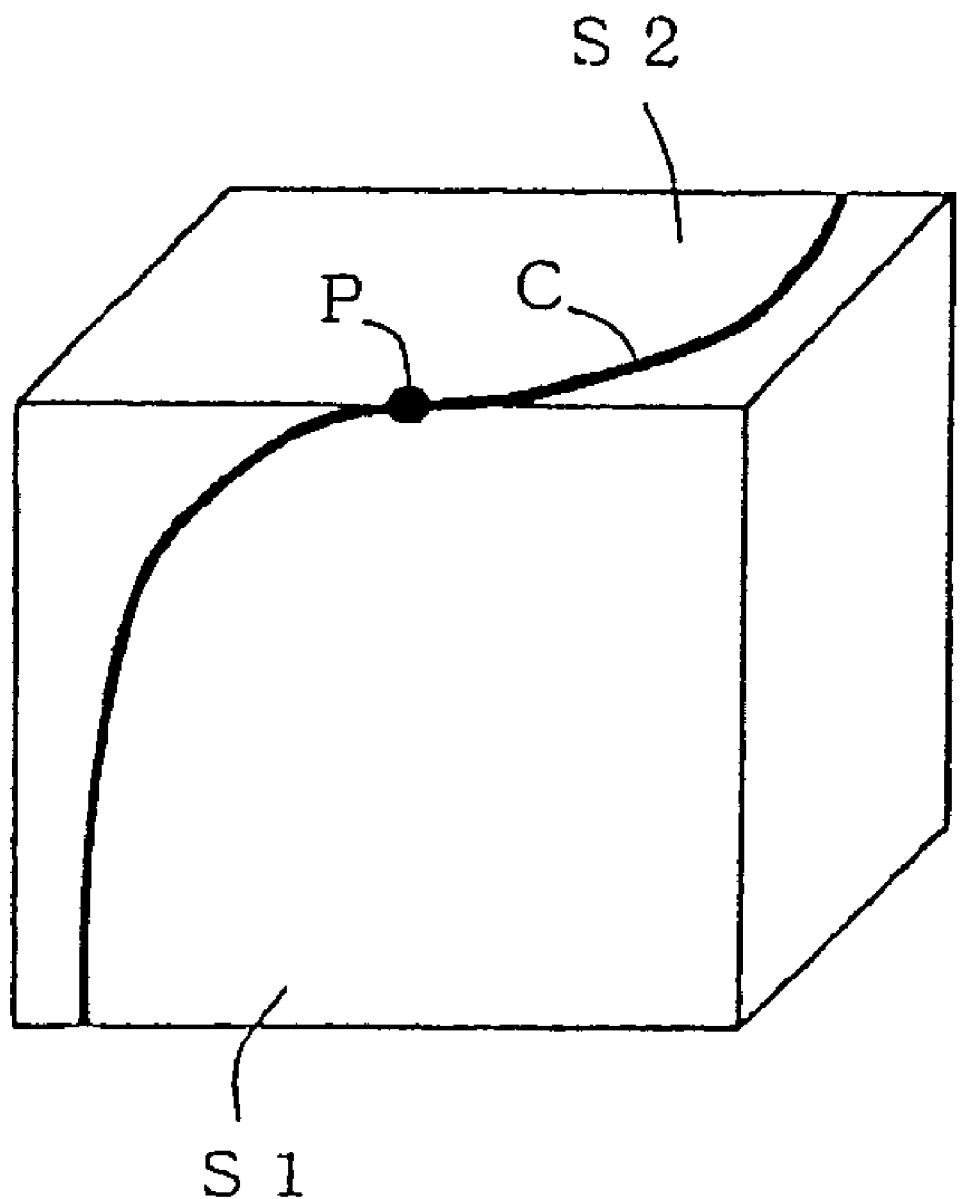
FIG. 9 conceptually shows osculating planes.

In the $G^2$ continuity, osculating planes (i.e., normal lines) are made to agree with each other. The osculating planes, as shown in FIG. 9, mean planes S1 and S2 in which a curve C is included locally. In FIG. 9, an example is shown where the osculating planes S1 and S2 are discontinuous at a point P, regardless of the continuity of the tangential directions kept at the point P. When consideration is given to the continuity of three-dimensional curves, the matter which comes next to the agreement of tangential directions is an agreement of osculating planes. A discussion of curvatures should be based on an agreement of the osculating planes, and if not so, the discussion is meaningless. Making the osculating planes agree with each other should precede making the curvatures agree with each other. A condition satisfying the $G^2$ continuity is that the coordinates, tangential directions, osculating planes (normal lines), and curvatures are respectively made to agree with each other between two three-dimensional curves.

(2-2) Practical Computation Procedures:

There are provided two types of computation procedures.

(a) By setting the parameters h, $\alpha$ and $\beta$ of a curve to produce a single three-dimensional clothoid curve, the parameters of the next three-dimensional curve are decided to meet Expression (3-3) at an end point of the produced curve. In this way, three-dimensional clothoid curves connectable in turn in a smooth manner can be produced. Using these computation procedures, the curve parameters can be computed easily, and a solution on this computation way is called a sequential solution. This computation way enables the production of a variety of shapes of curves in an easier manner, but it is impossible to explicitly specify the connecting points through which the curves pass.

(b) In order that a group of points specified in advance may compose the connecting points of curves, three-dimensional clothoid curves can be connected to each other. In this section, there is provided an example in which a short clothoid curve (clothoid segment) is produced for every span in a row of points given discretely. In such a case, the computation procedures to decide the curve parameters so as to meet Expression (3-3) is more complicated than that described in the foregoing item (a), requiring a repeated convergence computation. This computation involves a series of inverse procedures that the curve parameters are decided from connecting conditions, so that a resultant solution is called an inverse solution.

Concerning the inverse solution in the above item (b), how to compute will now be detailed. A question to be solved is formulated as follows:

Unknown Parameters: Curve Parameters

Constraint Conditions: Expression (3-3) or Part Thereof

Depending on questions to be solved, the number of constraint conditions is changed and curve parameters of which number corresponds to the number of constraint conditions are set as unknown parameters. For example, in the case that the continuity of curvatures is not demanded, part of the curve parameters can be adjusted freely. Alternatively, when it is demanded those curvatures are kept continuous but tangential directions are specified, it is required that the number of three-dimensional clothoid curves to be used for the interpolation be increased by division so as to increase the number of corresponding unknown curve parameters.

In order to converge the above repeated convergence computation in a stabilized manner, the computation should be cogitated. To avoid the computation from diverging for speeding up the convergence, setting optimum initial values of the unknown values is effective. For doing so, it is effective to gain initial values for the repeated convergence computation by generating a simpler interpolation curve (for example, such a curve is a linear spline curve), which still meets constraint conditions concerning given connecting points and/or others, estimating the shape of the curve to obtain curve parameters of three-dimensional clothoid curves, and using such curve parameters as the initial values.

Figure 10:
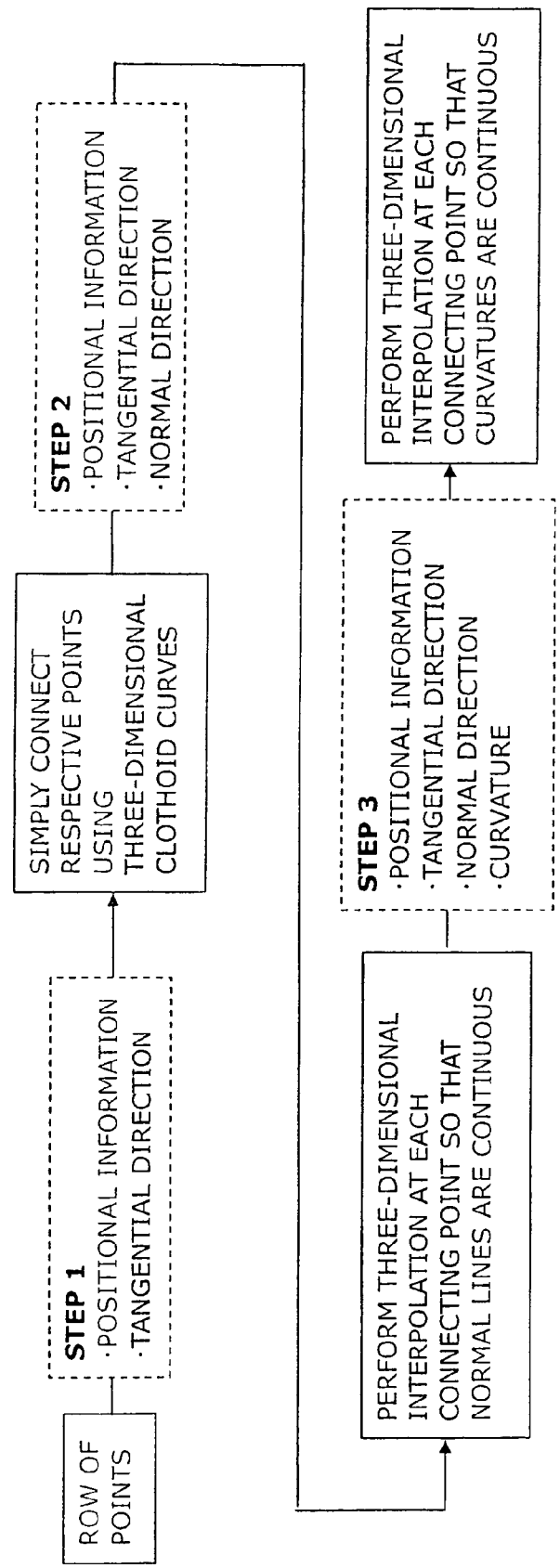
FIG. 10 is a flowchart outlining the procedures necessary for clothoid interpolation.

Alternatively, without requiring constraint conditions to be met at once, a technique by which conditional expressions are increased sequentially is still effective as the way for gaining a solution with stability. For example, the procedures for generating a curve are divided into the following three steps, which are executed in sequence. In the first step, interpolation is made such that pieces of positional information agree with each other and also tangential directions agree with each other. In the second step, interpolation is made to allow normal lines to agree with each other, and in the third step, interpolation is also made to allow curvatures to agree with each other. This technique is outlined as a flowchart in FIG. 10. The necessary three-dimensional clothoid curve equations and the definition equations for the tangential lines, normal lines, and curvatures thereof have already been explained.

(2-3) Embodiment of the Interpolation Method Using the Three-Dimensional Clothoid Curve:

(a) Flow of Interpolation Method:

One embodiment of the technique with which a three-dimensional clothoid curve is used to smoothly interpolate each interval between points which are part of a row of points will now be detailed.

Figure 11:
FIG. 11 is a flowchart outlining the procedures for the clothoid interpolation satisfying conditions of the G2 continuity.

The basic flow of the three-dimensional clothoid interpolation is such that the respective parameters of a three-dimensional clothoid segment connecting two points being interpolated are set to unknowns, and a curve is produced by obtaining a solution with the Newton-Rapson method, in which the solution meeting the conditions that points being interpolated are passed strictly and the $G^2$ continuity is kept. This way is outlined as a flowchart in FIG. 11. The $G^2$ continuity is that, with regard to two three-dimensional clothoid curves, the potions, tangential directions, normal directions, and curvatures at end points of the curves agree with each other parameter by parameter.

(b) Conditions of $G^2$-Continuous Interpolation:

Practical conditions which allow points being interpolated to be passed strictly and the $G^2$ continuity is kept will now be described.

Figure 12:
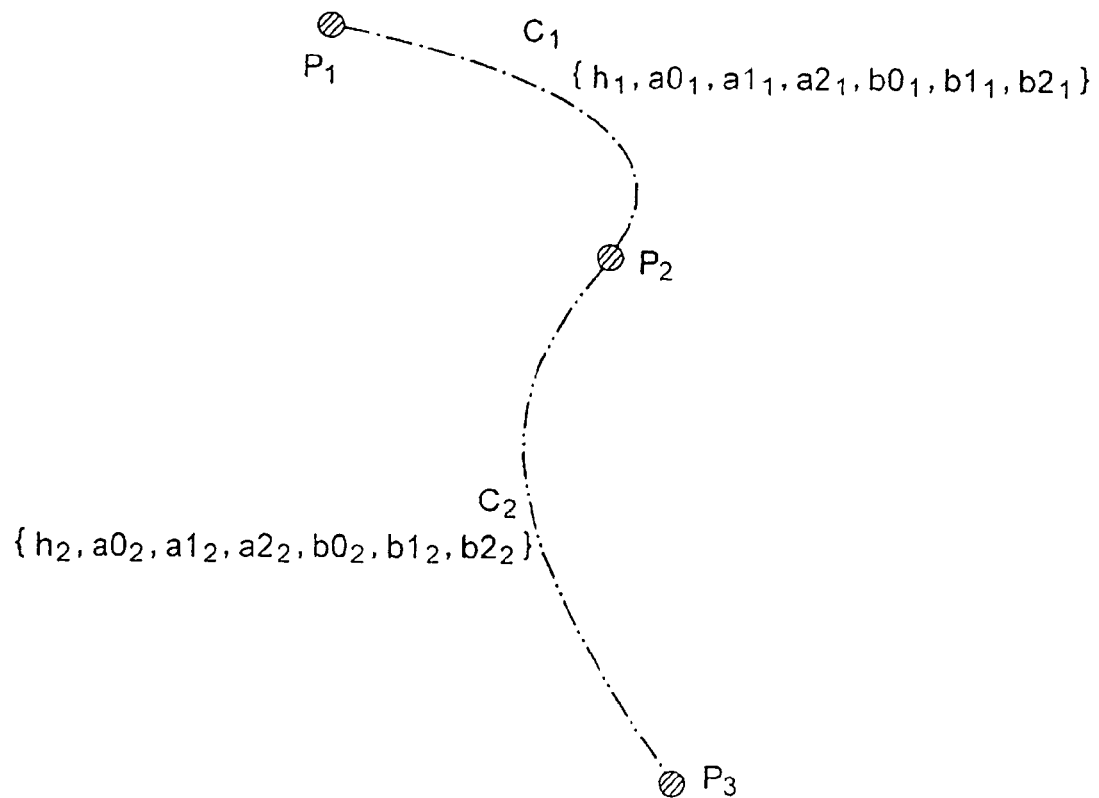
FIG. 12 is a view showing three-dimensional clothoid interpolation for points P1, P2 and P3.

Now assume a simple case in which there are three points $P_1=\{Px_1, Py_1, Pz_1\}$, $P_2=\{Px_2, Py_2, Pz_2\}$, and $P_3=\{Px_3, Py_3, Pz_3\}$ and these points are interpolated by using three-dimensional clothoid segments. FIG. 12 shows the three-dimensional clothoid interpolation between among the points $P_1$, $P_2$ and $P_3$. When a curve connecting the points $P_1$ and $P_2$ is denoted as a curve $C_1$ and a curve connecting the points $P_2$ and $P_3$ is denoted as a curve $C_2$, the unknowns in this case are 14 pieces consisting of the parameters from the curve $C_1$, which are $a0_1$, $a1_1$, $a2_1$, $b0_1$, $b1_1$, $b2_1$, and $h_1$, and the parameters from the curve $C_2$, which are $a0_2$, $a1_2$, $a2_2$, $b0_2$, $b1_2$, $b2_2$, and $h_2$. The subscripts to each character, which will appear in the following description, correspond to the subscript to each curve.

Here, the conditions which allow points being interpolated to be passed strictly and the $G^2$ continuity is kept will now be considered. First of all, when the condition which allows points being interpolated to be passed strictly at a starting point is necessarily achieved at the time when the starting point is specified, so that the interpolation condition is not necessary in this situation, which is clear from the definition of the three-dimensional clothoid curve. At the connecting point P1, seven interpolation conditions consisting of three positional conditions, two tangential vector conditions, and two conditions (about the magnitude and direction) regarding to equations showing the curvature continuity are needed. Further, as to the end point, three positional conditions are necessary at the point P2. Thus, the conditional expressions total to 10. However, the number of unknowns is 14, compared to only the ten conditional expressions, so that the unknowns cannot be solved. In order to overcome this difficulty, the study according to the present invention was conducted on condition that tangential line vectors were given at both end points to increase the number of conditions at each end point by two so that the conditional expressions and the unknowns are equal in number to each other. In addition, deciding a tangential direction at the starting point enables $a0_1$ and $b0_1$ to be obtained from the equation defining the tangential direction. Considering this, $a0_1$ and $b0_1$ were not treated as unknowns. In the following, consideration will now be given to each condition.

First, the positional conditions will now be considered. In this case, three Expressions (4-1), (4-2) and (4-3) are established (hereinafter, "i" represents non-negative integers smaller than 3).

[Numeral 42]

$$Px_i + h_i \int_0^1 \cos(a0_i + a1_i S + a2_i S^2)\cos(b0_i + b1_i S + b2_i S^2)\,dS - Px_{i+1} = 0 \quad (4\text{-}1)$$

$$Py_i + h_i \int_0^1 \cos(a0_i + a1_i S + a2_i S^2)\sin(b0_i + b1_i S + b2_i S^2)\,dS - Py_{i+1} = 0 \quad (4\text{-}2)$$

$$Pz_i + h_i \int_0^1 (-\sin(a0_i + a1_i S + a2_i S^2))\,dS - Pz_{i+1} = 0 \quad (4\text{-}3)$$

The, conditions concerning the tangential directions will now be considered. In this case, two Expressions (4-4) and (4-5) are established.

[Numeral 43]

$$\cos(a0_i + a1_i + a2_i - a0_{i+1}) = 1 \quad (4\text{-}4)$$

$$\cos(b0_i + b1_i + b2_i - b0_{i+1}) = 1 \quad (4\text{-}5)$$

Concerning the curvature k, the following Expression (4-6) will now be established.

[Numeral 44]

$$\kappa_i(1) - \kappa_{i+1}(0) = 0 \quad (4\text{-}6)$$

Finally, the normal direction vector n will now be considered. The normal vector n of a three-dimensional clothoid curve is expressed by Expression (2-10).

Like the decision of the tangential vector u of a three-dimensional clothoid curve, the rotation will now be used for considering the normal vector n. Assume that an initial tangential direction is (1, 0, 0) and an initial normal direction is expressed as (0, cos γ, −sin γ) in which γ is a constant. When this initial normal direction is rotated in the same way as that for tangential lines, the normal line n is expresses as shown in Expression (4-7).

[Numeral 45]

$$n(S) = \begin{bmatrix} \cos\beta(S) & -\sin\beta(S) & 0 \\ \sin\beta(S) & \cos\beta(S) & 0 \\ 0 & 0 & 1 \end{bmatrix} \begin{bmatrix} \cos\alpha(S) & 0 & \sin\alpha(S) \\ 0 & 1 & 0 \\ -\sin\alpha(S) & 0 & \cos\alpha(S) \end{bmatrix} \begin{Bmatrix} 0 \\ \cos\gamma \\ -\sin\gamma \end{Bmatrix} \quad (4\text{-}7)$$

$$= \begin{Bmatrix} -\sin\gamma\cos\beta(S)\sin\alpha(S) - \cos\gamma\sin\beta(S) \\ -\sin\gamma\sin\beta(S)\sin\alpha(S) + \cos\gamma\cos\beta(S) \\ -\sin\gamma\cos\alpha(S) \end{Bmatrix}$$

Making a comparison between Expressions (2-10) and (4-7) reveals that sin γ and cos γ correspond to Expression (4-8).

[Numeral 46]

$$\sin\gamma = \frac{\alpha'(S)}{\sqrt{\alpha'(S)^2 + \beta'(S)^2 \cos^2\alpha(S)}} \quad (4\text{-}8)$$

$$\cos\gamma = \frac{\beta'(S)\cos\alpha(S)}{\sqrt{\alpha'(S)^2 + \beta'(S)^2 \cos^2\alpha(S)}}$$

That is, it is found from Expression (4-8) that the continuity of tan γ is enough for accomplishing the continuity of the normal lines at a connecting point involving in the three-dimensional clothoid interpolation.

[Numeral 47]

$$\tan\gamma = \frac{\alpha'(S)}{\beta'(S)\cos\alpha(S)} \quad (4\text{-}9)$$

In short, it is understood that the condition for holding the normal lines continuous is expressed by Expression (4-10).

[Numeral 48]

$$\tan\gamma_i(1) = \tan\gamma_{i+1}(0) \quad (4\text{-}10)$$

Further, when taking the equation of

[Numeral 49]

$$\cos[\alpha_i(1) - \alpha_{i+1}(0)] = 1 \quad (4\text{-}11)$$

into account, the conditional Expression (4-10) can be replaced by the following conditional Expression (4-12). Specifically, the condition for the continuous normal lines is expressed by Expression (4-12).

[Numeral 50]

$$\alpha'_i(1)\beta'_{i+1}(0) = \alpha'_{i+1}(0)\beta'_i(1) \quad (4\text{-}12)$$

In summary, it is found that the conditions for keeping not only a strict passage through points being interpolated but also the $G^2$ continuity at each connecting point are expressed by Expression (4-13). Also, as for the starting and end points, it is still enough to select some of the conditions listed in Expression (4-13).

[Numeral 51]

$$Px_i(1) = Px_{i+1}(0)$$

$$Py_i(1) = Py_{i+1}(0)$$

$$Pz_i(1) = Pz_{i+1}(0)$$

$$\cos[\alpha_i(1) - \alpha_{i+1}(0)] = 1$$

$$\cos[\beta_i(1) - \beta_{i+1}(0)] = 1$$

$$\alpha'_i(1)\beta'_{i+1}(0) = \alpha'_{i+1}(0)\beta'_i(1)$$

$$\kappa_i(1) = \kappa_{i+1}(0) \quad (4\text{-}13)$$

As described, it is revealed that concerning the conditional expressions for the twelve unknowns $a1_1$, $a2_1$, $b1_1$, $b2_1$, $h_1$, $a0_2$, $a1_2$, $a2_2$, $b0_2$, $b1_2$, $b2_2$, and $h_2$, twelve conditional expressions are established as follows (, in which $\alpha_3$ and $\beta_3$ represent rotation angles in the tangential direction at the point $P_3$).

[Numeral 52]

$$Px_1(1) = Px_2(0)$$

$$Py_1(1) = Py_2(0)$$

$$Pz_1(1) = Pz_2(0)$$

$$\cos[\alpha_1(1) - \alpha_2(0)] = 1$$

$$\cos[\beta_1(1) - \beta_2(0)] = 1$$

$$\alpha'_1(1)\beta'_2(0) = \alpha'_2(0)\beta'_1(1)$$

$$\kappa_1(1) = \kappa_2(0)$$

$$Px_2(1) = Px_3(0)$$

$$Py_2(1) = Py_3(0)$$

$$Pz_2(1) = Pz_3(0)$$

$$\cos[\alpha_2(1) - \alpha_3] = 1$$

$$\cos[\beta_2(1) - \beta_3] = 1 \quad (4\text{-}14)$$

Since the twelve equations can be given for the twelve unknowns, a solution can be obtained. Practically, the Newton-Rapson method is used to solve such equations to have a solution.

Additionally, for the general case in which a row of n-piece points is subjected to the interpolation, it is sufficient that the non-negative integer i described above is expanded to values fulfilling i<n. The remaining matter concerns the number of unknowns and the number of conditional expressions.

For example, suppose that there is a row of "n−1"-piece points and N-piece unknowns and N-piece relational expressions are established. In this situation, when one point is added to the point row, the parameters is thus subjected to an increase thereof such that the seven clothoid parameters $a0_n$, $a1_n$, $a2_n$, $b0_n$, $b1_n$, $b2_n$, and $h_n$ of the three-dimensional clothoid segments $P_{n-1}$ and $P_n$ are added. On the other hand, the conditional expressions are subjected to an increase of a total of seven equations consisting of three equations for positions at the point $P_{n-1}$, two equations for a tangential vector, and two equations (about the magnitude and direction) representing a condition for keeping the curvatures continuous with respect to the point $P_{n-1}$, because the connecting points increase by one.

In the case of n=3, it is known that the unknowns and the relational expressions are 12 in number respectively, so that for n≧3, the number of unknowns is 7(n−2)+5 and the number of equations to be established is also 7(n−2)+5. In this way, the unknowns and the conditions relating to the unknowns are the same in number. Thus, in the case of a row of n-piece free points, the similar method to that applied to three points can be used to calculate a solution. The Newton-Rapson method that utilizes the fact that the relationships on Expressions (4-15) and (4-16) are established between the unknowns and the conditional expressions was used as a solving method for a solution. (The conditions are denoted by F, the unknowns by u, and an error Jacobian matrix by J.)

[Numeral 53]

$$\Delta F = [J]\Delta u \quad (4\text{-}15)$$

$$\Delta u = [J]^{-1}\Delta F \quad (4\text{-}16)$$

Accordingly it is understood that a row of n-piece points can be subjected to the three-dimensional clothoid interpolation in such a manner that points being interpolated are passed strictly and the $G^2$ continuity is kept.

(c) Decision of Initial Values:

The Newton-Rapson method needs to have adequate initial values to start the search for a solution. Although the initial values may be given based on any method, how to give the initial values will now be exemplified in the following.

Figure 13:
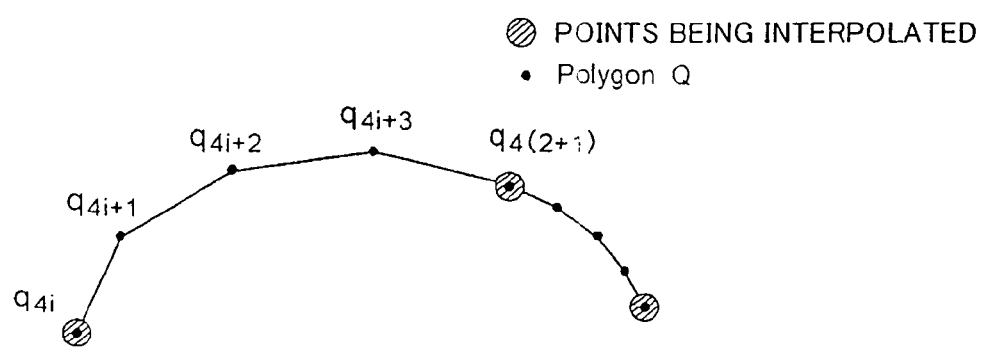
FIG. 13 is a view showing 3D Discrete Clothoid Splines of r=4.

The interpolation requires that initial values of respective unknowns be decided from a row of points. In the present study, a polygon having four apexes between points of a row of points being interpolated, which is a simple form of a polygon Q composed of 3D Discrete Clothoid Splines made by Li at al., was produced, and the polygon Q was used to compute the initial values for decision thereof. Those 3D Discrete Clothoid Splines have a characteristic that the splines strictly pass points being interpolated and the curvatures change smoothly along the distance moved from a start point. In the present specification, the initial values for the three-dimensional clothoid interpolation are decided through computation with the use of a polygon Q made on 3D Discrete Clothoid Splines of r=4, as shown in FIG. 13.

Figure 14:
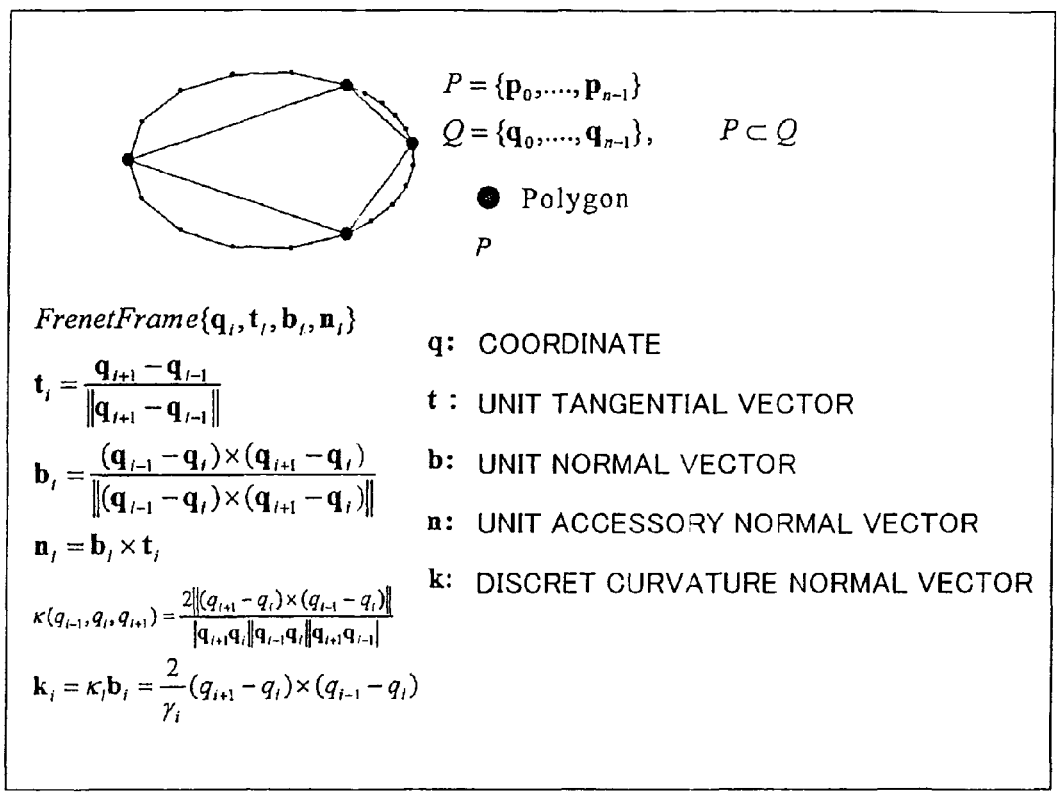
FIG. 14 is an illustration for the 3D Discrete Clothoid Splines.

The 3D Discrete Clothoid Splines will now be complemented as follows. As shown in FIG. 14, a polygon P of which apexes are a row of points being interpolated is first made, and new apexes are insertedly placed, the same number of pieces, between the apexes of the polygon Q so that a polygon Q meeting P⊂Q is made. Here suppose that the number of apexes of the polygon P is n-pieces. This supposition results in that the polygon Q has apexes whose number is "rn" pieces if the polygon is closed, but "r(n−1)+1" pieces if the polygon is open. Hereinafter, each apex is denoted by qi, in which the subscript is a serial number starting from the starting point. A vector k is decided at each apex, where the vector has, as a direction, a binormal vector b and has, as a magnitude, a curvature κ.

In cases where Expression (4-17), which is listed later, requiring the apexes be equidistant therebetween is met and a condition is established which is the nearest to a specific condition where the curvature is proportional to the distance moved from the starting point (i.e., the function shown in Expression (4-18) listed later is minimized), a certain polygon Q is made, which is called 3D Discrete Clothoid Splines.

[Numeral 54]

$$|q_{i-1}q_i| = |q_{i+1}q_i|, (q_i \notin P) \quad (4\text{-}17)$$

$$\sum_{i=1}^{r-1} \|\Delta^2 k_{ir+1}\|^2, i = \{0\ldots n-1\}, \Delta^2 k_i = k_{i-1} - 2k_i + k_{i+1} \quad (4\text{-}18)$$

In the case of the 3D Discrete Clothoid Splines, the frenet frame of each apex is already obtained, so that the parameters $a_0$ and $b_0$ are computed based on the unit tangential vector t thereof. This tangential vector t has already been known at the time of obtaining the polygon Q, and both the vector t and the expressions of the tangential lines to the three-dimensional clothoid curve are used to obtain the tangential rotation angles α and β at the respective apexes of the polygon Q. Thus the initial values to be given to the parameters $a_0$ and $b_0$ of each curve are decided. In a three-dimensional clothoid segment starting from the stating point, the values thereof is given as the initial values.

[Numeral 55]

$$u = \begin{Bmatrix} \cos\beta\cos\alpha \\ \sin\beta\cos\alpha \\ -\sin\alpha \end{Bmatrix} \quad (4\text{-}19)$$

In addition, when taking it into consideration the fact that 3D Discrete Clothoid Splines allows its apexes to be aligned at equal distances, the point $q_{4i+1}$ in FIG. 13 can be approximately estimated as having a curve length variable S of ¼. In the similar way to this, the point $q_{4(i+1)-1}$ can be approximately estimated as having a curve length variable S of ¾. In consideration of these values together with the expression of α of a three-dimensional clothoid curve, the following Expression (4-20) is established.

[Numeral 56]

$$\begin{cases} a0_{4i} + \frac{1}{4}a1_{4i} + \left(\frac{1}{4}\right)^2 a2_{4i} = a0_{4i+1} \\ a0_{4i} + \frac{3}{4}a1_{4i} + \left(\frac{3}{4}\right)^2 a2_{4i} = a0_{4(i+1)-1} \end{cases} \quad (4\text{-}20)$$

Since this expression is a two-dimensional simultaneous equation to which unknowns are $a1_{4i}$ and $a2_{4i}$, this equation is solved to obtain the initial values of the parameters $a_1$ and $a_2$. Similarly to this, the initial values of the parameters $b_1$ and $b_2$ can be decided.

The remaining unknown to be handled in this section is the curve length h, of which initial value is computed using the expression of the curvature of the three-dimensional clothoid curve. The curvature of a three-dimensional curve is expressed by Expression (4-21).

[Numeral 57]

$$\kappa = \frac{\sqrt{\alpha'^2 + \beta'^2\cos^2\alpha}}{h} \quad (4\text{-}21)$$

This expression is deformed into Expression (4-22), which gives a decided initial value.

[Numeral 58]

$$h_{4i} = \frac{\sqrt{(a1_{4i} + 2a2_{4i})^2 + (b1_{4i} + 2b2_{4i})^2\cos^2(a0_{4i} + a1_{4i} + a2_{4i})}}{\kappa_{4(i+1)}} \quad (4\text{-}22)$$

As described above, the initial values of the seven three-dimensional clothoid parameters can be decided. Using these decided initial values under the condition that the $G^2$ continuity described in the item (b) is still held, respective approximate values of the parameters of each curve were obtained by the Newton-Rapson method. The resultant parameters are used to produce three-dimensional clothoid segments, and each interval between any two points was subjected to interpolation on the three-dimensional clothoid curves.

Figure 15:
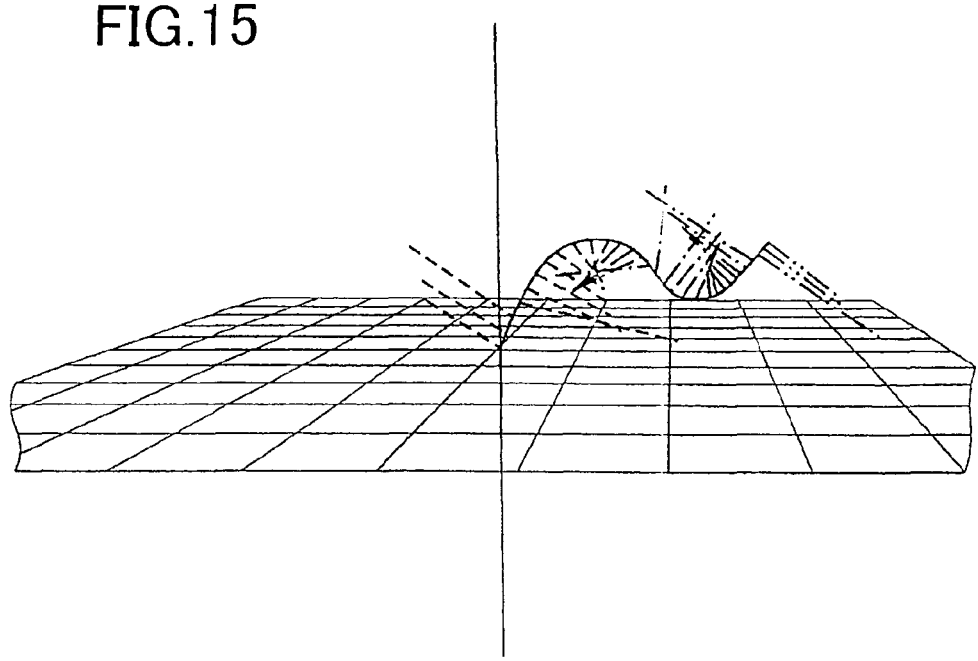
FIG. 15 is a perspective view of a three-dimensional Clothoid curve produced with the interpolation.

(d) Example of Interpolation:

An example of the interpolation will now be described, in which the foregoing technique was actually applied to the three-dimensional clothoid interpolation directed to four points of (0.0, 0.0, 0.0), (2.0, 2.0, 2.0), (4.0, 0.0, 1.0), and (5.0, 0.0, 2.0). A perspective view of the three-dimensional clothoid curve produced by the interpolation is illustrated in FIG. 15. FIG. 15 shows a solid line curve representing the three-dimensional clothoid curve and linear lines depicted by broken lines, dashed lines and chain double-dashed lines representing patterns of changes in the curvature radius in which, at each point on the curve, an amplitude is shown in the logarithm (curvature radius+logarithm natural e) and a direction is shown in the normal vector.

Figure 16:
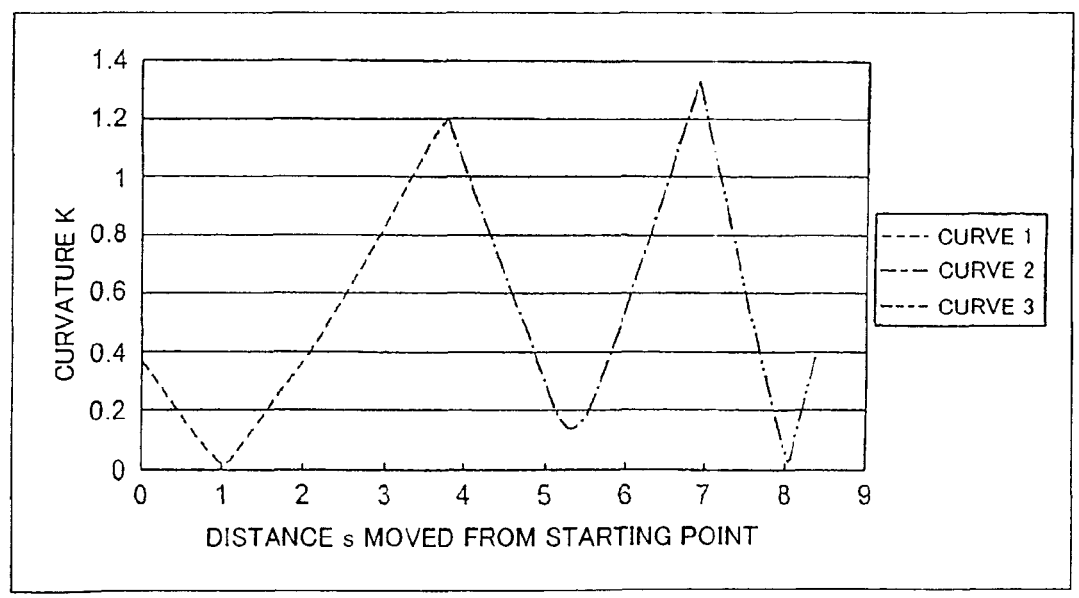
FIG. 16 is a graph showing changes in curvature, in which an axis of abscissas represents a moved distance and an axis of ordinate represents the curvature.

Furthermore, Table 2 represents the parameters of each curve, while Table 3 lists shifts of the coordinate, tangential line, normal line and curvature at each connecting point. These tables reveal that a three-dimensional clothoid curve which meets the requirement for the $G^2$ continuity at each connecting point was produced. FIG. 16 is a graph showing changes in the curvature, in which the axis of abscissas represents the distance moved from the starting point and the axis of ordinate represents the curvature.

TABLE 2

Parameters of each three-dimensional clothoid segment

Curve 1 (curvature radius change pattern: broken lines)

$\alpha = -0.657549 - 1.05303S + 1.84584S^2$
$\beta = 1.03297 + 1.29172S - 2.55118S^2$
$h = 3.82679$
$P_0 = (0.0, 0.0, 0.0)$ Curve 2 (curvature radius change pattern: dashed lines)

$\alpha = 0.135559 + 2.18537S - 2.69871S^2$
$\beta = -0.226655 - 3.15603S + 3.03298S^2$
$h = 3.16932$
$P_0 = (2.0, 2.0, 2.0)$ Curve 3 (curvature radius change pattern: chain double-dashed lines)

$\alpha = -0.377569 - 1.45922S + 0.984945S^2$
$\beta = -0.349942 + 1.32198S - 0.873267S^2$
$h = 1.43987$
$P_0 = (4.0, 0.0, 1.0)$

TABLE 3

Shifts of coordinate, tangential line, normal line and curvature at each connecting point Connecting point at which curves 1 and 2 are mutually connected

| | |
|---|---|
| Coord: | $(1.16 \times 10^{-5}, 2.00 \times 10^{-6}, 3.82 \times 10^{-6})$ |
| Tvector: | $(7.59 \times 10^{-5}, 1.50 \times 10^{-5}, 2.95 \times 10^{-4})$ |
| Nvector: | $(2.93 \times 10^{-4}, 9.19 \times 10^{-5}, -7.57 \times 10^{-6})$ |
| Curvature: | $3.06 \times 10^{-7}$ |

Connecting point at which curves 2 and 3 are mutually connected

| | |
|---|---|
| Coord: | $(-4.33 \times 10^{-6}, -1.64 \times 10^{-6}, 1.11 \times 10^{-5})$ |
| Tvector: | $(2.06 \times 10^{-6}, 2.33 \times 10^{-4}, 1.97 \times 10^{-4})$ |
| Nvector: | $(3.30 \times 10^{-4}, 1.19 \times 10^{-5}, -3.23 \times 10^{-5})$ |
| Curvature: | $5.96 \times 10^{-6}$ |

(2-4) G2-Continuous Three-Dimensional Clothoid Interpolation in Consideration of Control of Value at Each of Both Ends:

(a) Interpolation Conditions and Unknowns:

As stated in section 2-3, if a curve is open and there are n-piece points being interpolated, the row of points can be interpolated three-dimensionally with the help of n−1 piece curves. If it is requested that the curves pass each point in a strict manner, the unknowns of each three-dimensional clothoid segment are seven in number, which are $a_0$, $a_1$, $a_2$, $b_0$, $b_1$, $b_2$, and h. Accordingly, as a whole, the number of unknowns is 7(n−1) pieces. Meanwhile, the number of conditional expressions total to 7(n−2)+3 pieces, because there are seven unknowns concerning the coordinates, tangential line, normal line and curvatures at every "n−2"-piece connecting points, and there are three coordinates at the end point. In the technique in section 2-3, tangential vectors at each of the starting and end points were added to the conditional expressions so that the conditions increase by four, whereby the conditional expressions and the unknowns were made to be mutually equal in number.

In cases the tangential line, normal line and curvatures are controlled at each of the starting and end points and the interpolation is conducted with the $G^2$ continuity still held, the conditions increase by 2 pieces, which are with respect to the normal line and curvatures at each of the starting and end points, that is, an increase of a total of 4 pieces, compared to the case where the control of tangential lines is made at both ends. In short, the number of conditional expressions totals to 7n−3 pieces. In this case, the unknowns are smaller in number than the conditions, the Newton-Rapson method is unavailable for a solution. Hence any technique has to be used to increase the number of unknowns.

In the present case, the above difficulty was overcome by newly inserting points being interpolated so that the unknowns and the conditional expressions became equal in number to each other. For instance, the number of unknowns is larger than the conditional expressions by 4, two new points are inserted and two of the coordinates at the perspective points are handled as unknowns.

In this case, since the connecting points increase by 2, the conditions increase by a total of 14-piece ones, which consist of 7-piece conditions (coordinates, tangential line, normal line and curvatures) for each connecting point. On the other hand, the unknowns increase by 2 which is for each three-dimensional clothoid segment, the unknowns increase as a whole by 14 pieces, which is composed of 7 pieces of $a_0$, $a_1$, $a_2$, $b_0$, $b_1$, $b_2$, and h for each segment. In this case, the number of points included in the row of points is n+2 pieces, the whole unknowns are 7(n+1) pieces and the whole conditional expressions are 7(n+1)+4 pieces. Further, when it is supposed that two of the coordinates of the newly inserted points are treated as unknowns, the number of unknowns results in an increase of 4. As a result, the unknowns and the conditional expressions are both 7(n+2)−3 in number, whereby a solution of the unknowns can be obtained. In this way, inserting new points makes it possible to perform the interpolation with the respective points passed strictly, the $G^2$ continuity held, and the tangential lines, normal lines, and curvatures at both end points controlled.

Furthermore, a generalized case will be discussed. In the case of interpolating a row of n-piece points in a state where m-piece items are controlled at both end points, consideration is given to the number of points to be inserted and to the number of coordinates to be treated as the unknowns at each inserted point. As state previously, as long as a curve is open, a row of points can be interpolated with the help of "n−1"-piece curves. If the respective points are subjected to a strict passage, each three-dimensional clothoid segment has the seven unknowns of $a_0$, $a_1$, $a_2$, $b_0$, $b_1$, $b_2$, and h, so that the unknowns total to 7(n−1) pieces. In contrast, the conditional expressions are as a whole 7(n−2)+3 pieces, because, every "n−2"-piece connecting points, there exist seven expressions on the coordinates, tangential line, normal line, and curvatures and three coordinates at an end point. Thus, the conditional expressions are less in number than the unknowns by 4.

That is, this means that items to be controlled at both end points are 4 or more. In the following description, assumption is made such that m is a nonnegative integer of 4 or more and k is a nonnegative integer of 2 or more, under which how to make both the conditional expressions and the unknowns equal in number to each other in response to inserting new points will now be described.

(i) In the case of m=2k:

In cases where it is required that a total of "m=2k"-piece items be controlled at both end points, the number of unknowns is 7(n−1) pieces in total and the number of conditional expressions is 7(n−1)−4+2k pieces in total. In this situation, the number of excessive conditional expressions is 2k−4 pieces. When it is considered that "k−2"-piece points are newly inserted, the number of three-dimensional clothoid segments increases by k−2 pieces, while the connecting points increase by k−2 pieces as well. As a result, the unknowns total up to 7 (n+k−3) pieces and the conditional expressions total up to 7(n+k−3)−4+2k pieces. In the case that, of the values at the coordinates of each of the newly inserted points, two values (for example, x and y) are treated as being unknowns, the unknowns total up to 7(n+k−3)+2(k−2) pieces and the conditional expressions total up to 7 (n+k−3)+2 (k−2) pieces, permitting both the unknowns and the conditional expressions to be equal in number to each other.

(ii) In the case of m=2k+1:

In cases where it is required that a total of "m=2k+1"-piece items be controlled at both end points, the number of unknowns is 7 (n−1) pieces in total and the number of conditional expressions is 7(n−1)+2k−3 pieces in total. In this situation, the number of excessive conditional expressions is 2k−3 pieces. When it is considered that "k−1"-piece points are newly inserted, the number of three-dimensional clothoid segments increases by k−1 pieces, while the connecting points increase by k−1 pieces as well. As a result, the unknowns total up to 7 (n+k−2) pieces and the conditional expressions total up to 7(n+k−2)−3+2k pieces. In the case that, of the values at the coordinates of each of the newly inserted points, two values (for example, x and y) are treated as being unknowns, the unknowns total up to 7 (n+k−2)+2 (k−2) pieces and the conditional expressions total up to 7(n+k−2)+2k−3 pieces, resulting in that the conditional expressions are larger than the unknowns by one. Thus, for the case of m=2k+1, at one of the inserted points, only one of the values of the coordinate at the one point is treated as being an unknown. This countermeasure allows the unknowns to be 7(n+k−2)+2(k−2) pieces in total and the conditional expressions to also be 7(n+k−2)+2(k−2) pieces in total, whereby the unknowns and the conditional expressions are equal in number to each other.

As stated above, in the present method, in accordance with the number of conditional expressions to be added, the number of values chosen as unknowns from the coordinates of inserted points can be adjusted. This makes it possible that, in various occasions in which parameters, such as a tangential rotation angle α, which are other than the tangential line, normal line and curvatures, are controlled, the unknowns can be equalized in number to the conditional expressions. In consequence, from a theoretical viewpoint, each value at both end points can be controlled. Table 4 is provided to show, as a summary, correspondences among the items to be controlled, the number of unknowns and the number of conditional expressions.

TABLE 4

Items to be controlled at both end points, the number of unknowns, and the number of conditional expressions in n-point interpolation

Figure 17:
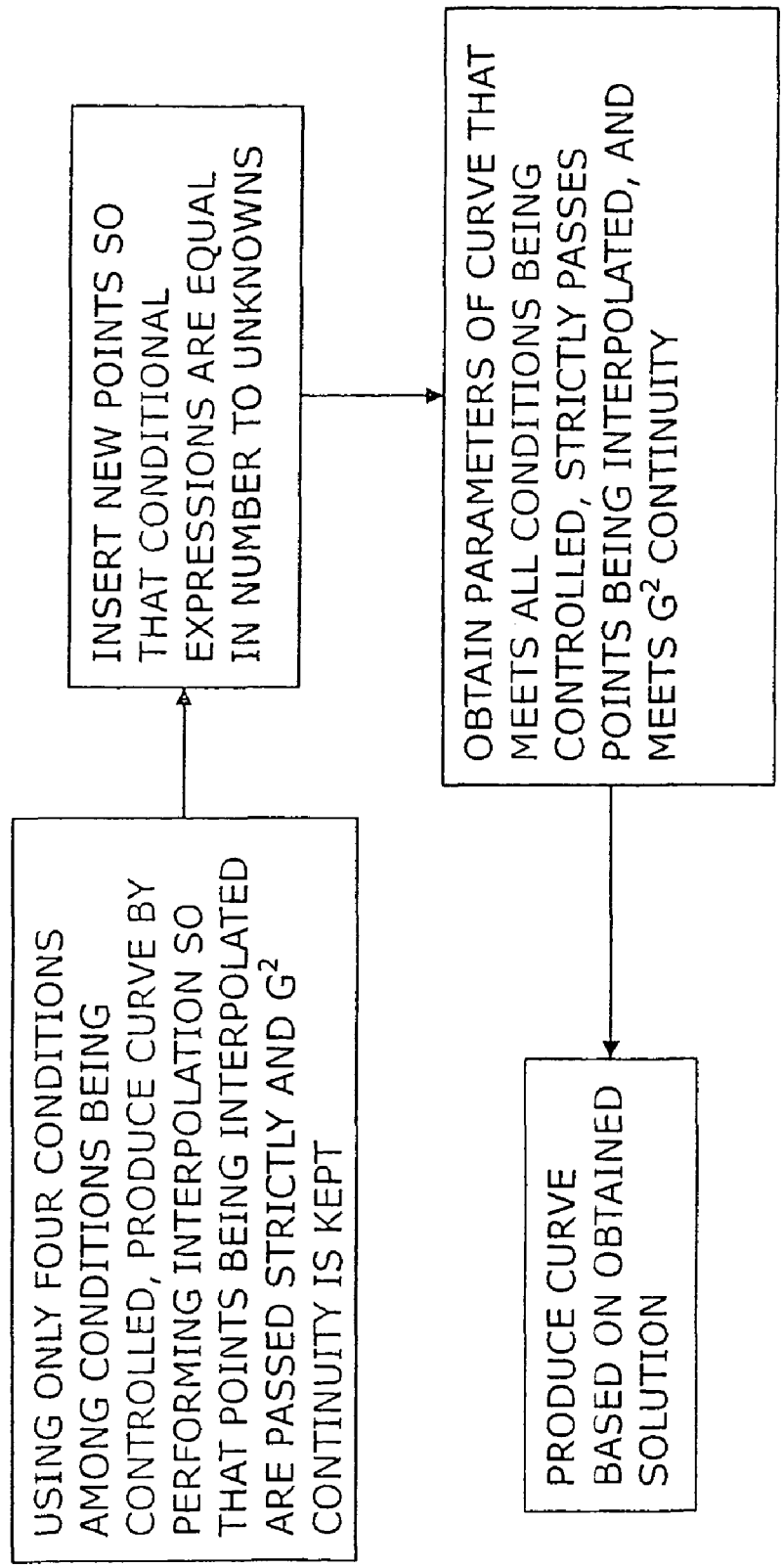
FIG. 17 is a flowchart outlining the three-dimensional clothoid interpolation that controls values at both end points.
Figure 18:
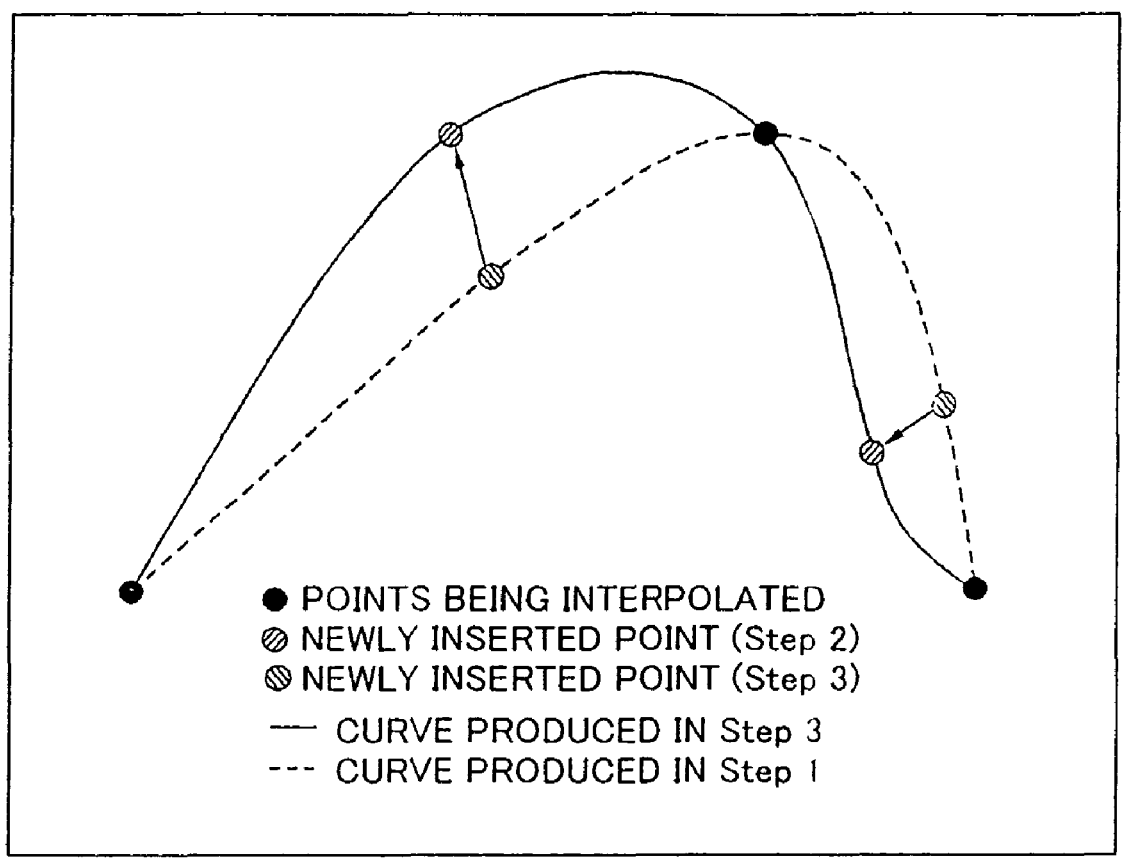
FIG. 18 is an outlined view explaining the three-dimensional clothoid interpolation that controls values at both end points.

| the number of items to be controlled | the number of conditional expressions to be increased | the number of points to be inserted | the number of coordinates being handled as unknowns per point | the number of unknowns to be increased |
|---|---|---|---|---|
| 4 | 0 | 0 | 0 | 0 |
| 5 | 1 | 1 | 1 | 1 |
| 6 | 2 | 1 | 2 | 2 |
| 7 | 3 | 2 | 1-piece point: 2 1-piece point: 1 | 3 |
| . | | | | |
| . | | | | |
| . | | | | |
| 2k | 2k − 4 | k − 2 | "k − 2"-piece points: 2 | 2k − 4 |
| 2k + 1 | 2k − 3 | k − 1 | "k − 2"-piece points: 2 1-piece point: 1 | 2k − 3 | k: nonnegative integer of 2 or more (b) Technique:

As shown in FIGS. 17 and 18, the interpolation that uses a three-dimensional clothoid controlling each value at the starting and end points is carried out on the following operation flow.

Step 1) Of the conditions to be controlled, only 4 conditions are used to perform interpolation in which points being interpolated are subjected to a strict passage and the $G^2$ continuity is kept, with a curve produced on the interpolated results.

Step 2) New points are inserted into the produced curve, before the conditional expressions and the unknowns are subjected to adjustment in terms of the number thereof.

Step 3) The curve parameters in Step 1 are used as initial values for obtaining approximate values of parameters of each curve by the Newton-Rapson method, the approximate values meeting the conditions to be targeted.

Each Step will now be complemented as follows. First, at Step 1, a curve is produced by using the technique described in section 2-3, if the tangential direction is required to be controlled. Even if the tangential direction is not required to be controlled, initial values, which are the same as ones produced by the technique described in section 2-3, are used as initial values required for obtaining the parameters of the curve.

Then at Step 2, new points are inserted into the curve for adjustment conditions and unknowns in terms of their numbers. During this step, the number of points to be newly inserted in an interval between points being interpolated is required to be one or less, whenever possible. Further, the point to be inserted is at a central position of each three-dimensional clothoid segment produced at Step 1 and inserted to connect points being interpolated. Still further, the insertion of the points to be inserted is carried out in sequence from both ends of the curve. In other words, the first inserted points are a central point between the starting point and the adjacent point located next thereto and a further central point between the end point and the adjacent point located next thereto.

Lastly, the description will now be given to Step 3, wherein it is required to decide initial values for the Newton-Rapson method employed in this step. For this purpose, the curve into which the new points have been inserted is divided using the technique, described in section 1-4, for dividing the three-dimensional clothoid curve, and the initial values are decided based on respective values of the divided curves. If the curve will not be subjected to the insertion of any points, the as-produced initial values of the curve, produced in Step 1, are used. In this way, the initial values given to the respective parameters of the curve in Step 3 have been decided. Using these initial values, the computation on the Newton-Rapson method is conducted to provide parameters, and these parameters are used to produce a three-dimensional clothoid curve. That is, the interpolation has been made by the three-dimensional clothoid curve that fulfills the targeted conditions in each interval between points.

(c) Example of Interpolation:

An actual example of the three-dimensional clothoid interpolation will now be given by Table 5, in which conditions are listed as to tangential lines, normal lines, and curvatures at both ends so that control should be conducted to meet those conditions. The sequential numbers are given to the points being interpolated which are to be subject to a strict passage of the line, so that the points $P_1$, $P_2$ and $P_3$ are denoted.

TABLE 5

Conditions for respective points being interpolated and starting and end points

| | coordinate | unit tangential vector | principal normal vector | curvature |
| --- | --- | --- | --- | --- |
| $P_1$ | (0, 0, 0) | (Cos(θ), Sin(θ), 0) | (−Sin(θ), Cos(θ), 0) | 0.2 |
| $P_2$ | (4, −4, −4) | — | — | — |
| $P_3$ | (8, −4, −5) | (1, 0, 0) | (0, −1, 0) | 0.2 |

*θ = −(π/6)

Figure 19:
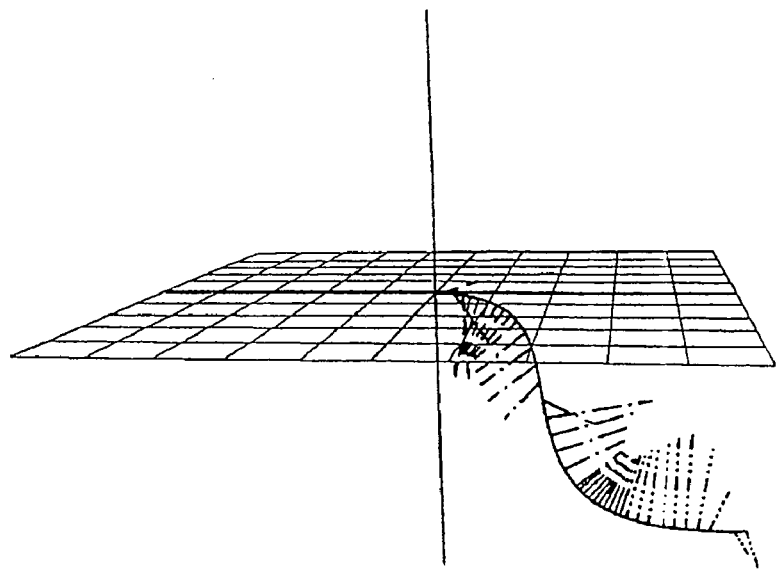
FIG. 19 is a perspective view showing results interpolated actually.
Figure 20:
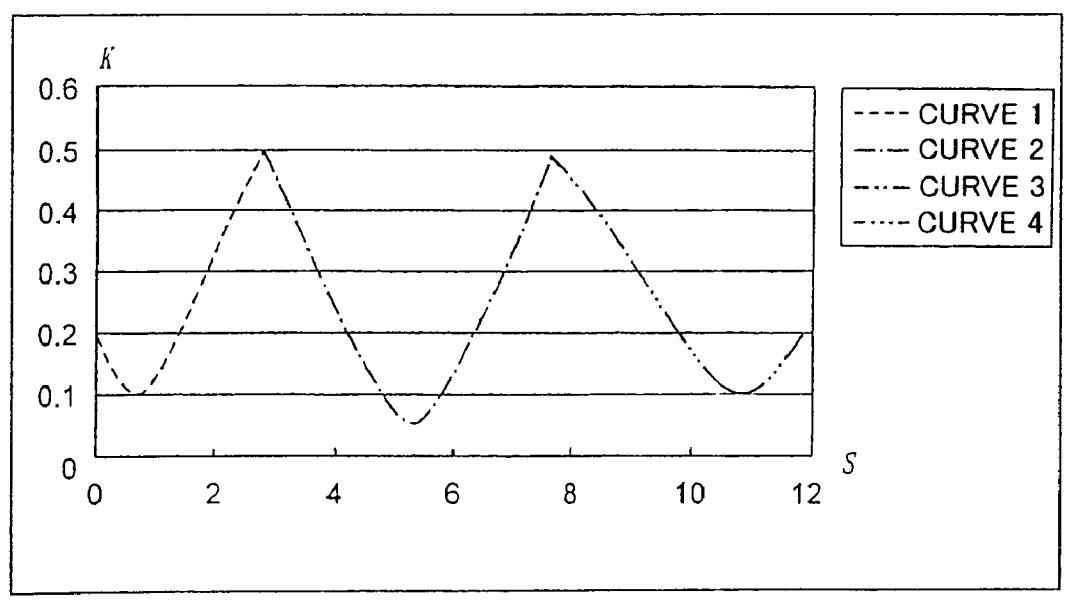
FIG. 20 is a graph showing the relationship between a distance moved from a starting point of each curve and a curvature of each curve.

Under the conditions listed above, the interpolation was conducted actually, which resulted in the figure shown in FIG. 19. A solid-line curve represents a three-dimensional clothoid curve, while curves depicted by broken lines, dashed lines, chain double-dashed lines, and chain triple-dashed lines represent patterns of changes in the curvature radius of each curve. FIG. 20 shows a graph representing the relationship between the distance moved from the starting point of each curve and its curvature, the graph being shown depending on the types of lines shown in FIG. 19. As understood from Table 6, the produced curves meet the given conditions.

(d) Control of Value at Central Point:

The technique described in item (d) has enabled both the control of each value at both end points and the $G^2$-continuous interpolation. In the next place, the control of values at each central point, not both end points, will now be described.

Figure 21:
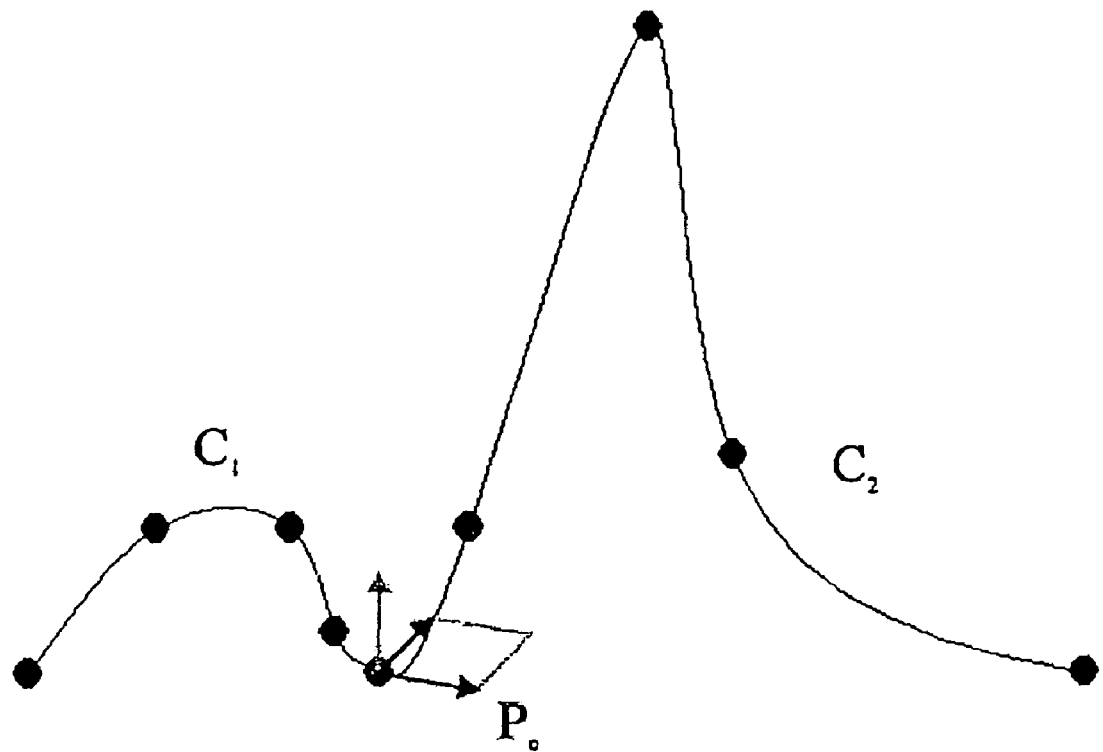
FIG. 21 is a view showing control of values at a middle point.

For example, for interpolating a row of points shown in FIG. 21, an assumption is made such that both a tangential line and a normal line are controlled at a central point $P_c$. It should be noted that the technique described so far will not be available to the control of values at central points. A solution to this difficulty is to divide the row of points into two ones so that the control can be effective.

Specifically, the interpolation should be done on individual divided curves $C_1$ and $C_2$ with a central point $P_c$ therebetween, without interpolating the whole row of points at once. In such a case, the central point $P_c$ is to be located at an end of each divided curve, with the result that the technique described in item (b) can be used for the control.

Therefore, as described above, a curve division is done at a point that represents values to be controlled, the control for interpolation is applied to values at both ends of the divided curve, and the resultant curves are connected to each other. This way theoretically enables the three-dimensional clothoid interpolation which controls the tangential line, normal line, and curvature at each point.

Figure 22:
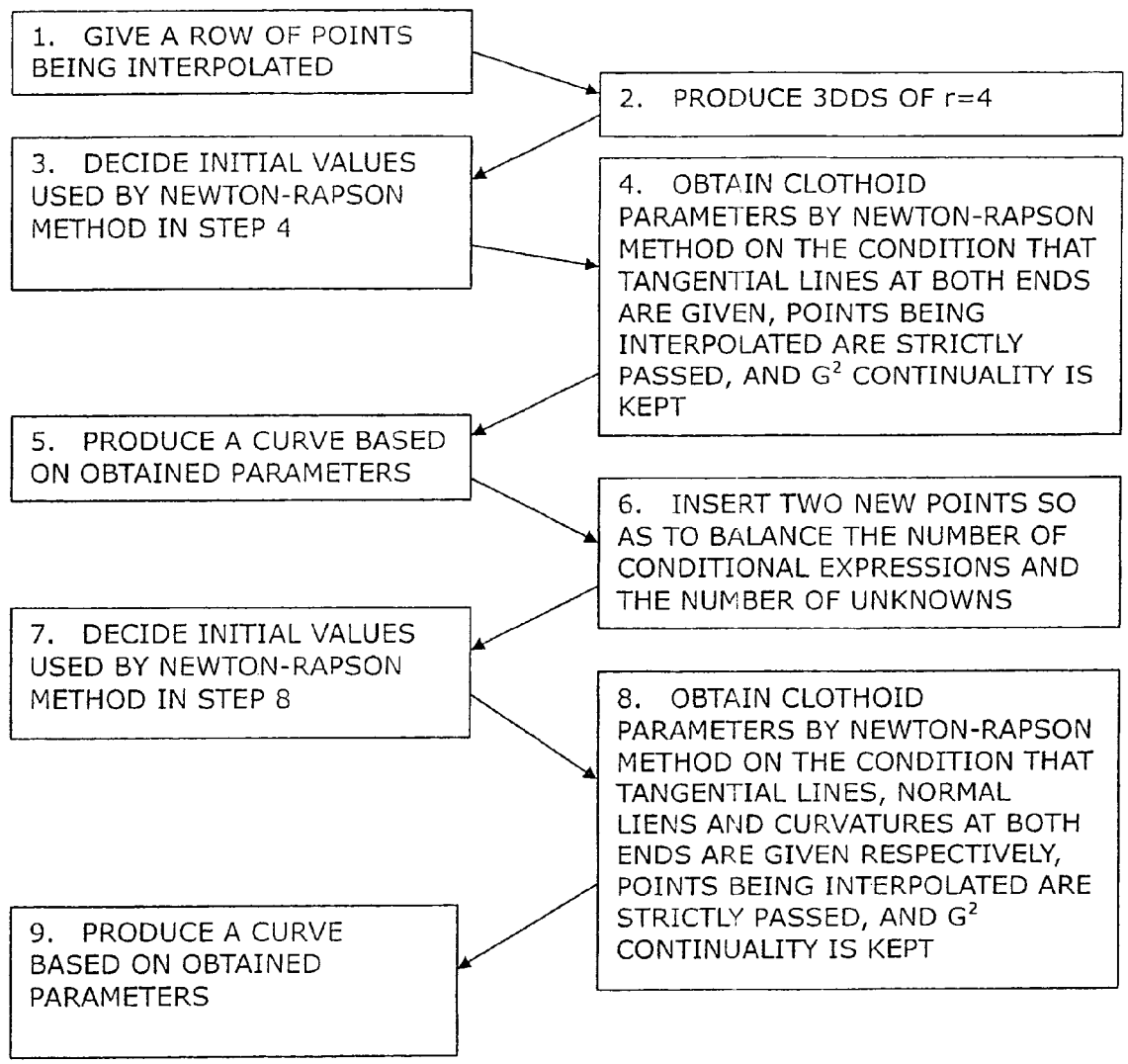
FIG. 22 is a flowchart outlining an interpolation method that uses three-dimensional clothoids controlling each value at a starting point and an end point.

(2-5) Three-Dimensional Clothoid Interpolation Controlling Tangential Line, Normal Line, and Curvature at Both Ends:

(a) Flow of Technique:

An interpolation technique using the three-dimensional clothoid to control each value at staring and end points is performed by a procedure flow shown in FIG. 22, which is as follows. In the following, the description will be given along such a flow.

(b-1) Giving Points Being Interpolated:

In an example in this section, three points {0.0, 0.0, 0.0}, {5.0, 5.0, 10.0}, {10.0, 10.0, 5.0} were designed in the three-dimensional space. The other conditions, such as tangential liens, normal lines, and curvatures given to each point, are summarized in Table 7.

TABLE 6

Differences between given values and produced values as to tangential lines, normal lines, and curvatures at starting and end points of each produced curve

| | | coordinate | unit tangential vector | principal normal vector | curvature |
| --- | --- | --- | --- | --- | --- |
| $P_1$ | given value | {0.0, 0.0, 0.0} | {0.8660, −0.5, 0.0} | {0.5, 0.8660, 0.0} | 0.20 |
| | value on produced curve | {0.0, 0.0, 0.0} | {0.8660, −0.5, 0.0} | {0.5000, 0.8660, 0.0} | 0.20 |
| | difference | {0.0, 0.0, 0.0} | {0.0, 0.0, 0.0} | {0.0, 0.0, 0.0} | 0 |
| $P_3$ | given value | {8.0, −4.0, −5.0} | {1.0, 0.0, 0.0} | {0.0, −1.0, 0.0} | 0.20 |
| | value on produced curve | {8.0, −4.0, −5.0} | {1.0, 0.0, 0.0} | {0.0, −1.0, 0.0} | 0.20 |
| | difference | {0.0, 0.0, 0.0} | {0.0, 0.0, 0.0} | {0.0, 0.0, 0.0} | 0 |

TABLE 7

Points being interpolated and conditions for parameters at starting and end points:

| coordinate | unit tangential vector | principal normal vector | curvature |
|---|---|---|---|
| $P_1$ (0.0, 0.0, 0.0) | {0.0, 1.0, 0.0} | {1.0, 0.0, 0.0} | 0.1 |
| $P_2$ (5.0, 5.0, 10.0) | — | — | — |
| $P_3$ (10.0, 10.0, 5.0) | {1.0, 0.0, 0.0} | {0.0, −1.0, 0.0} | 0.1 |

Figure 23:
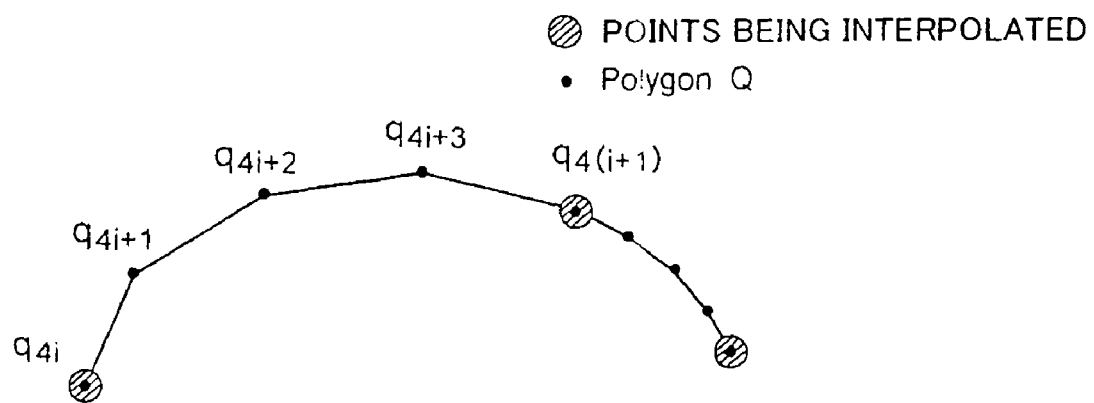
FIG. 23 is a view showing 3D Discrete Clothoid Splines of r=4.
Figure 24:
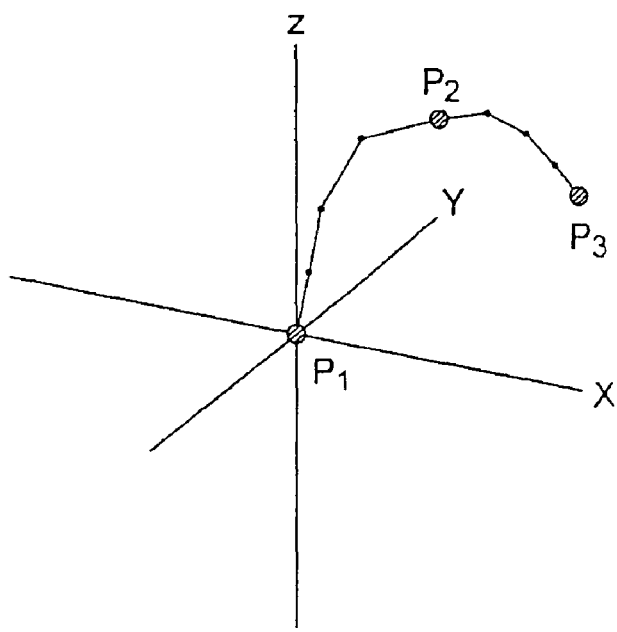
FIG. 24 is a view showing a produced polygon.

(b-2) Production of 3D DCS of r=4:

The Newton-Rapson method needs to have adequate initial values to start the search for a solution. The preparation for obtaining the initial values will now be performed. 3D Discrete Clothoid Splines, which is a preceding study to the present study according to the present application, is characterized in that points being interpolated is subjected to a strict passage and the curvature smoothly changes with changes in the distance moved from a starting point. Hence, in the present study, a polygon Q on 3D Discrete Clothoid Splines of r=4 is produced as shown in FIG. 23, and this polygon is used to compute and decide initial values for the three-dimensional clothoid interpolation. This polygon was actually produced from a row of points, which is shown in FIG. 24. The coordinates of the apexes of the produced polygon are listed in Table 8.

TABLE 8

Coordinates of apexes of produced polygon coordinates of apexes

| | coordinates of apexes |
|---|---|
| $P_1$ | {0.0, 0.0, 0.0} |
| | {0.4677, 0.4677, 3.1228} |
| | {0.9354, 0.9354, 6.2456} |
| | {2.3029, 2.3029, 9.4966} |
| $P_2$ | {5.0, 5.0, 10.0} |
| | {6.7095, 6.7095, 9.9244} |
| | {8.0655, 8.0655, 8.4732} |
| | {9.0327, 9.0327, 6.7366} |
| $P_3$ | {10.0, 10.0, 5.0} |

(b-3) Decision of Initial Values:

Obtaining a solution on the Newton-Rapson method involves decision of initial values of respective unknowns. According to the present technique, the polygon Q produced in section b-2 is used to obtain approximate values of the respective unknowns, and those approximate values are subjected to the decision of the initial values. In the case of handling 3D Discrete Clothoid Splines, the frenet frame of each apex has already been acquired. Parameters $a_0$ and $b_0$ are thus obtained from the unit tangential vector t of the polygon Q produced in section b-2. This tangential vector t has already been known since the polygon Q was obtained, so that both this vector t and the expression for a tangential line of a three-dimensional clothoid curve are used to compute tangential rotation angles $\alpha$ and $\beta$. These angles allow the initial values of the parameters $a_0$ and $b_0$ of each curve to be decided. In addition, for a three-dimensional clothoid segment starting from a starting point, those angles provide initial values of the parameters.

$$u = \begin{Bmatrix} \cos\beta\cos\alpha \\ \sin\beta\cos\alpha \\ -\sin\alpha \end{Bmatrix}$$ [Numeral 59]

When it is taken into account that 3D Discrete Clothoid Splines provide apexes poisoning at equal distances, it can be approximated that the curve length variable S at a point $q_{4i+1}$ in FIG. 23 is ¼. Similarly to this, it can be approximated that the curve length variable S at a point $q_{4(i+1)-1}$ is ¾. In consideration of both the approximated variables and the expression concerning $\alpha$ of the three-dimensional clothoid curve, the following expression is realized.

$$\begin{cases} a0_{4i} + \frac{1}{4}a1_{4i} + \left(\frac{1}{4}\right)^2 a2_{4i} = a0_{4i+1} \\ a0_{4i} + \frac{3}{4}a1_{4i} + \left(\frac{3}{4}\right)^2 a2_{4i} = a0_{4(i+1)-1} \end{cases}$$ [Numeral 60]

Since this expression is a two-dimensional simultaneous equation to which unknowns are $a1_{4i}$ and $a2_{4i}$, this equation is solved to obtain the initial values of the parameters $a_1$ and $a_2$. Similarly to this, the initial values of the parameters $b_1$ and $b_2$ can be decided.

The remaining unknown is a curve length h, of which initial value is calculated by solving the expression defining the curvature of the three-dimensional clothoid curve. The curvature of the three-dimensional clothoid curve can be expressed by the following.

$$\kappa = \frac{\sqrt{\alpha'^2 + \beta'^2 \cos^2\alpha}}{h}$$ [Numeral 61]

This expression can be developed into the following, on which the initial value of h is decided.

$$h_{4i} = \frac{\sqrt{(a1_{4i} + 2a2_{4i})^2 + (b1_{4i} + 2b2_{4i})^2 \cos^2(a0_{4i} + a1_{4i} + a2_{4i})}}{\kappa_{4(i+1)}}$$ [Numeral 62]

As described, the initial values of the seven three-dimensional clothoid parameters can be decided.

The initial values actually obtained on the foregoing technique are listed in Table 9.

TABLE 9

| Initial values | | |
|---|---|---|
| curve connecting points $P_1$ and $P_2$ | $a_0$ | 0.0 (known) |
| | $a_1$ | −0.2684 |
| | $a_2$ | 1.0739 |
| | $b_0$ | π/2 (known) |
| | $b_1$ | 0.0 |
| | $b_2$ | 0.0 |
| | h | 12.7684 |
| curve connecting points $P_2$ and $P_3$ | $a_0$ | −0.1648 |
| | $a_1$ | 3.2061 |
| | $a_2$ | −2.6327 |
| | $b_0$ | 0.7853 |
| | $b_1$ | 0.0 |

TABLE 9-continued

| Initial values | |
|---|---|
| $b_2$ | 0.0 |
| h | 9.6752 |

(b-4) Three-Dimensional Interpolation with Strict Passage Through Respective Points and $G^2$ Continuity:

The initial values decided in section (b-3) are used to obtain approximate values of parameters of each curve by using the Newton-Rapson method, under the condition that the $G^2$ continuity is kept. Using the resultant parameters, three-dimensional clothoid segments are produced, and then each span between points in a row of points is interpolated with the three-dimensional clothoid curve.

Figure 25:
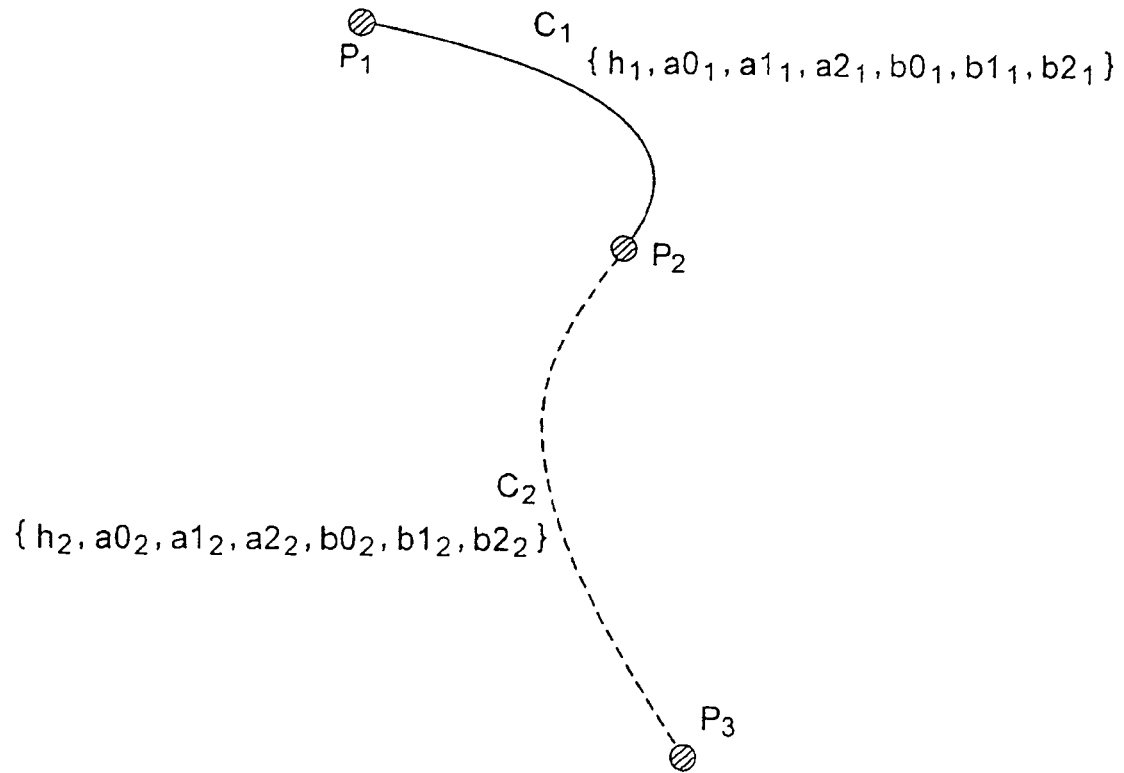
FIG. 25 is a view explaining the three-dimensional clothoid curve for respective points P1, P2 and P3.

In this three-dimensional interpolation for three points, practical conditions satisfying a strict passage through points being interpolated and the $G^2$ continuity will now be described. FIG. 25 shows the three-dimensional clothoid interpolation for points $P_1$, $P_2$ and $P_3$. A curve connecting the points $P_1$ and $P_2$ is denoted by a curve $C_1$, and a curve connecting points $P_2$ and $P_3$ is denoted by a curve $C_2$. Since $a0_1$ and $b0_1$ are already known, the unknowns totals up to 12 pieces consisting of parameters $a1_1, a2_1, b1_1, b2_1$ and $h_1$ of the curve $C_1$ and parameters $a0_2, a1_2, a2_2, b0_2, b1_2, b2_2$ and $h_2$ of the curve $C_2$. The subscripts to characters, which will appear hereinafter, are assigned to correspond to the subscripts to respective curves, in which the coordinates, tangential rotation angles $\alpha$ and $\beta$, normal line and curvature of each curve are expressed respectively by $Px_i$, $Py_i$, $Pz_i$, $\alpha_i$, $\beta_i$, $n_i$ and $\kappa_i$, which are functions of the curve length variable S.

First of all, from the definition of the three-dimensional clothoid curve, the condition that the strict passage through points being interpolated should be kept at the point $P_1$ is inevitably achieved whenever the starting point is given. A tangential direction at the point $P_1$ is also given as a known value, so that no particular specification for the continuity is needed at the point $P_1$.

The next to be considered is the point $P_2$. This point $P_2$ is a connecting point to connect the curves with each other, so that the $G^2$ continuity requires that the position, tangential line, normal line, and curvature should be continuous thereat. That is, the conditions which should be realized at the point $P_2$ are as follows.

[Numeral 63]

$Px_1(1)=Px_2(0)$ $Py_1(1)=Py_2(0)$ $Pz_1(1)=Pz_2(0)$ $\cos[\alpha_1(1)-\alpha_2(0)]=1$ $\cos[\beta_1(1)-\beta_2(0)]=1$ $n_1(1)\cdot n_2(0)=1$ $\kappa_1(1)=\kappa_2(0)$ Lastly, the consideration is given to the point $P_3$. This point $P_3$ is an end point. This means that the necessary conditions to be met are abut only the position and tangential line, so that the following five conditions are realized, in which $\alpha_3$ and $\beta_3$ are tangential rotation angles $\alpha$ and $\beta$ to decide a tangential vector at the end point to be given.

[Numeral 64]

$Px_1(1)=Px_2(0)$ $Py_1(1)=Py_2(0)$ $Pz_1(1)=Pz_2(0)$ $\cos[\alpha_1(1)-\alpha_2(0)]=1$ $\cos[\beta_1(1)-\beta_2(0)]=1$ $n_1(1)\cdot n_2(0)=1$ $\kappa_1(1)=\kappa_2(0)$ Hence, it can be understood that, as for the twelve unknowns $a1_1, a2_1, b1_1, b2_1, h_1, a0_2, a1_2, a2_2, b0_2, b1_2, b2_2$ and $h_2$, the twelve conditional expressions are provided as follows. These expressions can thus be summarized in a list form in the following.

[Numeral 65]

$Px_1(1)=Px_2(0)$ $Py_1(1)=Py_2(0)$ $Pz_1(1)=Pz_2(0)$ $\cos[\alpha_1(1)-\alpha_2(0)]=1$ $\cos[\beta_1(1)-\beta_2(0)]=1$ $n_1\cdot n_2=1$ $\kappa_1(1)=\kappa_2(0)$ $Px_2(1)=Px_3$ $Py_2(1)=Py_3$ $Pz_2(1)=Pz_3$ $\cos[\alpha_2(1)-\alpha_3]=1$ $\cos[\beta_2(1)-\beta_3]=1$ As described, the twelve expressions are realized for the twelve unknown, so that solutions to the unknowns can be found. The Newton-Rapson method is applied to these expressions for solutions, which are listed in Table 10, together with the initial values.

TABLE 10

| | | Initial values and solutions | |
|---|---|---|---|
| | | initial value | solution |
| curve $C_1$ connecting points $P_1$ and $P_2$ | $a_0$ | 0.0 (known) | — |
| | $a_1$ | −0.2684 | −5.4455 |
| | $a_2$ | 1.0739 | 5.4122 |
| | $b_0$ | $\pi/2$ (known) | — |
| | $b_1$ | 0.0 | −3.8590 |
| | $b_2$ | 0.0 | 3.1003 |
| | h | 12.7684 | 13.5862 |
| curve $C_2$ connecting points $P_2$ and $P_3$ | $a_0$ | −0.1648 | −0.033258 |
| | $a_1$ | 3.2061 | 3.6770 |
| | $a_2$ | −2.6327 | −3.6437 |
| | $b_0$ | 0.7853 | 0.8120 |
| | $b_1$ | 0.0 | 1.6006 |
| | $b_2$ | 0.0 | −2.4126 |
| | h | 9.6752 | 9.2873 |

Figure 26:
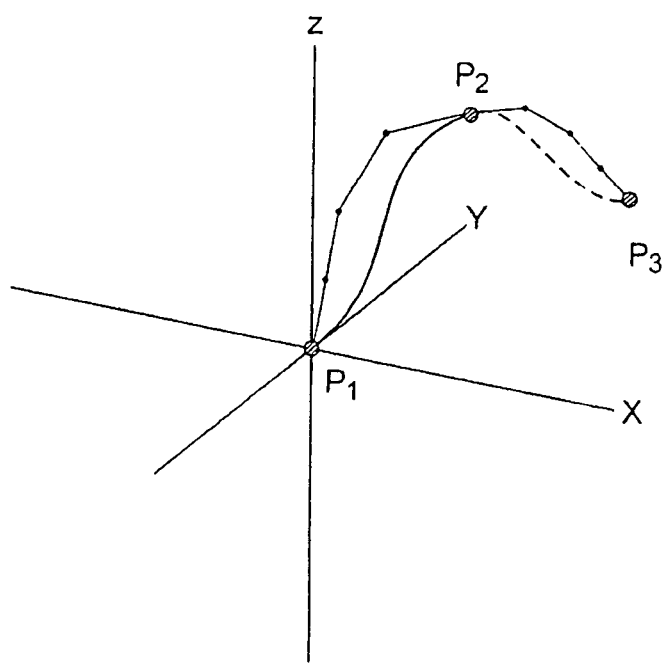
FIG. 26 is a view showing both produced curves and polygon.

(b-5) Production of Curve:

FIG. 26 shows, in a parallel form, both a curve produced based on the parameters obtained in section (b-4) and the polygon produced in section (b-2). The solid curve line denotes the curve $C_1$ and the broken curved line denotes the curve $C_2$. At this stage, there are provided as three-dimensional clothoid curves with tangential directions controlled at the stating and end points and the $G^2$ continuity kept.

Figure 27:
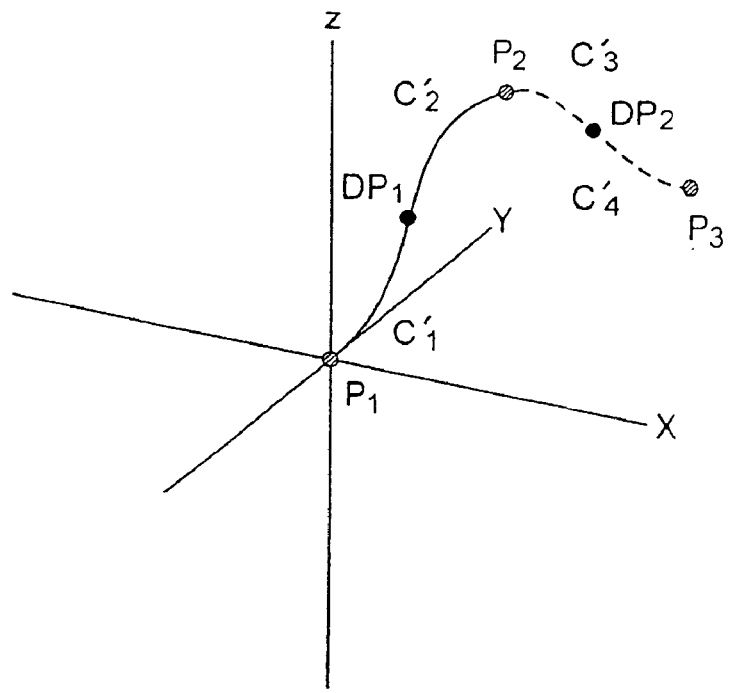
FIG. 27 is a view showing a curve into which points are inserted.

(b-6) Conditional Expressions and Unknowns:

Now assume that the normal lines and curvatures at the starting point $P_1$ and end point $P_2$ are given by values shown in Table 7. In order that the normal lines and curvatures are further controlled at the starting and end points, it is necessary to increase the number of conditions at each of the starting and end points by two. However, in a state where the number of conditions is increased by 4, it is impossible to obtain a solution meeting the conditions, due to imbalance in number between the unknowns and the conditions. Therefore, to make the unknowns and conditions equal in their numbers, a new point $DP_1$ is inserted into the curve $C_1$ at a point of the curve length variable S=0.5 thereon, as shown in FIG. 27. In addition, as to the curve $C_2$, a new point $DP_2$ is inserted thereinto at a point of the curve length variable S=0.5 thereon.

In this situation, a curve connecting the points $P_1$ and $DP_1$ is denoted by $C'_1$, a curve connecting the points $DP_1$ and $P_2$ is denoted by $C'_2$, a curve connecting the points $P_2$ and $DP_2$ is denoted by $C'_3$, and a curve connecting the points $DP_2$ and $P_3$ is denoted by $C'_4$, respectively. The characters which appear in the following description involve with subscripts each corresponding to each curve name. For example, the coordinates, tangential rotation angles $\alpha$ and $\beta$, normal line, and curvature of a curve C are expressed respectively by $Px_c$, $Py_c$, $Pz_c$, $\alpha_c$, $\beta_c$, $n_c$ and $\kappa_c$ which are functions of the curve length variable S. Furthermore, as for the coordinates, tangential rotation angles $\alpha$ and $\beta$, normal line, and curvature at the starting and end points, those are expressed respectively as $Px_s$, $Py_s$, $Pz_s$, $\alpha_s$, $\beta_s$, $n_s$ and $\kappa_s$ at the starting point, whilst those are expressed respectively as $Px_e$, $Py_e$, $Pz_e$, $\alpha_e$, $\beta_e$, $n_e$ and $\kappa_e$ at the end point.

In the following, the conditions realized at respective points are listed.

[Numeral 66]

Point $P_1$: tangential line, normal line and curvature; 4 expressions:

$$\cos[\alpha_{C1}(0)-\alpha_s]=1$$

$$\cos[\beta_{C1}(0)-\beta_s]=1$$

$$n_{C1}(0) \cdot n_s=1$$

$$\kappa_{C1}(0)=\kappa_s$$

Point $DP_1$: position, tangential line, normal line and curvature; 7 expressions:

$$Px_{C1}(1)=Px_{C2}(0)$$

$$Py_{C1}(1)=Py_{C2}(0)$$

$$Pz_{C1}(1)=Pz_{C2}(0)$$

$$\cos[\alpha_{C1}(1)-\alpha_{C2}(0)]=1$$

$$\cos[\beta_{C1}(1)-\beta_{C2}(0)]=1$$

$$n_{C1}(1) \cdot n_{C2}(0)=1$$

$$\kappa_{C1}(1)=\kappa_{C2}(0)$$

Point $P_2$: position, tangential line, normal line and curvature; 7 expressions:

$$Px_{C2}(1)=Px_{C3}(0)$$

$$Py_{C2}(1)=Py_{C3}(0)$$

$$Pz_{C2}(1)=Pz_{C3}(0)$$

$$\cos[\alpha_{C2}(1)-\alpha_{C3}(0)]=1$$

$$\cos[\beta_{C2}(1)-\beta_{C3}(0)]=1$$

$$n_{C2}(1) \cdot n_{C3}(0)=1$$

$$\kappa_{C2}(1)=\kappa_{C3}(0)$$

Point $DP_2$: position, tangential line, normal line and curvature; 7 expressions:

$$Px_{C3}(1)=Px_{C4}(0)$$

$$Py_{C3}(1)=Py_{C4}(0)$$

$$Pz_{C3}(1)=Pz_{C4}(0)$$

$$\cos[\alpha_{C3}(1)-\alpha_{C4}(0)]=1$$

$$\cos[\beta_{C3}(1)-\beta_{C4}(0)]=1$$

$$n_{C3}(1) \cdot n_{C4}(0)=1$$

$$\kappa_{C3}(1)=\kappa_{C4}(0)$$

Point $P_3$: position, tangential line, normal line and curvature; 7 expressions:

$$Px_{C4}(1)=Px_e$$

$$Py_{C4}(1)=Py_e$$

$$Pz_{C4}(1)=Pz_e$$

$$\cos[\alpha_{C4}(1)-\alpha_e]=1$$

$$\cos[\beta_{C4}(1)-\beta_e]=1$$

$$n_{C4}(1) \cdot n_e=1$$

$$\kappa_{C4}(1)=\kappa_e$$

Accordingly, the total number of conditional expressions to be established is 32. In contrast, each curve has the seven clothoid parameters consisting of $a_0$, $a_1$, $a_2$, $b_0$, $b_1$, $b_2$, and h and the number of curves is 4, whereby the number of unknowns totals to 28. That is, the unknowns and the conditional expressions are not equal in number to each other, so that solutions cannot be obtained. In order to overcome this situation, the y and z coordinates of the newly inserted two points $DP_1$ and $DP_2$ are treated as unknowns to increase the unknowns by 4. Since this increase allows both the unknowns and the conditional expressions to be 32 in number, the solutions can be obtained.

Figure 28:
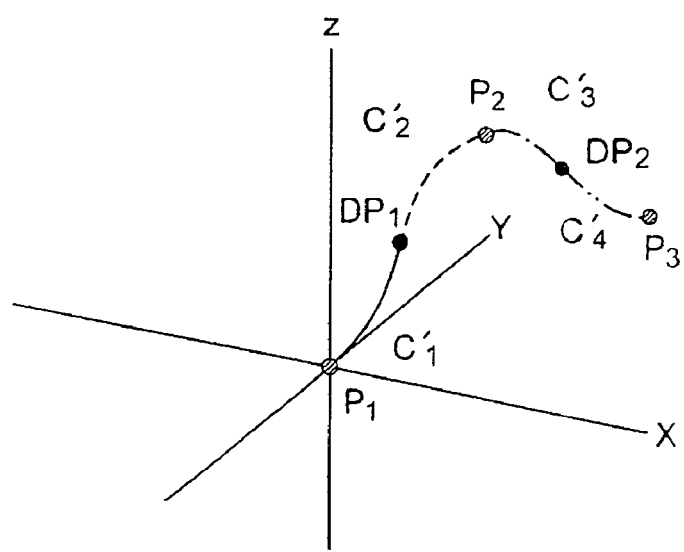
FIG. 28 is a view showing divided three-dimensional clothoid curves.

(b-7) Decision of Initial Values:

Though the Newton-Rapson method is used to compute solutions satisfying the conditional expressions produced in section (b-6), the initial values of the unknowns are required to be decided so that the computation converges at a higher rate. As a practical measure for that, the three-dimensional curve produced in section (b-5) is divided at the newly inserted points, with the result that four three-dimensional clothoid curves are produced as shown in FIG. 28, and the clothoid parameters are given to the curves.

How to divide the curve $C_1$ into a curve $C'_1$ and a curve $C'_2$ will now be described as a curve division method. Using the parameters of the curve $C_1$, the clothoid parameters h', $a'_0$, $a'_1$, $a'_2$, $b'_0$, $b'_1$ and $b'_2$ of the curve $C'_1$ can be expressed by the following expressions, in which a reference $S_d$ represents a curve length variable at the dividing point and is 0.5 in this example.

$$\begin{cases} a'_0 = a_0 \\ a'_1 = a_1 S_d \\ a'_2 = a_2 S_d^2 \\ b'_0 = b_0 \\ b'_1 = b_1 S_d \\ b'_2 = b_2 S_d^2 \\ h' = h S_d \end{cases} \quad \text{[Numeral 67]}$$

The consideration will then be given to the curve $C'_2$ whose dividing point is $DP_1$. Let us assume a curve $C''_1$ which is identical in size and shape to the curve $C_1$ but is opposite in direction to the curve $C_1$. With the use of the parameters of the curve $C_1$, the clothoid parameters h", $a''_0$, $a''_1$, $a''_2$, $b''_0$, $b''_1$ and $b''_2$ of the curve $C''_1$ can be expressed by the following expressions.

$$\begin{cases} P''_s = P(1) \\ a''_0 = a_0 + a_1 + a_2 + \pi \\ a''_1 = -(a_1 + 2a_2) \\ a''_2 = a_2 \\ b''_0 = b_0 + b_1 + b_2 \\ b''_1 = -(b_1 + 2b_2) \\ b''_2 = b_2 \\ h'' = h \end{cases} \quad \text{[Numeral 68]}$$

The dividing point $DP_1$ on this curve is expressed as $DP_1 = C''_1(1-S_d)$. When it is assumed that the curve $C''_1$ is divided at the point $DP_1$, the resultant divided curves include a curve $C''_2$ whose starting point is $P_2$ is identical in size and shape to the curve $C'_2$ and opposite in direction to the curve $C'_2$. Hence the technique for producing the curve $C'_1$ enables the curve $C''_2$ to be produced. In this calculation, the curve $C_2$ can also be obtained by producing a curve having the identical size and shape but having the opposite direction too the curve $C''_2$.

As described, at the point $DP_1$ giving 0.5 to the curve length variable S on the three-dimensional clothoid curve $C_1$, the curve $C_1$ can be divided into the curves $C'_1$ and $C'_2$. Similarly to this, at the point $DP_2$ giving 0.5 to the curve length variable S on the three-dimensional clothoid curve $C_2$, the curve $C_2$ can be divided into the curves $C'_3$ and $C'_4$.

The parameters of the four curves divided on the foregoing are listed in Table 11. These parameters of the curves are used as initial parameters to the Newton-Rapson method in calculating solutions satisfying the conditional expressions established in section b-6.

TABLE 11

Parameters of curves produced by division

| curve | | | curve | | |
|---|---|---|---|---|---|
| $C'_1$ | $a_0$ | 0.0 (known) | $C'_2$ | $a_0$ | 4.9134 |
| | $a_1$ | −2.7227 | | $a_1$ | −0.016629 |
| | $a_2$ | 1.3530 | | $a_2$ | 1.3530 |
| | $b_0$ | π/2 (known) | | $b_0$ | 0.41633 |
| | $b_1$ | −1.9295 | | $b_1$ | −0.37938 |
| | $b_2$ | 0.7750 | | $b_2$ | 0.77507 |
| | h | 6.7931 | | h | 6.7931 |
| | starting point | {0.0, 0.0, 0.0} | | starting point | {1.8431, 3.0860, 4.9597} |
| curve $C'_3$ | $a_0$ | −0.033258 | curve $C'_4$ | $a_0$ | 7.1774 |
| | $a_1$ | 1.8385 | | $a_1$ | 0.016629 |
| | $a_2$ | −0.91093 | | $a_2$ | −0.91093 |
| | $b_0$ | 0.81202 | | $b_0$ | 1.0091 |
| | $b_1$ | 0.80031 | | $b_1$ | −0.40601 |
| | $b_2$ | −0.60316 | | $b_2$ | −0.60316 |
| | h | 4.6436 | | h | 4.6436 |
| | starting point | {5.0, 5.0, 10.0} | | starting point | {7.0029, 8.1298, 7.5337} |

(b-8) Obtaining Clothoid Parameters Satisfying Conditions:

Based on the initial values decided in section (b-7), the solutions satisfying the conditional expressions established in section (b-6) were obtained using the Newton-Rapson method. Table 12 shows those calculated parameters of each curve. In addition, Table 13 shows differences between given values and the produced values in respect of the tangential line, normal line, and curvature at the starting and end points of each produced curve.

TABLE 12

Parameters of produced curves

| curve | | | curve | | |
|---|---|---|---|---|---|
| $C'_1$ | $a_0$ | 0.0 (known) | $C'_2$ | $a_0$ | 5.3846 |
| | $a_1$ | 0.0000 | | $a_1$ | −3.4602 |
| | $a_2$ | −0.89854 | | $a_2$ | 4.341 |
| | $b_0$ | π/2 (known) | | $b_0$ | 0.47690 |
| | $b_1$ | −0.51836 | | $b_1$ | −3.2143 |
| | $b_2$ | −0.57552 | | $b_2$ | 3.4613 |
| | h | 5.1836 | | h | 9.9808 |
| | starting point | {0.0, 0.0, 0.0} | | starting point | {1.8431, 4.1726, 1.4653} |
| curve $C'_3$ | $a_0$ | −0.017740 | curve $C'_4$ | $a_0$ | 6.8553 |
| | $a_1$ | 3.4572 | | $a_1$ | −1.1443 |
| | $a_2$ | −2.8673 | | $a_2$ | 0.57219 |
| | $b_0$ | 0.72385 | | $b_0$ | 0.76315 |
| | $b_1$ | 2.4551 | | $b_1$ | −1.1942 |
| | $b_2$ | −2.4158 | | $b_2$ | 0.43108 |
| | h | 6.60818 | | h | 3.3206 |
| | starting point | {5.0, 5.0, 10.0} | | starting point | {7.0029, 9.0734, 5.6186} |

TABLE 13

Differences between given values and produced values in respect of tangential line, normal line and curvature at starting and end points of produced curve

|  |  | coordinate | unit tangential vector | principal normal vector | curvature |
|---|---|---|---|---|---|
| $P_1$ | given value | {0.0, 0.0, 0.0} | {0.0, 1.0, 0.0} | {1.0, 0.0, 0.0} | 0.10 |
|  | value on produced curve | {0.0, 0.0, 0.0} | {0.0, 1.0, 0.0} | {1.0, 0.0, 0.0} | 0.10 |
|  | difference | {0.0, 0.0, 0.0} | {0.0, 0.0, 0.0} | {0.0, 0.0, 0.0} | 0 |
| $P_3$ | given value | {10.0, 10.0, 5.0} | {1.0, 0.0, 0.0} | {0.0, −1.0, 0.0} | 0.10 |
|  | value on produced curve | {10.0, 10.0, 5.0} | {1.0, 0.0, 0.0} | {0.0, −1.0, 0.0} | 0.10 |
|  | difference | {0.0, 0.0, 0.0} | {0.0, 0.0, 0.0} | {0.0, 0.0, 0.0} | 0 |

Figure 29:
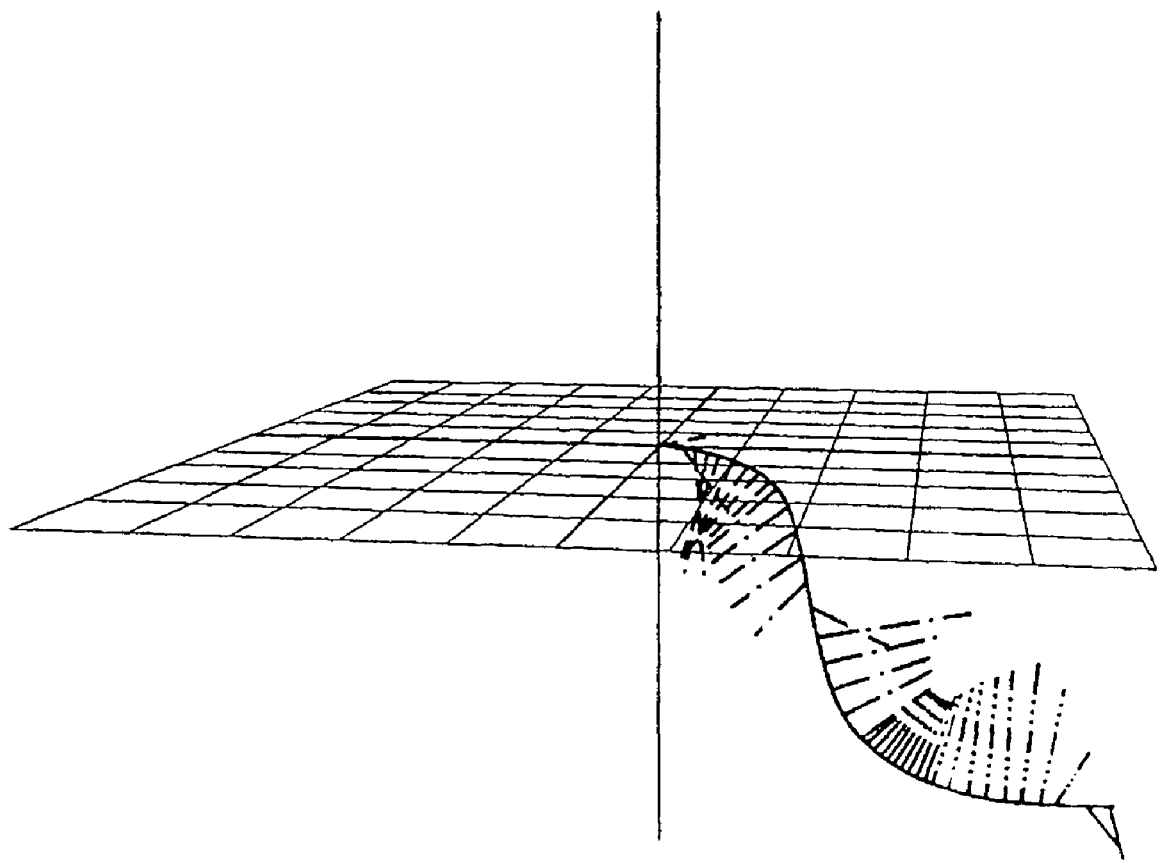
FIG. 29 is a perspective view showing a produced curve.
Figure 30:
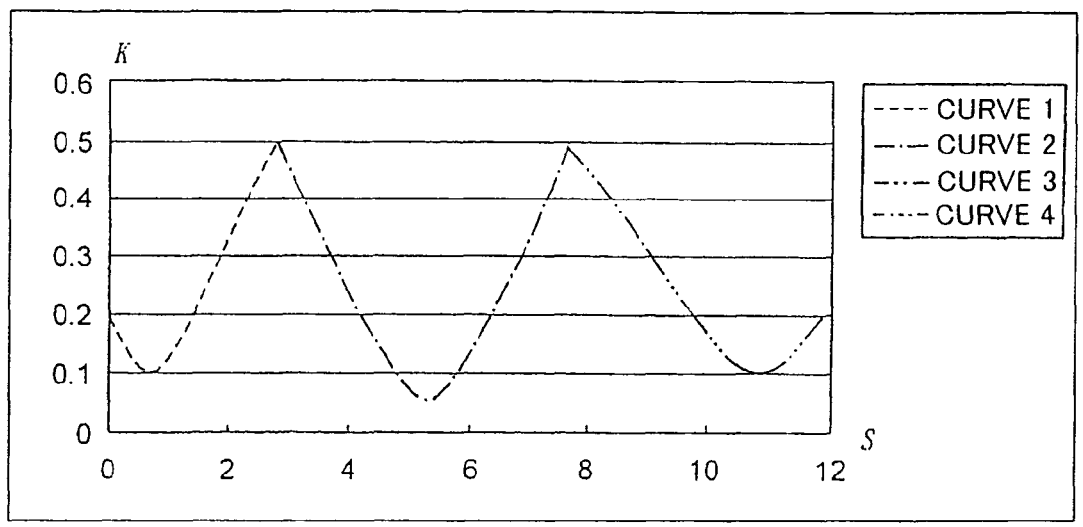
FIG. 30 is a graph showing the relationship between a distance s moved from a starting point of each curve and a curvature κ of each curve.

(b-9) Production of Curves:

A curve produced on the parameters obtained in section (b-8) is shown in FIG. 29. In this figure, the solid line depicts a three-dimensional clothoid curve, while the broken line, chain line, chain double-dashed line, and chain triple-dashed line depict respectively patterns of changes in the curvature radius of each curve in which the change patterns are calculated on both the principal normal line which is set to the direction of each curve and the curvature radius which is set to the size of each curve (the radius curvature is subjected to the logarithm computation after addition of the logarithm natural). FIG. 30 shows a graph presenting the relationship between the distance s moved from the starting point of each curve and the curvature κ depending on the respective types of the curves shown in FIG. 29. From Table 12, it is understood that the produced curves satisfy the given conditions.

As described, how to produce the curves on the three-dimensional clothoid interpolation in such a manner that the tangential line, normal line and curvature at both ends are controlled has been exemplified.

3. Method of Designing Regression Path of Ball Screw by Using Three-Dimensional Clothoid Interpolation:

As an example in which the three-dimensional clothoid interpolation is applied to machine design, the regression path of a deflector type of ball screw will now be designed.

Figure 31:
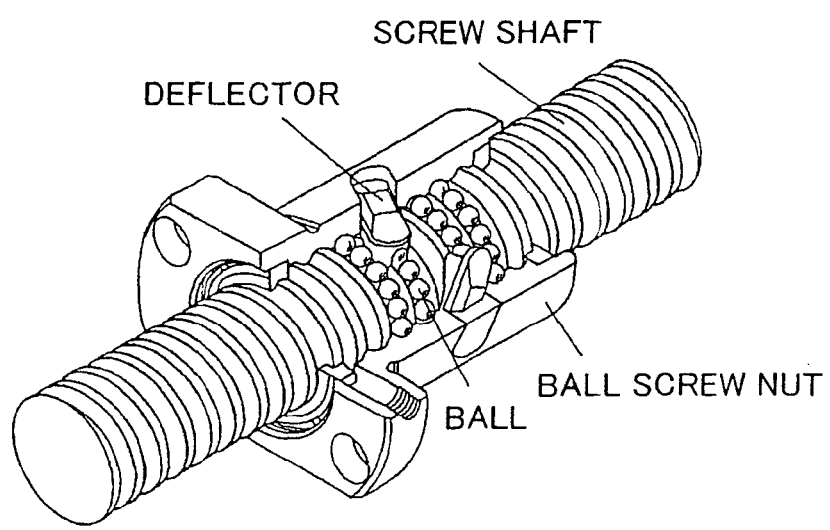
FIG. 31 is a perspective view showing a deflector type of ball screw in which a deflector is produced separately from a nut.

(3-1) Description of Deflector Type of Ball Screw:

FIGS. 31 to 35 show a deflector type of ball screw. This ball screw has a deflector serving as a regression path of balls rolling on a thread groove. The deflector is classified into a type of deflector which is formed separately from a nut and then fixed on the nut and a type of deflector which is formed together with a nut. FIG. 31 illustrates the former one, in which the deflector is separated from the nut at the beginning of the production.

Figure 32:
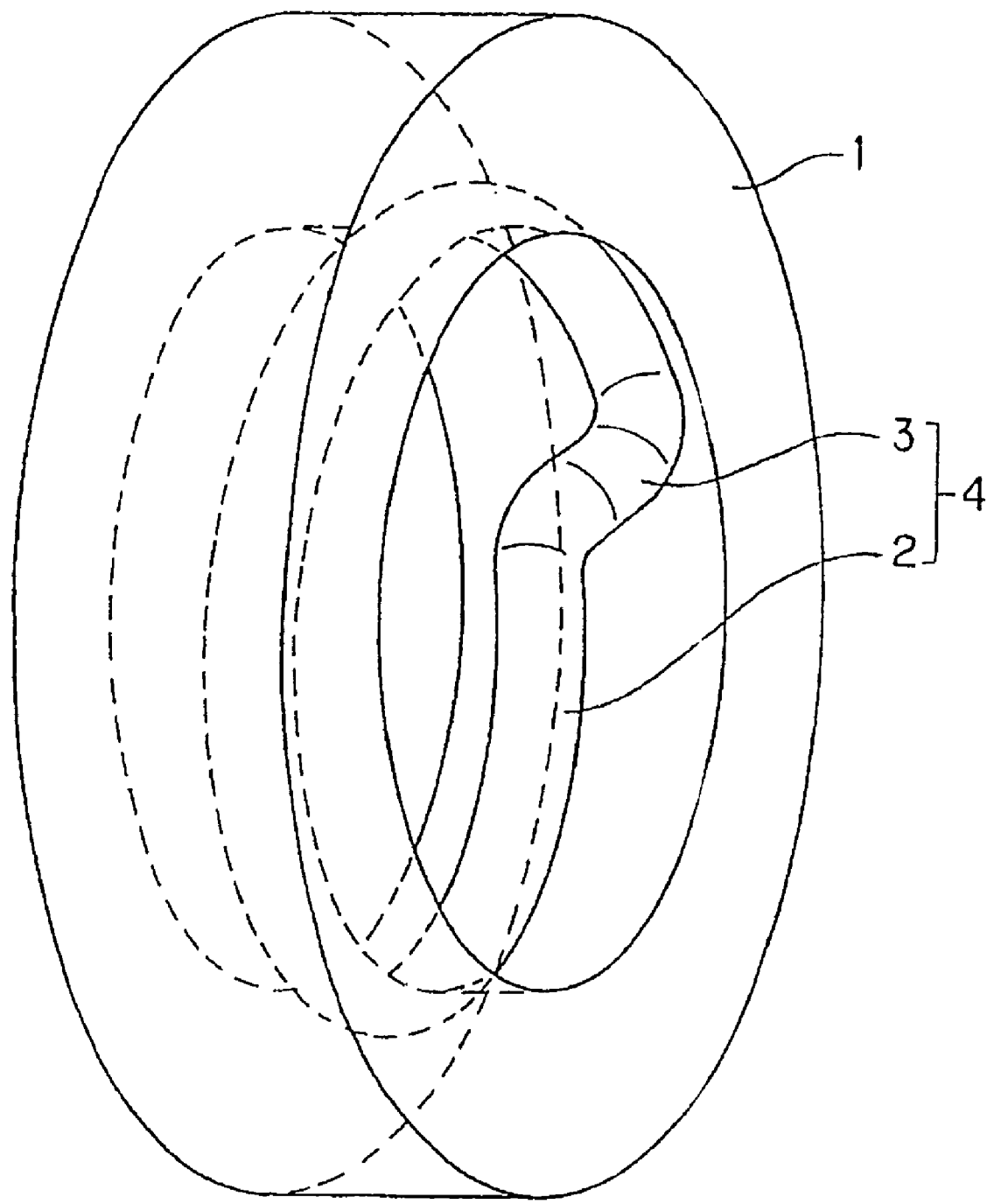
FIG. 32 is a perspective view showing a nut to be combined with a ball screw of which deflector composes one device with the nut.
Figure 33A:
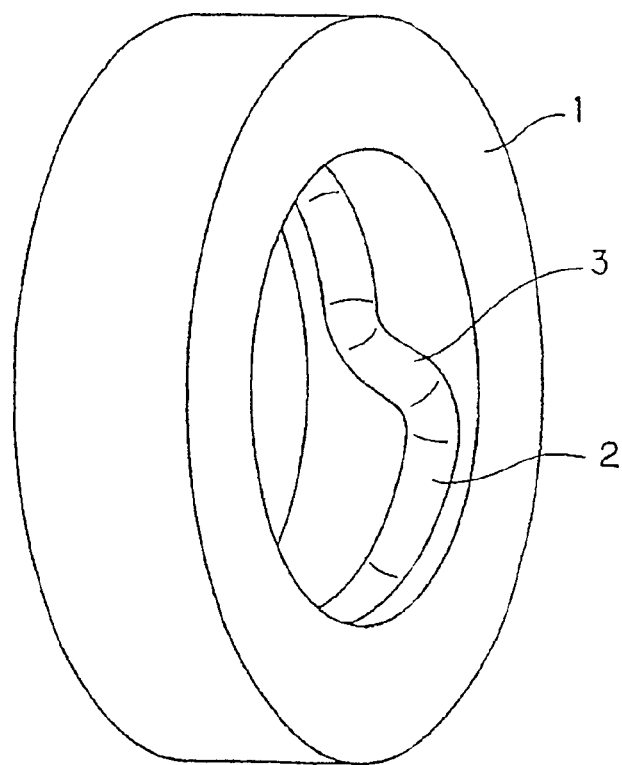
FIG. 33A is a perspective view illustrating the nut in a state where a ball circulating groove can be seen.
Figure 33B:
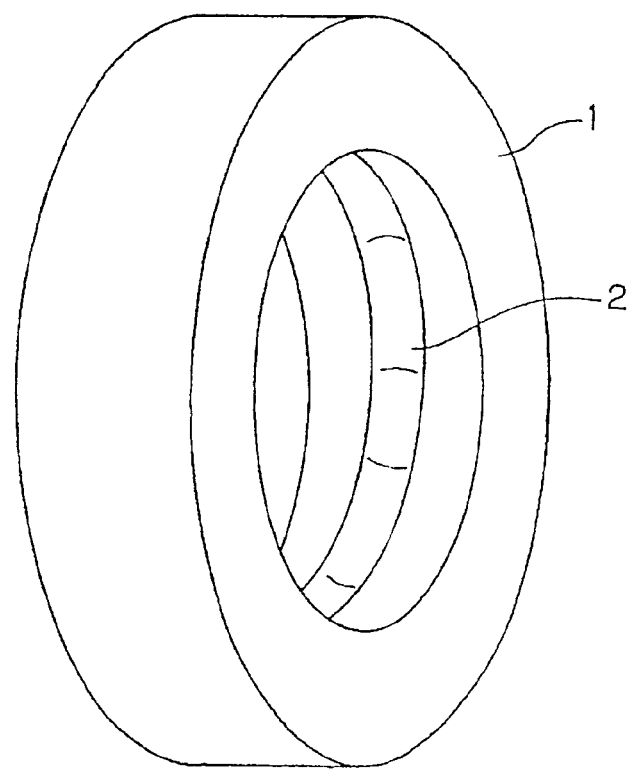
FIG. 33B is a perspective view illustrating the nut in a state where a load ball rolling groove can be seen.

Hereinafter, the type of ball screw in which the deflector is produced as one unit with the nut will now be described. FIG. 32 shows a nut 1 employed by this type of ball screw in which the deflector is produced as one unit with the nut. The nut 1 has an inner circumferential surface, on which a load ball rolling groove 2 is formed which serves as a spiral load rolling element rolling groove whose circumferential distance is less than one turn. The load ball rolling groove 2 has a lead made to agree with the ball rolling groove of a screw shaft described later. There is also provided a ball circulating groove 3, serving as the regression path, and connecting one end and the other end of the load of the load running groove and having a lead of which direction is opposite to that of the load ball rolling groove 2. The load ball rolling groove 2 and the ball circulating groove 3 are paired to form a single one-turn groove 4. FIG. 33A shows a perspective view of the nut 1 in which the ball circulating groove 3 can be seen, while FIG. 33B shows a perspective view of the nut 1 in which the load ball rolling groove 2 can be seen instead.

This nut 1 is combined with the screw shaft, whose combined state is shown in FIG. 34.

The screw shaft has an outer circumferential surface, on which there is formed a ball rolling groove 6 serving as a spiral rolling element rolling groove having predetermined leads. The load ball rolling groove 2 of the nut 1 is opposed to the ball rolling groove 6 of the screw shaft 5. Between the load ball rolling groove 2 and ball circulating groove 3 of the nut 1, and the screw shaft 5 of the screw shaft 5, a plurality of balls are put in an array, which serve as a plurality of rolling elements which can move in a rolled manner. In response to relative rotation of the nut 1 to the screw shaft 5, the plurality of balls roll with load received between the load ball rolling groove 2 of the nut 1 and the ball rolling groove 6 of the screw shaft 5.

The ball circulating groove 3 of the nut 1, which is shown in FIG. 32, is a part corresponding to the deflector shown in FIG. 31. The ball circulating groove 3 makes it possible that the balls overleap screw threads 7 of the screw shaft 5 in such a manner that the balls, which rolls along the load ball rolling groove 2 of the screw shaft 5, return to the original load ball rolling groove after one turn around the screw shaft 5.

Figure 35:
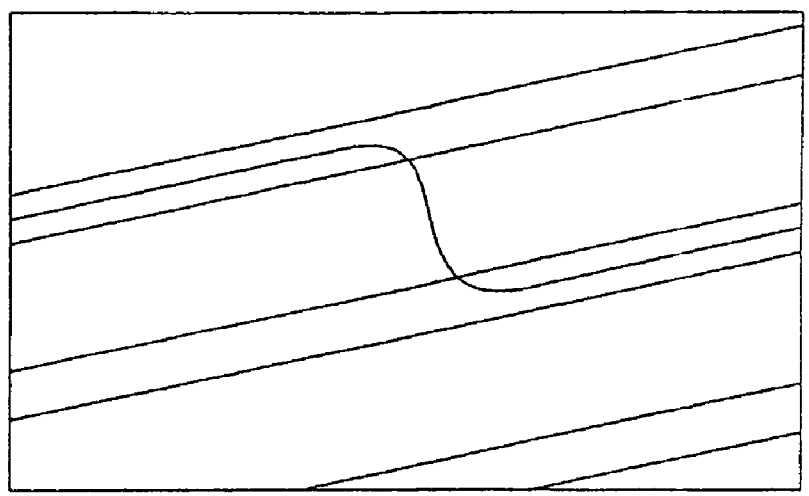
FIG. 35 is a development elevation showing the circulating path of a conventional ball screw.
Figure 36:
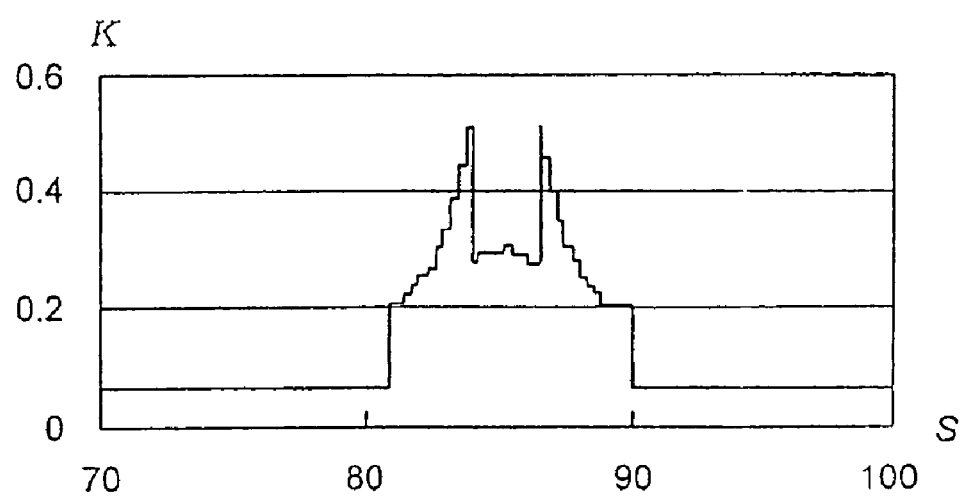
FIG. 36 is a graph showing curvatures of the circulating path of a conventional ball screw.

In the case of the conventional model, the regression path was formed such that, when a development elevation shown in FIG. 35 is wound around the screw shaft, the path is seen to be shifted from the screw shaft center to a certain extent that the screw threads are avoided from colliding with the balls. As can be understood from curvature changes shown in FIG. 36, this path is discontinuous. Hence the three-dimensional clothoid interpolation is used to redesign a circulation path with continuous curvature changes.

Figure 37:
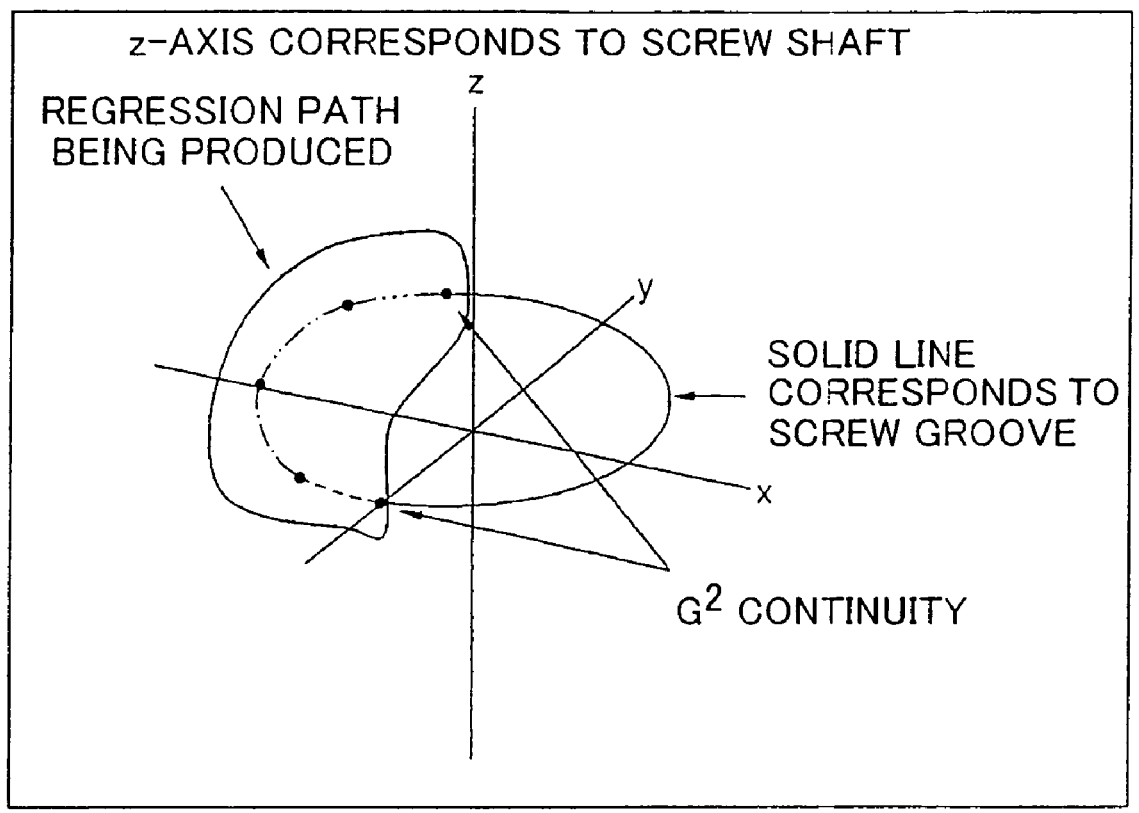
FIG. 37 is a view showing a trajectory depicted the center of a ball.

FIG. 37 shows a trajectory depicted by the center of a ball. In order to realize that the circulating path along which a ball rolls is G2-continusou as a whole, it is required to be G2-continuous at a point where the ball transfers to the regression path. Thus, for designing a regression path, it is considered that the fact that a tangential line, normal line and curvature should be controlled at both end points of the regression path.

(3-2) Hereinafter the Three-Dimensional Clothoid Curve is Used to Design the Regression Path of a Deflector Type of Ball Screw, and an Example of this Design will Now be Described.

(a-1) Screw Shaft and Balls:

The dimensions of a screw shaft and balls used in the present design are listed in Table 14.

TABLE 14

Dimensions of screw shaft and balls

| | |
|---|---|
| outer diameter of screw shaft (mm) | 28.0 |
| ball central diameter (mm) | 28.0 |
| root diameter (mm) | 24.825 |
| pitch (mm) | 5.6 |
| ball diameter (mm) | 3.175 |

(a-2) Symmetry and Coordinate System:

In designing the regression path of the deflector type of ball screw, applications of the ball screw require that the regression path be axial symmetry. A coordinate system used in the design will now be described.

Figure 38:
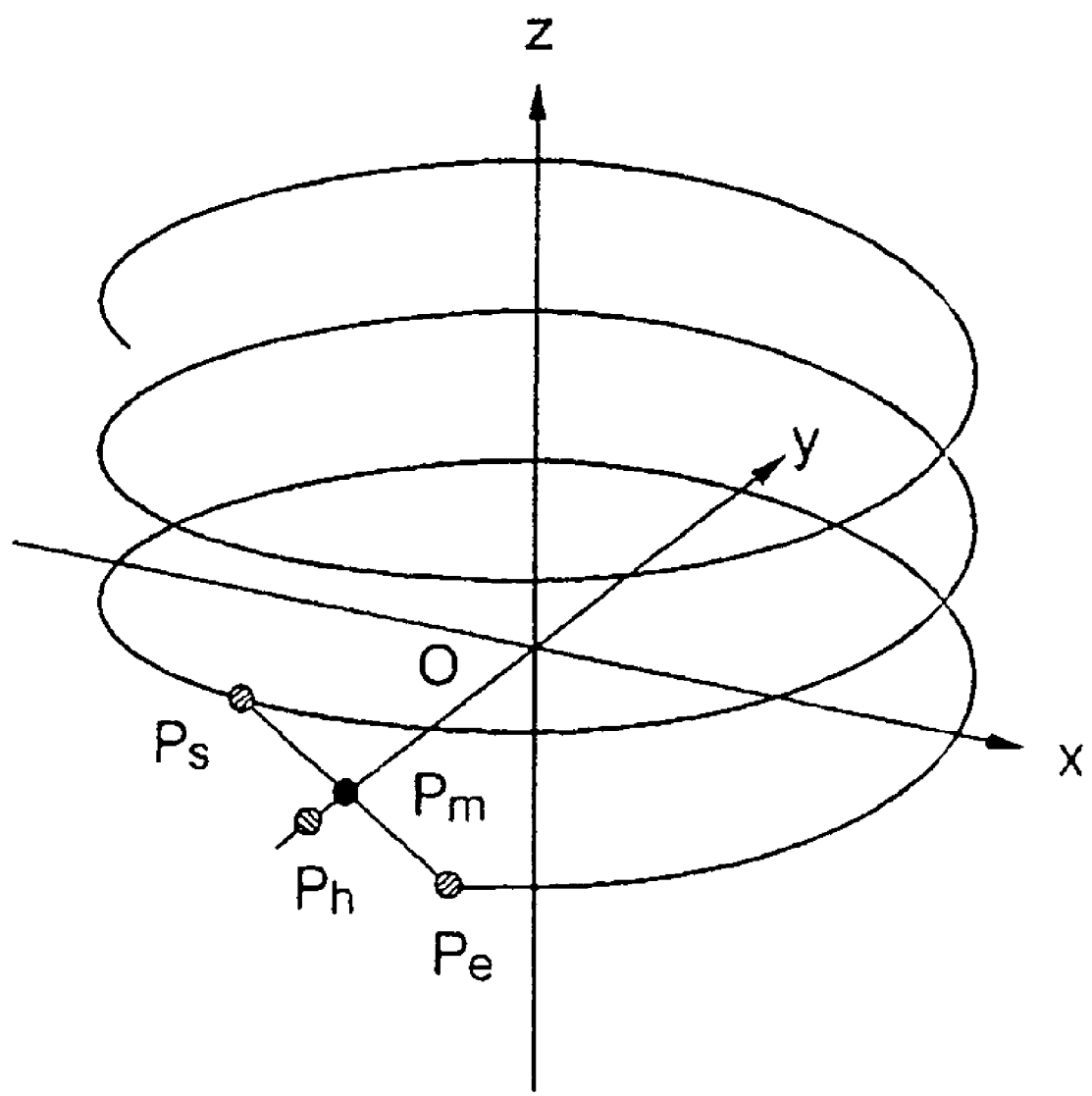
FIG. 38 shows a coordinate system.
Figure 39:
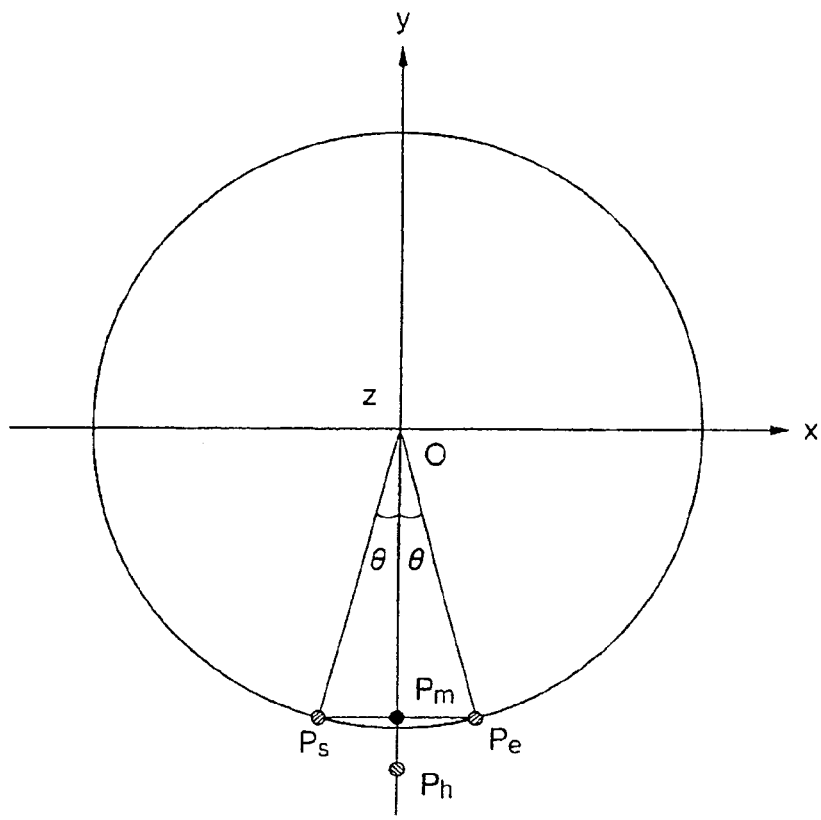
FIG. 39 shows a coordinate system viewed downward along a z-axis.

First, as shown in FIG. 38, the z-axis is assigned to the direction of the screw shaft. A solid line in FIG. 28 shows a trajectory depicted by the center of a ball when the ball is moved along a thread groove. Assignment is made in the coordinate system such that a point entering a regression path is $P_s$, a point returning from the regression path to a thread groove is $P_e$, and a middle point between both points $P_s$ and $P_e$ is $P_m$. As shown in FIG. 39, when being projected to the xy plane, both points $P_s$ and $P_e$ create an isosceles triangle among the points O, $P_s$ and $P_e$, in which the y-axis is assigned to the direction along a perpendicular bisector passed through an angle $\angle P_s O P_e$ of this isosceles triangle. With the symmetry considered, the y-axis is set so as to pass the point $P_m$. The directions of the respective axes are those as shown in FIGS. 38 and 39. The coordinate system is set like this, in which the regression path is designed to be y-axis symmetry.

In actual design, an angle θ was set to 15 degrees in the above coordinate system and the coordinates of each point were decided based on this angle. The decided coordinates, tangential line, normal line and curvature are listed in Table 15.

TABLE 15

Coordinate of each point and tangential line, normal line and curvature thereat

| | coordinate | tangential line | normal line | curvature |
|---|---|---|---|---|
| point $P_s$ | {−3.6088, −13.5249, 2.5563} | {0.96397, −0.25829, 0.063533} | {0.25881, 0.96592, 0.0} | 0.071428 |
| point $P_e$ | {3.6088, −13.5249, −2.5563} | {0.96397, 0.25829, 0.063533} | {−0.25881, 0.96592, 0.0} | 0.071428 |
| point $P_m$ | {0.0, −13.5249, 0.0} | — | — | — |

(a-3) Constraint Conditions:

Description will now be given to constraint conditions used in the design of the regression path of the deflector type of ball screw. At first, the points $P_e$ and $P_s$ should have the $G^2$ continuity in respect of the curve of a trajectory depicted by the center of a ball rolling along the thread groove.

The description will then be given to a height over which the ball is lifted. When taking it account that the regression path is the y-axis symmetry, it is understood that the center of the ball passes a certain point on the y-axis. This point is noted as $P_h$ (refer to FIGS. 38 and 39). Thus, in order that the ball overleaps a screw thread, it is at least required that the absolute value of the y-coordinate of the point $P_h$ satisfy a condition of (absolute value of y-coordinate of point $P_h$)≧(outer diameter of screw shaft+ball diameter)/2.

Thus, in the present design, setting was made such that (absolute value of y-coordinate of point $P_h$)=(outer diameter of screw shaft+ball diameter×1.2)/2. Furthermore, when taking the y-axis symmetry into consideration, the normal direction should be {0,1,0}, which results in that the tangential direction has only a degree of freedom to rotate therearound.

The regression path with the y-axis symmetry, which still meets the foregoing conditions, is produced with the three-dimensional clothoid curve. Actually, in addition to the foregoing conditions, interference with the screw shaft should be taken into account. This interference problem is avoided by redesigning the path through procedures where the initial values for the interpolation are changed and/or points being interpolated are increased, if an inspection of the designed regression path reveals such interference.

(a-4) For Avoiding Interference:

The interference with the thread shaft tends to occur in a beginning part of the regression path and such a tendency of the interference cannot be avoided in cases where the path is formed on the free interpolation. It is commanded that the regression path is released from the screw shaft and returned to its original position over the screw threads. For avoiding the interference, it is desirable that the path is released from the screw shaft by a certain amount of height, before being returned to its original position over the screw threads. Methods of producing such a regression path include a technique by which the number of points being interpolated is increased for avoiding the interference and a further technique by which the first curve located to face the regression path is manually produced to perform a forcible release from the screw shaft. Of these techniques, the present design adopted the technique by which the first curve located to face the regression path is manually produced to perform a forcible release from the screw shaft.

Here, the first curve $C_1$ which is located to face the regression path stating from the point $P_s$ will now be described. With handling the coordinates, tangential rotation angles α and β, normal line and curvature on the curve $C_1$ as functions of the curve length variable S, these parameters are expressed as $Px_1(S)$, $Py_1(S)$, $Pz_1(S)$, $\alpha_1(S)$, $\beta_1(S)$, $n_1(S)$, and $\kappa_1(S)$. In addition, as to the points $P_s$ and $P_h$, the coordinates, tangential rotation angles α and β, normal line and curvature at the point $P_s$ are expressed as $Px_s$, $Py_s$, $Pz_s$, $\alpha_s$, $\beta_s$, $n_s$ and $\kappa_s$, while those parameters at the point $P_h$ are expressed as $Px_h$, $Py_h$, $Pz_h$, $\alpha_h$, $\beta_h$, $n_h$ and $\kappa_h$. Conditions for realizing the $G_2$ continuity from a trajectory curve depicted by the center of a ball rolling along the thread grooves result in that the following expressions are realized at the point $P_s$.

[Numeral 69]

Figure 40:
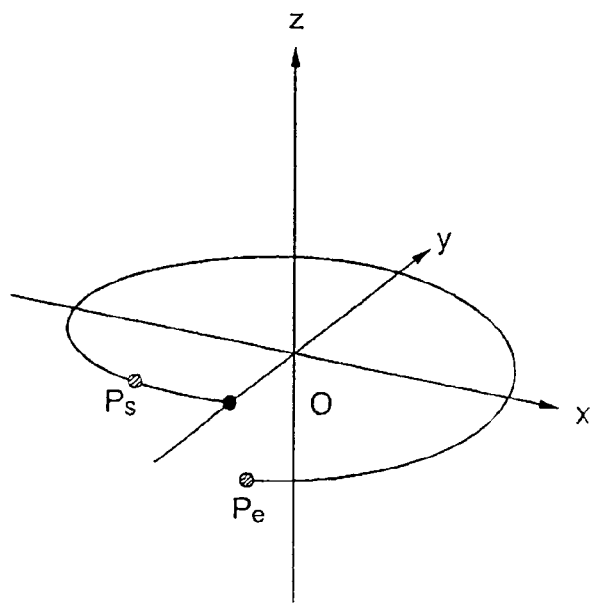
FIG. 40 is a view showing a trajectory curve depicted by the center of a ball moving along a thread groove.

Point $P_s$: tangential line, normal line and curvature: 4 expression $\cos[\alpha_1(0) - \alpha_s] = 1$ $\cos[\beta_1(0) - \beta_s] = 1$ $n_1(0) \cdot n_s = 1$ $\kappa_1(0) = \kappa_s$ In addition, a trajectory curve depicted by the center of the ball rolling on and along the thread grooves can be expressed by the three-dimensional clothoid curve. On the other hand, a three-dimensional clothoid curve $C_0$ which starts from a point shown in FIG. 40 and runs by one turn can be expressed by the following expressions, in which pit represents a screw pitch, R represents an outer diameter of the screw shaft, and $\alpha_0$ represents a screw pitch angel.

$$\alpha_0(S) = -\alpha_0 \quad \text{[Numeral 70]}$$
$$\beta_0(S) = \beta_e + 2\pi S$$
$$h_0 = \sqrt{pit^2 + (2\pi R)^2}$$
$$P_0(S) = P_e + h_0 \int_0^1 u(S)dS$$

In the expressions about the curve $C_0$, the point $P_s$ is expressed as $P_s = P_0(11/12)$. In cases where a curve having the parameters listed in the next expression is produced as a curve $C_1$ staring from the point $P_s$ and achieving the $G_2$ continuity from the curve $C_0$ at the point $P_s$, the forcible release from the screw shaft is possible.

$$\begin{cases} \alpha_1(S) = -\alpha_0 \\ \beta_1(S) = \beta_0\left(\frac{\pi}{12}\right) + \frac{1}{60}\left(b1_0 + \frac{11}{6}b2_0\right)S - \frac{1}{15}\left(b1_0 + \frac{11}{6}b2_0\right)S^2 \\ P_1(S) = P_s + \frac{h_0}{60}\int_0^1 u_1(S)dS \end{cases} \quad \text{[Numeral 71]}$$

For example, as such a curve $C_1$ satisfying the above conditions, a three-dimensional clothoid curve with parameters listed in Tale 16 is produced.

TABLE 16

| Parameters of curve $C_1$ | | |
|---|---|---|
| curve $C_1$ | $a_0$ | 6.2196 |
| | $a_1$ | 0.0 |
| | $a_2$ | 0.0 |
| | $b_0$ | 6.0213 |
| | $b_1$ | 0.10472 |
| | $b_2$ | −0.41887 |
| | h | 1.4631 |
| | Starting point | {−3.6088, −13.5249, 2.5563} |

A comparison between the values of the tangential line, normal line, and curvature between the curves $C_0$ and $C_1$ at the point PS results in Table 17, from which it is confirmed that the $G^2$ continuity is realized.

Figure 41:
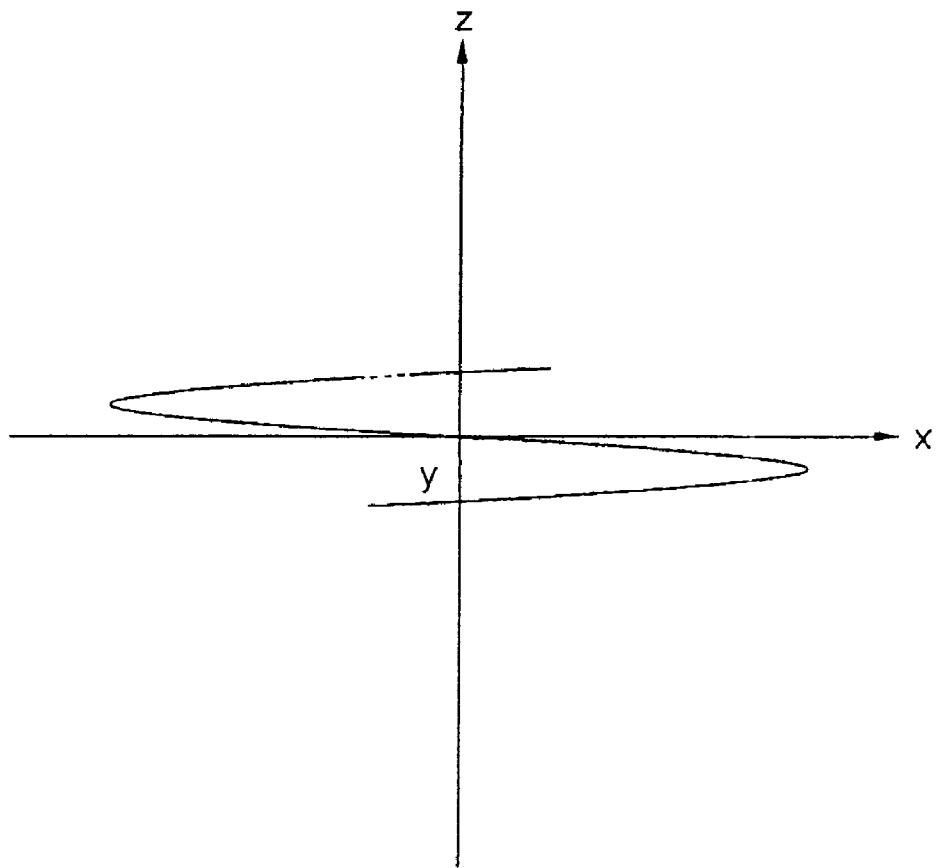
FIG. 41 is a view showing curves C0 and C1 viewed downward along a y-axis.
Figure 42:
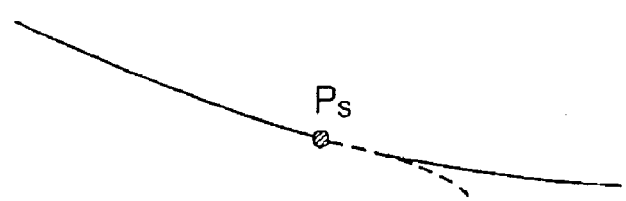
FIG. 42 is a view showing the curves C0 and C1 located in the vicinity of a point Ps, which is viewed downward along the z-axis.

Further, from FIGS. 41 and 42, it is comprehended that this curve has a shape which enables a mere release from the screw shaft. Thus, as to the first curve $C_1$ located to face the regression path starting from the point $P_s$, the parameters of this curve were used.

(a-5) Conditional Expressions for Three-Dimensional Clothoid Interpolation and Unknowns:

In consideration of the conditions stated in section a-3, the Newton-Rapson method is used to obtain approximate values of the parameters of each curve under the condition that the $G^2$ continuation is realized. Since the curve $C_1$ starting from the point $P_s$ has already been produced in the description done so far, how to design a path connecting the end point $P_1$ of the curve $C_1$ and the point $P_h$ will then be described. Subscripts being used in the following description have correspondences between each character and each curve, so that the coordinates, tangential rotation angles $\alpha$ and $\beta$, normal line, and curvature of and to each curve are expressed, as functions of the curve length variable S, by $Px_i(S)$, $Py_i(S)$, $Pz_i(S)$, $\alpha_i(S)$, $\beta_i(S)$, $n_i(S)$, and $\kappa_i(S)$. In addition, at the point $P_h$, the coordinates, tangential rotation angles $\alpha$ and $\beta$, normal line, and curvature of and to each curve are expressed by $Px_h$, $Py_h$, $Pz_h$, $\alpha_h$, $\beta_h$, $n_h$, and $h_h$.

In the design of the path, the points which should be subjected to a strict passage are the two points $P_1$ and $P_2$, so that the three-dimensional interpolation is directed to those two points. Considering interpolating conditions required at both end points teaches the fact that the conditional expressions are larger in number than the unknowns by 2. Hence, for the $G^2$-continuous three-dimensional clothoid interpolation, let us assume that a point $P_2$ is inserted between the points $P_1$ and $P_h$, as illustrated in FIG. 43. In addition, let a curve connecting the points $P_1$ and $P_2$ be a curve $C_2$ and a curve connecting the points $P_2$ and $P_e$ be a curve $C_3$, respectively.

[Numeral 72] The Following is Interpolation Condition at Each Point.

Point $P_1$: tangential line, normal line, and curvature: 4 expressions $\cos[\alpha_2(0) - \alpha_1(1)] = 1$ $\cos[\beta_2(0) - \beta_1(1)] = 1$ $n_2(0) \cdot n_1(1) = 1$ $\kappa_2(0) = \kappa_1(1)$ Point $P_2$: position, tangential line, normal line, and curvature: 7 expressions $Px_3(1) = Px_2(0)$ $Py_3(1) = Py_2(0)$ $Pz_3(1) = Pz_2(0)$ $\cos[\alpha_3(1) - \alpha_2(0)] = 1$

TABLE 17

| Shifts in tangential line, normal line, and curvature at point $P_s$ | | | | |
|---|---|---|---|---|
| | coordinate | unit tangential vector | principal normal vector | curvature |
| curve $C_0$ | {−3.6088, −13.5249, 2.5563} | {0.96397, −0.25829, 0.063533} | {0.25881, 0.96592, 0.0} | 0.071428 |
| curve $C_1$ | {−3.6088, −13.5249, 2.5563} | {0.96397, −0.25829, 0.063533} | {0.25881, 0.96592, 0.0} | 0.071428 |
| difference | {0.000, 0.000, 0.000} | {0.000, 0.000, 0.000} | {0.000, 0.000, 0.000} | 0 |

$\cos[\beta_3(1)-\beta_2(0)]=1$ $n_3(1)\cdot n_2(0)=1$ $\kappa_3(1)=\kappa_2(0)$ Point $P_h$: position, $\beta$, and normal line: 5 expressions $Px_3(1)=Px_h$ $Py_3(1)=Py_h$ $Pz_3(1)=Pz_h$ $\cos[\beta_3(1)]=1$ $n_3(1)\cdot\{0,1,0\}=1$ As listed above, the number of conditional expressions to be established is 16 in total. The clothoid parameters owned by each curve is seven pieces consisting of $a_0$, $a_1$, $a_2$, $b_0$, $b_1$, $b_2$ and h, and the number of unknowns is 14, because the number of curves is two. However, the unknowns are not equal in number to the conditional expressions, so that solutions cannot be obtained. Therefore, the y and z coordinates at the newly inserted two points $P_2$ are treated as unknowns so as to increase the unknowns by 2. By this increase, the unknowns and the conditional expressions are both 16 in number, respectively, whereby solutions can be obtained. Though not being reduced into practice in the present design, this relationship between the number of unknowns and the number of conditional expressions is always met whenever a point to be passed strictly in mid course is given and the $G_2$ continuity is realized before and after the given point. Thus solutions can be calculated even if points being interpolated are increased between the points $P_1$ and $P_h$.

(a-6) Obtaining Clothoid Parameters Satisfying Conditions:

Solutions satisfying the conditional expressions established in section a-5 were calculated by using the Newton-Rapson method. How to interpolate parameters and how to produce initial values were based on the techniques for the three-dimensional clothoid interpolation. Table 18 shows the calculated parameters of each curve and Table 19 shows shifts in the coordinate, tangential line, normal lines and curvature at each connecting point.

TABLE 18

| | | Produced parameters of curve |
|---|---|---|
| curve $C_2$ | $a_0$ | −0.063576 |
| | $a_1$ | 0.0000 |
| | $a_2$ | 0.62696 |
| | $b_0$ | −0.57595 |
| | $b_1$ | −0.98004 |
| | $b_2$ | 0.77916 |
| | h | 1.9561 |
| | starting point $P_1$ | {−2.2429, −14.021, 2.6492} |
| curve $C_3$ | $a_0$ | 6.8465 |
| | $a_1$ | 1.729 |
| | $a_2$ | −0.86450 |
| | $b_0$ | −0.77684 |
| | $b_1$ | 0.79736 |
| | $b_2$ | −0.020523 |
| | h | 2.69723 |
| | starting point $P_2$ | {−0.93007, −15.389, 2.3720} |

TABLE 19

Shifts in coordinate, tangential line, normal line, and curvature at each connecting point

| | | coordinate | unit tangential vector | principal normal vector | curvature |
|---|---|---|---|---|---|
| $P_1$ | curve $C_1$ | {−2.2429, −14.021, 2.6492} | {0.83697 −0.54353, 0.063533} | {−0.54463, −0.83867, 0.0} | 0.50 |
| | curve $C_2$ | {−2.2429, −14.021, 2.6492} | {0.83697 −0.54353, 0.063533} | {−0.54463, −0.83867, 0.0} | 0.50 |
| | difference | {0.0, 0.0, 0.0} | {0.0, 0.0, 0.0} | {0.0, 0.0, 0.0} | 0 |
| $P_2$ | curve $C_2$ | {−0.93007, −15.389, 2.3720} | {0.60291, −0.59268, −0.53405} | {−0.10017, 0.60786, −0.78769} | 0.68803 |
| | curve $C_3$ | {−0.93007, −15.389, 2.3720} | {0.60291, −0.59268, −0.53405} | {−0.10017, 0.60786, −0.78769} | 0.68803 |
| | difference | {0.0, 0.0, 0.0} | {0.0, 0.0, 0.0} | {0.0, 0.0, 0.0} | 0 |
| $P_h$ | curve $C_3$ | {0.000 −15.905, 0.0} | {0.14241, 0.0000, −0.98980} | {0.000, 1.0, 0.000} | 0.039934 |
| | given value | {0.0, −15.905, 0.0} | — | {0.0, 1.0, 0.0} | — |
| | difference | {0.0, 0.0, 0.0} | — | {0.0, 0.0, 0.0} | — |

(a-7) Production of Path:

On the basis of the parameters obtained in sections a-5 and a-6, the path extending from the point $P_s$ to the point $P_h$ can be designed. Additionally, the path extending from the point $P_h$ to the point $P_e$ can also be produced with use of the same curve, because both paths are y-axis symmetry. That is, the same path is provided by re-setting the coordinate system so as to regard the point $P_e$ as the point $P_s$.

FIG. 44 shows a path produced on the foregoing techniques. In the figure, a solid line depicts a curve $C_0$ which is a trajectory presented by the center of a ball on the screw shaft, and a broken line, a chain line, and a chain double-dashed line depict three curves $C_1$, $C_2$ and $C_3$, respectively, which form the path extending from the point $P_s$ to the point $P_h$. In addition, the three curves, which are depicted by the chain double-dashed line, chain line, and dashed line and which serve as a connection between the points $P_h$ and $P_e$, are curves which are symmetric to the curves $C_3$, $C_2$ and $C_1$ with regard to the y-axis.

Figure 45:
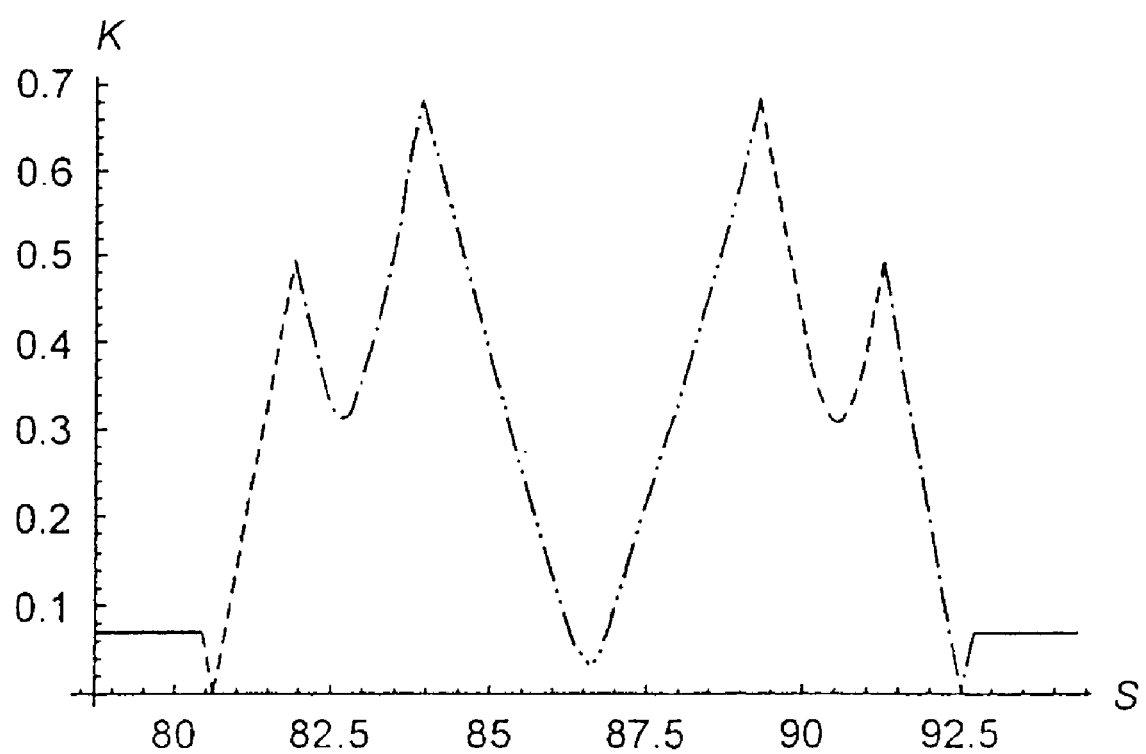
FIG. 45 is a graph showing the relationship between a distance moved from a point Pe and a curvature.

FIG. 45 presents a graph showing the relationship a moved distance s and the curvature κ, wherein the moved distance is obtained by moving along the regression path counterclockwise when it is viewed in the positive z-axis direction from the point $P_e$. The types of lines in the graph correspond to those of the curves in FIG. 44.

Based on the above technique, the regression path of the deflector type of ball screw was designed by the three-dimensional clothoid curve. This technique for designing the regression path, which uses the three-dimensional clothoid curve, will not be limited to the application to the deflector type of ball screw, off course. Other applications are possible, which include an application to a ball screw, called a return pipe type of ball screw, in which the regression path is composed of a pipe, and a further application to a ball screw, called an end cap type of ball screw, in which balls are picked up from the ball rolling groove of a screw shaft by an end cap placed on a nut end surface and the balls are returned to the ball rolling groove from an opposite-side end cap after being passed through the inside of the nut.

By the way, in cases where programs for achieving the design method according to the present invention are performed by a computer, the programs are previously stored in auxiliary storages, such as hard disk units, of the computer, and then loaded into a main memory thereof. In addition, such programs may be stored in portable recording mediums such as CD-ROMs for making sales, or may be stored in a recording medium of a computer connected to a network so that the programs may be transferred to other computers via the network.

INDUSTRIAL APPLICABILITY

Thanks to the three-dimensional curve according to the present invention, the versatile technique for producing spatial curves required for designing and producing industrial products can be provided. When an object moves at accelerated or decelerated speeds along spatial curves, design which makes changes in binding force smoother can be done. This characteristic is widely applicable to the method for designing trajectories of motion of a mechanical element with mass. As an application of the design according to the present invention, how to design the regression path of the ball screw has been described. However, the application is not limited to such an application but can be widely applicable to design of other objects, which include a rail of a roller coaster which runs at fast speeds along a rail winding up and down and back and forth, linear guides, and other objects. Other than listed here, thanks to the characteristic that changes in the curvature can be designed properly to the curve length, the design technique according to the present invention can be applied to other various industrial fields such as a field involving design of aesthetic design curves.

The invention claimed is:

1. A method for designing industrial products by using a computer, comprising:
generating a three-dimensional clothoid curve by the computer; and
designing a shape of said industrial products using the three-dimensional clothoid curve by the computer,
wherein each of a pitch angle and a yaw angle in a tangential direction of said three-dimensional clothoid curve is given by a quadratic expression comprising of a curve length or a curve length variable,
wherein the three-dimensional clothoid curve is generated using the following expressions:

$$P = P_0 + \int_0^s u\,ds = P_0 + h\int_0^S u\,dS,\ 0 \le s \le h,\ 0 \le S = \frac{s}{h} \le 1;$$

$$u = E^{k\beta}E^{j\alpha}(i) = \begin{bmatrix} \cos\beta & \sin\beta & 0 \\ \sin\beta & \cos\beta & 0 \\ 0 & 0 & 1 \end{bmatrix} \begin{bmatrix} \cos\alpha & 0 & \sin\alpha \\ 0 & 1 & 0 \\ -\sin\alpha & 0 & \cos\alpha \end{bmatrix} \begin{Bmatrix} 1 \\ 0 \\ 0 \end{Bmatrix} = \begin{Bmatrix} \cos\beta\cos\alpha \\ \sin\beta\cos\alpha \\ -\sin\alpha \end{Bmatrix};$$

$$\alpha = a_0 + a_1 S + a_2 S^2;$$

$$\beta = b_0 + b_1 S + b_2 S^2,$$

wherein $$P = \begin{Bmatrix} x \\ y \\ z \end{Bmatrix},\ P_0 = \begin{Bmatrix} x_0 \\ y_0 \\ z_0 \end{Bmatrix}$$

shows a positional vector at each point on the three-dimensional clothoid curve and its initial value, respectively, the expressions for the three-dimensional clothoid curve when implemented:

assume that the length of the curve from a starting point is s and its whole length is h, said whole length being a length from the starting point to an end point, and produce a dimensionless value S, which is called the curve length variable;

i, j and k are unit vectors in the x-axis, y-axis and z-axis directions, respectively; and the u is a unit vector showing a tangential direction of the curve at a point P; the $E^{k\beta}$ and the $E^{j\alpha}$ are rotation matrices and represent an angular rotation of angle $\beta$ about the k-axis and an angular rotation of angle $\alpha$ about the j-axis, respectively, wherein the $E^{k\beta}$ is referred to as a yaw rotation, while the $E^{j\alpha}$ is referred to as a pitch rotation; the unit vector in the i-axis direction is rotated by an angle $\alpha$ about the j-axis, before being rotated by an angle $\beta$ about the k-axis, thus producing a tangent vector u in which $a_0$, $a_1$, $a_2$, $b_0$, $b_1$ and $b_2$ are constants.

2. The method for designing industrial products according to claim 1, wherein the industrial products being a machine including a mechanism in which a mechanical element having a mass moves and
a trajectory of motion of the mechanical element is designed by using the three-dimensional clothoid curve.

3. The method for designing industrial products according to claim 2, wherein:
the machine is a screw device including a mechanism in which a ball as the mechanical element moves,
the screw device comprises a screw shaft having an outer surface on which a spiral rolling element rolling groove is formed, a nut having an inner surface on which a load rolling element rolling groove is formed so as to be opposed to the rolling element rolling groove and a regression path is formed to connect a one end and the other end of the load rolling element rolling groove, and a plurality of rolling elements disposed between the rolling element rolling groove of the screw shaft and the load rolling element rolling groove of the nut and disposed in the regression path, and
the regression path of the screw device is designed by using the three-dimensional clothoid curve.

4. The method for designing industrial products according to claim 1, wherein a plurality of spatial points are specified in a three-dimensional coordinate system and these spatial points are interpolated by using the three-dimensional clothoid curve, whereby the shape of the industrial product is designed.

5. The method for designing industrial products according to claim 4, wherein the seven parameters $a_0$, $a_1$, $a_2$, $b_0$, $b_1$, $b_2$ and h of the three-dimensional clothoid segments are calculated so that, between a one three-dimensional clothoid segment and a next three-dimensional clothoid segment, positions, tangential directions, normal directions, and curvatures of both the one and next three-dimensional clothoid segments are made continuous to each other, respectively, at the plurality of spatial points,
wherein the one and the next three-dimensional clothoid segments each being a unit curve consisting of a group of curves produced on the interpolation.

6. The method for designing industrial products according to claim 5, wherein:
the seven parameters $a_0$, $a_1$, $a_2$, $b_0$, $b_1$, $b_2$ and h of the three-dimensional clothoid segments are calculated by making the number of conditional expressions produced by mutual addition to be made between conditional expressions concerning the tangential directions, the normal directions and the curvatures at both the starting point and the end point and further conditional expressions allowing the positions, the tangential directions, the normal directions, and the curvatures of both the one and next three-dimensional clothoid segments to be made continuous to each other, respectively, at the plurality of spatial points agree with the unknowns of the seven parameters $a_0$, $a_1$, $a_2$, $b_0$, $b_1$, $b_2$ and h of the three-dimensional clothoid segments, whereby the conditional expressions is made agree with the unknowns in terms of number thereof, by specifying the tangential directions, the normal directions and the curvatures at the stating point and the and point among the plurality of spatial points and additionally inserting objective points being interpolated between the spatial points.

7. A data storage device characterized in that:
the data storage device stores program for designing a shape of an industrial product which, when executed by a computer, generates,
a three-dimensional clothoid curve in which each of a pitch angle and a yaw angle in a tangential direction is given by a quadratic expression comprising of a curve length or a curve length variable,
wherein the three-dimensional clothoid curve is generated using the following expressions:

$$P = P_0 + \int_0^s u\,ds = P_0 + h\int_0^S u\,dS,\ 0 \le s \le h,\ 0 \le S = \frac{s}{h} \le 1;$$

$$u = E^{k\beta}E^{j\alpha}(i) = \begin{bmatrix} \cos\beta & \sin\beta & 0 \\ \sin\beta & \cos\beta & 0 \\ 0 & 0 & 1 \end{bmatrix}\begin{bmatrix} \cos\alpha & 0 & \sin\alpha \\ 0 & 1 & 0 \\ -\sin\alpha & 0 & \cos\alpha \end{bmatrix}\begin{Bmatrix} 1 \\ 0 \\ 0 \end{Bmatrix} =$$

$$\begin{Bmatrix} \cos\beta\ \cos\alpha \\ \sin\beta\ \cos\alpha \\ -\sin\alpha \end{Bmatrix};$$

$$\alpha = a_0 + a_1 S + a_2 S^2;$$
$$\beta = b_0 + b_1 S + b_2 S^2,$$

wherein $$P = \begin{Bmatrix} x \\ y \\ z \end{Bmatrix},\ P_0 = \begin{Bmatrix} x_0 \\ y_0 \\ z_0 \end{Bmatrix}$$

shows a positional vector at each point on the three-dimensional clothoid curve and its initial value, respectively, the expressions for the three-dimensional clothoid curve when implemented:
assume that the length of the curve from a starting point is s and its whole length is h, said whole length being a length from the starting point to an end point, and produce a dimensionless value S, which is called the curve length variable;
i, j and k are unit vectors in the x-axis, y-axis and z-axis directions, respectively; and
the u is a unit vector showing a tangential direction of the curve at a point P; the $E^{k\beta}$ and the $E^{j\alpha}$ are rotation matrices and represent an angular rotation of angle $\beta$ about the k-axis and an angular rotation of angle $\alpha$ about the j-axis, respectively,
wherein the $E^{k\beta}$ is referred to as a yaw rotation, while the $E^{j\alpha}$ is referred to as a pitch rotation; the unit vector in the i-axis direction is rotated by an angle $\alpha$ about the j-axis, before being rotated by an angle $\beta$ about the k-axis, thus producing a tangent vector u in which $a_0$, $a_1$, $a_2$, $b_0$, $b_1$ and $b_2$ are constants.

8. A computer-readable recording medium, which is for designing a shape of an industrial product, recorded thereon a program which when executed enables a computer to operate as means to design the shape of the industrial product by using a three-dimensional clothoid curve in which each of a pitch angle and a yaw angle in a tangential direction is given by a quadratic expression comprising of a curve length or a curve length variable,
wherein the three-dimensional clothoid curve is generated using the following expressions:

$$P = P_0 + \int_0^s u\,ds = P_0 + h\int_0^S u\,dS,\ 0 \le s \le h,\ 0 \le S = \frac{s}{h} \le 1;$$

$$u = E^{k\beta}E^{j\alpha}(i) = \begin{bmatrix} \cos\beta & \sin\beta & 0 \\ \sin\beta & \cos\beta & 0 \\ 0 & 0 & 1 \end{bmatrix}\begin{bmatrix} \cos\alpha & 0 & \sin\alpha \\ 0 & 1 & 0 \\ -\sin\alpha & 0 & \cos\alpha \end{bmatrix}\begin{Bmatrix} 1 \\ 0 \\ 0 \end{Bmatrix} =$$

$$\begin{Bmatrix} \cos\beta\ \cos\alpha \\ \sin\beta\ \cos\alpha \\ -\sin\alpha \end{Bmatrix};$$

-continued $$\alpha = a_0 + a_1 S + a_2 S^2;$$
$$\beta = b_0 + b_1 S + b_2 S^2,$$

wherein $$P = \begin{Bmatrix} x \\ y \\ z \end{Bmatrix}, P_0 = \begin{Bmatrix} x_0 \\ y_0 \\ z_0 \end{Bmatrix}$$

shows a positional vector at each point on the three-dimensional clothoid curve and its initial value, respectively, the expressions for the three-dimensional clothoid curve when implemented:

assume that the length of the curve from a starting point is s and its whole length is h, said whole length being a length from the starting point to an end point, and produce a dimensionless value S, which is called the curve length variable;

i, j and k are unit vectors in the x-axis, y-axis and z-axis directions, respectively; and the u is a unit vector showing a tangential direction of the curve at a point P; the $E^{k\beta}$ and the $E^{j\alpha}$ are rotation matrices and represent an angular rotation of angle $\beta$ about the k-axis and an angular rotation of angle $\alpha$ about the j-axis, respectively, wherein the $E^{k\beta}$ is referred to as a yaw rotation, while the $E^{j\alpha}$ is referred to as a pitch rotation; the unit vector in the i-axis direction is rotated by an angle $\alpha$ about the j-axis, before being rotated by an angle $\beta$ about the k-axis, thus producing a tangent vector u in which $a_0$, $a_1$, $a_2$, $b_0$, $b_1$ and $b_2$ are constants.

* * * * *